(12) United States Patent
Lind et al.

(10) Patent No.: US 12,011,720 B2
(45) Date of Patent: Jun. 18, 2024

(54) ANALYSIS INSTRUMENT

(71) Applicant: Q-LINEA AB, Uppsala (SE)

(72) Inventors: Anders Lind, Tärnsjö (SE); Henrik Söderström, Knivsta (SE); Henrik Svanberg, Uppsala (SE); Jan Grawé, Uppsala (SE); Johan Skaborn, Uppsala (SE)

(73) Assignee: Q-LINEA AB, Uppsala (SE)

( * ) Notice: Subject to any disclaimer, the term of this patent is extended or adjusted under 35 U.S.C. 154(b) by 841 days.

(21) Appl. No.: 17/047,794

(22) PCT Filed: Apr. 23, 2019

(86) PCT No.: PCT/EP2019/060390
§ 371 (c)(1),
(2) Date: Oct. 15, 2020

(87) PCT Pub. No.: WO2019/202167
PCT Pub. Date: Oct. 24, 2019

(65) Prior Publication Data
US 2021/0154663 A1    May 27, 2021

(30) Foreign Application Priority Data
Apr. 20, 2018    (GB) ..................... 1806509

(51) Int. Cl.
*B01L 3/00*    (2006.01)
*B01L 9/00*    (2006.01)
(Continued)

(52) U.S. Cl.
CPC ..... *B01L 3/50851* (2013.01); *B01L 3/502707* (2013.01); *B01L 3/50273* (2013.01);
(Continued)

(58) Field of Classification Search
CPC ........... B01L 3/50851; B01L 3/502707; B01L 3/50273; B01L 9/50; B01L 2200/0621;
(Continued)

(56) References Cited

U.S. PATENT DOCUMENTS 2,818,596 A * 1/1958 Martinec ................... A47L 9/00
15/246.2
2008/0062423 A1   3/2008 Ogawa et al.
(Continued)

FOREIGN PATENT DOCUMENTS

CN    201508319    6/2010
CN    203663881    6/2014
(Continued)

OTHER PUBLICATIONS

Examination Report dated Oct. 13, 2022 in European Patent Application No. 19 719 500.1.
(Continued)

*Primary Examiner* — Samuel P Siefke
*Assistant Examiner* — Henry H Nguyen
(74) *Attorney, Agent, or Firm* — Wenderoth, Lind & Ponack, L.L.P.

(57) ABSTRACT

An apparatus is for moving a sample holder on a platform from a loading position where the sample holder can be removed from the platform to a locked position where the sample holder is securely held. The sample holder is configured to rest on wheels within a recessed portion on the platform. The apparatus is configured such that: (i) movement of the platform from the loading position to the locked position causes a vertical clamp to lower down on top of the sample holder, and a horizontal clamp to be pressed to an outer periphery of the sample holder; and (ii) movement of the platform from the locked position to the loading position causes the vertical clamp to rise above the sample holder,
(Continued)

and the horizontal clamp to be moved away from the outer periphery of the sample holder.

14 Claims, 35 Drawing Sheets

(51) Int. Cl.
  *G01N 21/07* (2006.01)
  *G01N 35/00* (2006.01)
  *G01N 35/10* (2006.01)

(52) U.S. Cl.
  CPC ............... *B01L 9/50* (2013.01); *G01N 21/07* (2013.01); *G01N 35/00069* (2013.01); *G01N 35/1011* (2013.01); *B01L 2200/0621* (2013.01); *B01L 2300/041* (2013.01); *B01L 2300/0803* (2013.01); *B01L 2300/087* (2013.01); *B01L 2300/1822* (2013.01); *B01L 2300/1827* (2013.01); *B01L 2400/0409* (2013.01)

(58) Field of Classification Search
  CPC ....... B01L 2300/041; B01L 2300/0803; B01L 2300/087; B01L 2300/1822; B01L 2300/1827; B01L 2400/0409; G01N 21/07; G01N 35/00069; G01N 35/1011; G01N 21/6458; G01N 2001/4088; G01N 2015/0693; G01N 2021/6419; G01N 2021/6439; G01N 2021/6441
  See application file for complete search history.

(56) References Cited

U.S. PATENT DOCUMENTS

| 2012/0065912 A1 | 3/2012 | Corkan et al. |
| 2013/0107251 A1 | 5/2013 | Hegazi et al. |
| 2013/0130369 A1 | 5/2013 | Wilson et al. |
| 2013/0132006 A1* | 5/2013 | Gwynn ................. B01L 3/021 702/55 |

FOREIGN PATENT DOCUMENTS

| EP | 3 961 286 | 3/2022 |
| GB | 2536468 | 9/2016 |
| JP | 9-211010 | 8/1997 |
| JP | 2005-49197 | 2/2005 |
| JP | 2007-139704 | 6/2007 |
| WO | 2017/184242 | 10/2017 |
| WO | 2017/216310 | 12/2017 |
| WO | 2017/216312 | 12/2017 |
| WO | 2017/216314 | 12/2017 |
| WO | 2018/061775 | 4/2018 |
| WO | 2019/141874 | 7/2019 |

OTHER PUBLICATIONS

International Search Report and Written Opinion of the International Searching Authority, dated Sep. 9, 2019 in corresponding International Patent Application No. PCT/EP2019/060390.
GB Search Report, dated Oct. 22, 2018 in corresponding GB Application No. GB1806509.4.
GB Search Report, dated Mar. 29, 2019 in corresponding GB Application No. GB1806509.4.
English Translation of Office Action issued Mar. 21, 2024 in Chinese Patent Application No. 201980036596.1.

* cited by examiner

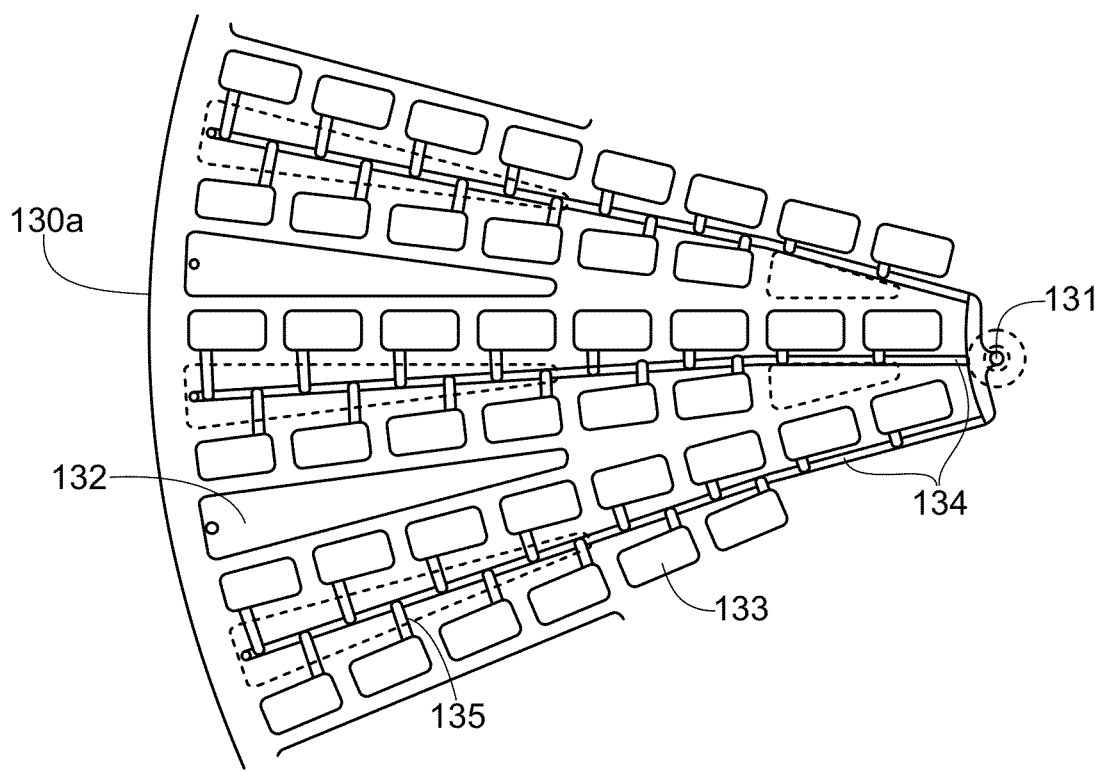
Fig. 14B
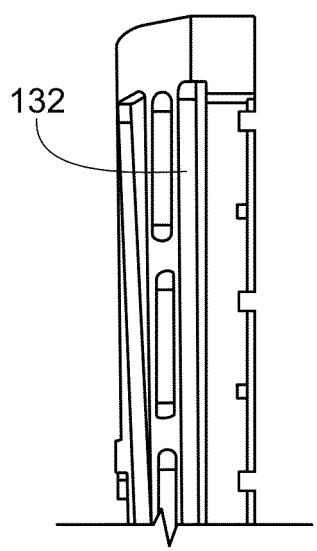
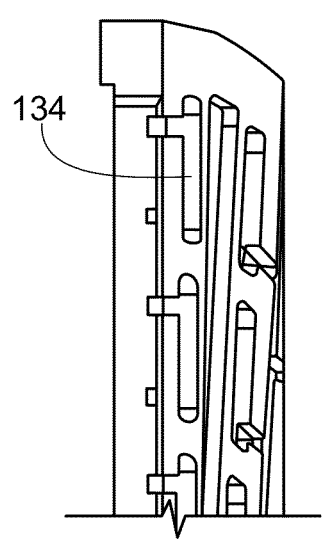
Fig. 14C      Fig. 14D

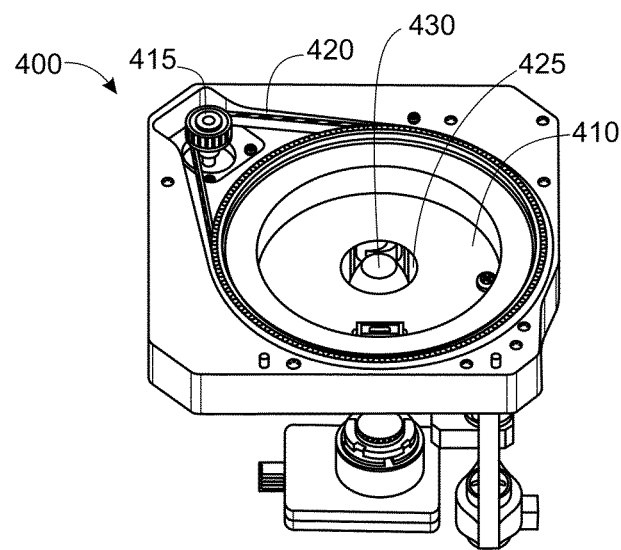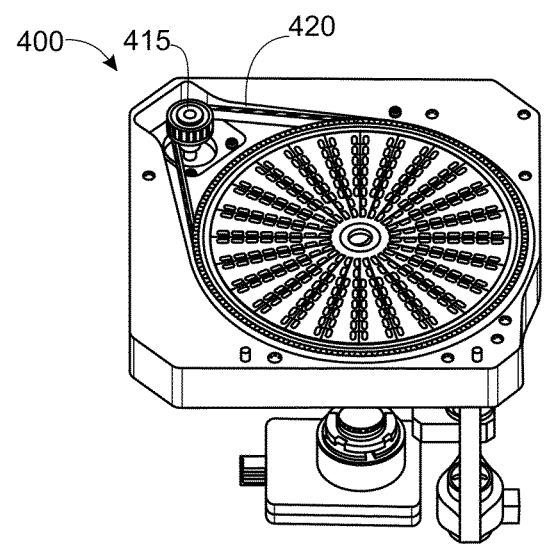
Fig. 27A  Fig. 27B
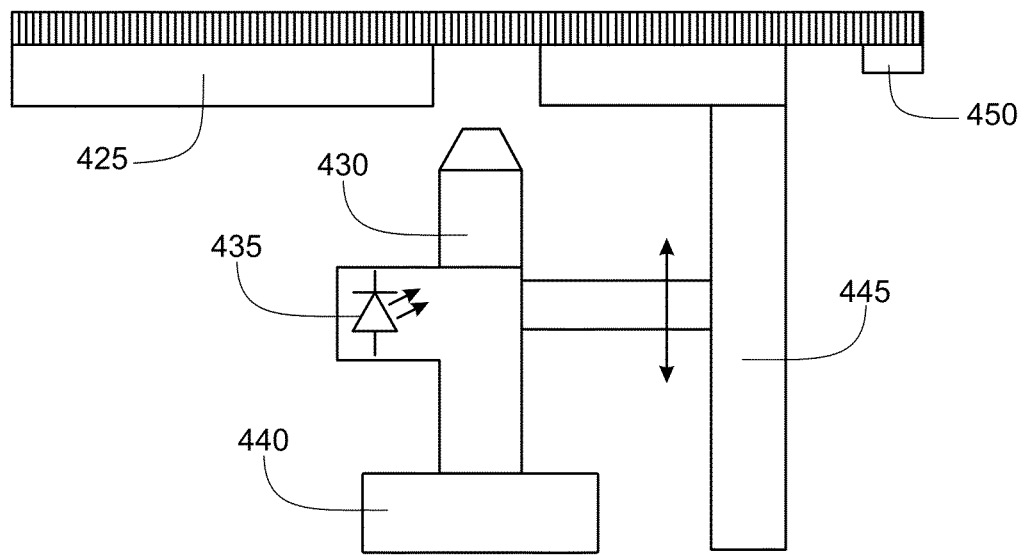
Fig. 27C

ANALYSIS INSTRUMENT

BACKGROUND OF THE INVENTION

1. Field of the Invention

The present invention relates to methods and apparatuses used in relation to an analysis instrument, for example an instrument for antimicrobial susceptibility testing (AST). In particular, embodiments include an apparatus for determining the position of a part of a pipette and alternatively or additionally an apparatus for moving a sample holder on a platform. Corresponding methods are also discussed.

2. Description of the Related Art

In known analysis instruments various automated systems are used for handling and processing of the samples that require analysis. In the example of a system for performing AST a sample containing a pathogen is cultured in the presence of various antimicrobial substances at different concentrations to determine the minimum inhibitory concentration (MIC) of the antimicrobial substance, and/or to categorize the pathogen as "susceptible", "intermediate", or "resistant" (SIR). The sample that is tested with the analysis instrument is in that case taken from a larger sample in a blood culture flask. Various devices are available for handling samples in that context, including steps such as obtaining samples from a larger sample (for example from a flask), moving the sample within the analysis instrument, and processing the sample by exposing it to required conditions and/or by taking measurements or otherwise gathering information from the sample.

SUMMARY OF THE INVENTION

A first aspect of the invention provides an apparatus for moving a sample holder on a platform from a loading position, where the sample holder can be removed from the platform, to a locked position, where the sample holder is securely held, wherein the sample holder rests on wheels within a recessed portion on the platform, and wherein the apparatus is configured such that movement from the loading position to the locked position causes a vertical clamping means to lower down on top of the sample holder, and a horizontal clamping means to be pressed to the outer periphery of the sample holder, and such that movement from the locked position to the loading position causes the vertical clamping means to raise above the sample holder, and the horizontal clamping means to be moved away from the outer periphery of the sample holder.

By "securely held", it is meant that the sample holder cannot be removed from the recessed portion on the platform in the locked position (for example, because the platform lid precludes such removal).

As noted above, the sample holder rests on wheels within a recessed portion on the platform. This may facilitate rotation of the sample holder, in particular when the platform is in the locked position, such that the sample holder is securely held.

The vertical clamping means may comprise a platform lid. Optionally, in the locked position, the platform lid lies parallel to the platform. In the locked position, the sample holder may be sandwiched between the platform lid and the platform, and the platform lid may lie parallel to the sample holder.

The platform lid optionally comprises a first end which is hingedly attached to the platform, and a second end which can rise up and down by pivoting about the hinged connection at the first end. The first end and second end are optionally at opposite ends of the platform lid.

The platform lid may comprise a guide wheel which is arranged to follow a guide rail which extends from the locked position to the loading position.

The guide wheel may be located closer to the second end of the platform lid than the first end.

The height of the guide rail optionally increases from the locked position to the loading position, such that the platform lid is lifted upwards (by movement of the guide wheel along the guide rail) when moving from the locked position to the loading position. Correspondingly, the platform lid is guided downward (by movement of the guide wheel along the guide rail) when moving from the loading position to the locked position The platform lid may comprise an inner frame which is attached via gimbal mounts to an outer frame, allowing the inner frame to pivot about an axis (a gimbal axis).

The extent to which the inner frame can pivot about the axis may be limited by an angular limiter. Optionally, the angular limiter comprises a pin protruding from one of the inner frame or the outer frame, which is received within a hole in the other of the inner frame or the outer frame. The angular limiter may comprise a pin which protrudes from the inner frame and is received within a hole in the outer frame. Instead, the pin could protrude from the outer frame to be received within a hole in the inner frame.

The pin and hole may each have a central axis, and the axes may be coaxial when upper and lower faces of the inner frame and outer frame are parallel.

The diameter of the pin may be smaller than the diameter of the hole such that the pivoting motion of the inner frame about the gimbal axis is limited by the extent to which the pin can move (upwards and downwards) within the hole.

When the pin and hole are coaxial, their axis may be perpendicular to the gimbal axis.

The hinged connection at the first end of the platform lid may connect the outer frame to the platform. The guide wheel may be attached to the outer frame of the platform lid.

The horizontal clamping means may comprise a drive wheel configured to apply a tangential force to the sample holder, to rotate the sample holder, when the sample holder is in the locked position. Rotation of the sample holder is further facilitated by the wheels on which the sample holder rests.

The horizontal clamping means may be provided to one side of a pivot point on a pivotable rod, and may be able to pivot away from or towards the sample holder about the pivot point. Optionally, a spring is attached to the pivotable rod at the other side of the pivot point.

Optionally, movement of the platform from the locked position to the loading position brings the pivotable rod into contact with a stop, which pivots the pivotable rod away from the sample holder, against the action of the spring.

A second aspect of the present invention provides an apparatus for determining the position of a part of a pipette, comprising: a pipette robot moveable along first and second axes in a first plane; a camera; an alignment aperture, wherein the alignment aperture is a through-hole in a surface, the alignment aperture being defined by a periphery; and a controller, wherein the camera, alignment aperture and pipette robot are arranged such that the camera is operable to capture an image including both the periphery of the alignment aperture and, within that periphery, the part of the pipette; and wherein the controller is configured to use the captured image to determine the position of the part of the pipette relative to a nominal position.

The part of a pipette may for example be a pipette head, without a tip attached, or may be a pipette tip, attached to the pipette head.

The apparatus may comprise a light source. Optionally, the light source comprises a plurality of LEDs. The plurality of LEDs may be coplanar and spaced evenly around an optical axis of the camera.

The apparatus may comprise an objective lens, optionally providing a 0.3× magnification for the camera.

The nominal position may be the center of the alignment aperture.

The apparatus may be configured to change the position of the pipette robot such that the part of the pipette lies at the nominal position.

The part of the pipette and the alignment aperture may have broadly circular cross sections, such that the captured image comprises two circles.

The pipette robot is optionally moveable along a third axis perpendicular to the first plane.

The apparatus may be operable to determine the position of the part of the pipette along the third axis.

The camera may be operable to capture a plurality of images, and each image may be taken with the part of the pipette at a different position along the third axis. Optionally, a series of 30 to 50 images are captured.

Optionally, each image may be separated from the next by 0.05 to 2 mm, for example 0.1 mm. That is, each image may be taken when the part of the pipette has been moved 0.05 to 2 mm (for example 0.1 mm) along the third axis, compared to the position of the part of the pipette when the previous image was captured.

The series of images may be centered around nominal position of the part of the pipette, meaning that the image in the middle of the series is taken at a nominal position of the part of the pipette.

The controller may be configured to analyze each image to determine a value for a contrast function quantifying the contrast of the part of the pipette in relation to the surroundings.

The controller may be configured to determine a highest-contrast image with the highest value for the contrast function, and may be further configured to identify the position along the third axis at which the highest-contrast image was taken as the position of the part along the third axis.

The apparatus may comprise an optical sensor configured to determine the location along the third axis of an extreme end of the part of the pipette. For example, the optical sensor may be a fork sensor.

The pipette robot may comprise a pressure sensor, and the controller may be configured to receive data from the pressure sensor.

The position of the surface along the third axis may be known, and the controller may be configured to move the pipette robot along the third axis towards the surface, and may be configured to determine the location of the pipette robot along the third axis when the data from the pressure sensor indicates that the pipette robot is in contact with the surface.

A third aspect of the present invention provides a method of determining the position of a part of a pipette, comprising: arranging a camera and pipette robot comprising the part of the pipette on opposite sides of an alignment aperture in a surface; using the camera to capture an image including both the periphery of the alignment aperture and, within that periphery, the part of the pipette; using the captured image to determine the position of the part of the pipette relative to a nominal position.

The method may comprise the use of the apparatus of the second aspect of the invention, optionally including any of the optional features of the apparatus set out above.

BRIEF DESCRIPTION OF THE DRAWINGS

Certain embodiments of the present invention will now be described by way of example only and with reference to the attached drawings, in which:

FIGS. 14A to 14D show a fluidic network in the sample holder of FIG. 11 (FIG. 14A shows a top view of part of the middle layer of the sample holder, FIG. 14B shows a bottom view of part of the middle layer of the sample holder, FIGS. 14C and 14D show respectively a close-up view of the top and bottom of the middle layer, showing a connection between the fluidic network and a gas reservoir also used as a waste reservoir;

FIGS. 27A to 27C show a concentration determination stage;

DETAILED DESCRIPTION OF THE INVENTION

Figure 1A:
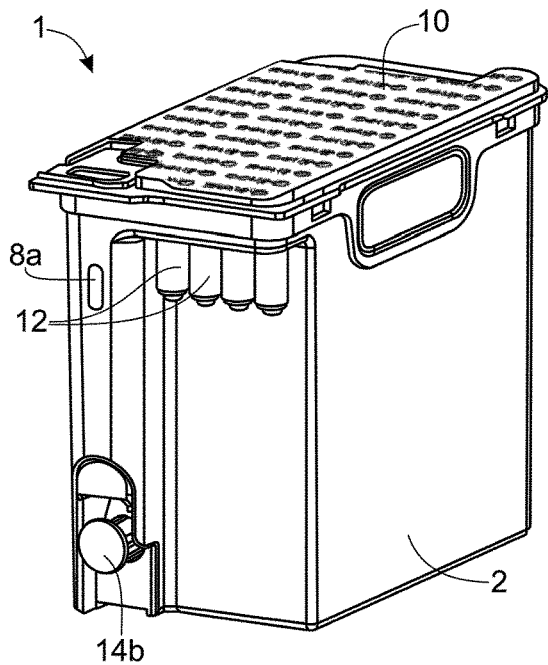
FIGS. 1A to 1C show an exemplary sample preparation cartridge from a first perspective view.
Figure 1B:
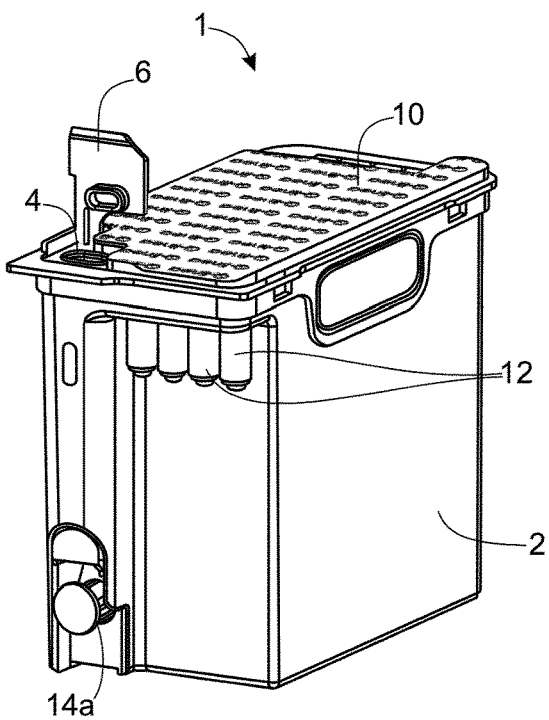
Figure 1C:
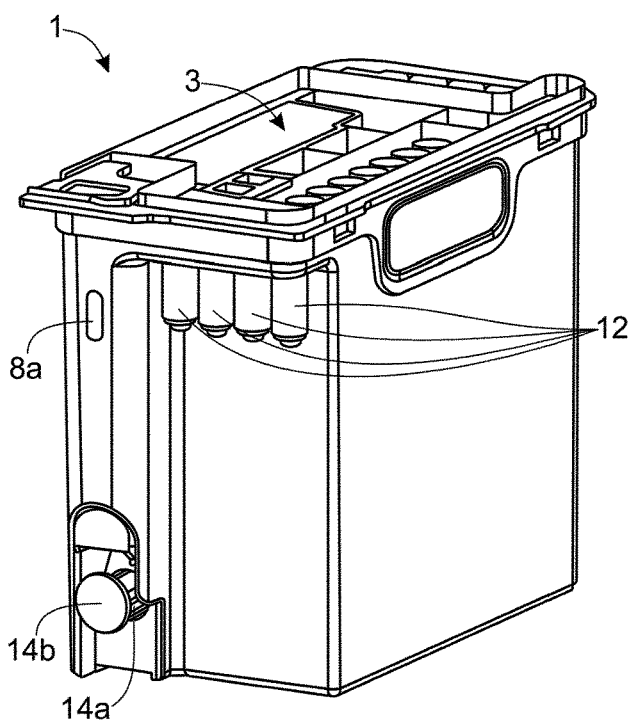

The present disclosure focusses in particular on a system for performing antimicrobial susceptibility testing (AST). In such an analysis, a sample containing a pathogen is cultured in the presence of various antimicrobial substances at different concentrations to determine the minimum inhibitory concentration (MIC) of the antimicrobial substance, and/or to categorize the pathogen as "susceptible", "intermediate", or "resistant" (SIR). The present disclosure focusses in particular on a system for performing AST from a sample derived from a sample taken from a blood culture flask, the invention is not limited to such a system. Whilst the invention is disclosed in the context of such a system, the invention itself is more generally applicable, and not limited to its use in an AST analysis system, as will be appreciated by the skilled person.

In the following description, the "instrument" (or the "analysis instrument") refers to the entire analysis apparatus, excluding the consumables used by the instrument. Consumables are single-use sample preparation or sample holder items received by the instrument for use in the analysis process. The term, "system" refers to the combination of the instrument and the consumables used thereby. Within the instrument, a "stage" is a physical location within the instrument where a specific function is carried out. A "sub-system" is either a part of the analysis instrument which is more distributed, or which performs a plurality of functions.

As explained below, one of the types of consumables received by the analysis instrument is used for sample preparation. The other type is used for analyzing a prepared sample. As a result of the separable functionality of the consumable, it becomes possible to run different clinical matrices in the analysis instrument, with minimal modifications. For example, the exact form of the sample preparation cartridge may change, but the sample holder, and the interfaces between the consumables and the analysis instrument may remain the same.

With modifications to the sample preparation cartridge, the analysis instrument could therefore analyze:
  Bacterial isolates
  Urine samples
  Respiratory samples
  Cultured bacteria from other sterile sites such as Cerebrospinal fluid and sterile punctuates It may also be possible to add a prepared solution of bacteria to the sample holder and run it without the sample preparation cartridge.

Consumables for Use in the Analysis Instrument

The consumables received by the analysis instrument will now be described in greater detail, by way of example only, and with continuing reference to the appended drawings. The details of the consumables are provided here in order to set features of the system itself in context. The invention is not intended to be limited to the particular consumables described.

Sample Preparation Cartridge

In an exemplary process, the sample preparation cartridge 1 is used in the preparation of a suspension of pathogens at a predefined concentration in a medium compatible with growth for MIC/SIR determination in AST. The input to the sample preparation cartridge 1 is a sample from a blood culture flask (BCF), in particular from a positive BCF.

In more detail, the exemplary process can be broken down into the following steps:

1. Receiving a sample from a positive BCF.
2. Filtering the sample to remove resin particles from the sample.
3. Lysing human-derived cells in the sample by preparing a lysis medium, mixing this with the sample or an aliquot of the sample, and incubating.
4. Separating pathogens from the lysate by filtering and subsequently washing the pathogens captured on the filter membrane.
5. Re-suspending the captured pathogens in a medium compatible with growth.
6. Preparing a subsample for pathogen concentration determination by diluting an aliquot of the resuspended pathogens in a medium containing ethanol (to inactivate possible staining inhibition structures or mechanism), and staining the dilution with a pan-bacterial fluorescent stain (also referred to herein as a dye) under temperature control.
7. Upon completed concentration determination (performed outside of the sample preparation cartridge 1), in cases where the concentration is sufficient for further analysis, preparing one or more dilutions of the re-suspended pathogens at a predetermined concentration, at a volume sufficient to fill sample wells in a sample holder used by the analysis instrument. For example, a first dilution is prepared in non-fastidious medium. In cases where the concentration of pathogens is sufficient, a second dilution of re-suspended pathogens in fastidious medium can be prepared.

An exemplary sample preparation cartridge 1 which is capable of performing the above steps is discussed in detail below. Note that the sample preparation cartridge 1 is not intended to be limited to use in such a process.

The sample preparation cartridge 1 comprises a housing 2 forming the main body of the sample preparation cartridge 1. The housing 2 defines various apertures and fastening points for interfaces between components within the sample preparation cartridge 1, and the analysis system. The housing 2 also provides positions for labels (for example comprising human-readable information, or a bar code, QR code, or another machine-readable code) to identify the sample preparation cartridge 1 and/or the sample (for example, using a patient ID). The housing 2 may in particular form the base and sides of the sample preparation cartridge 1.

The sample preparation cartridge 1 comprises the following components housed within the housing 2: a three-way valve 17; a valve actuator 18; a 3 ml syringe 14 comprising a barrel 14c and a piston 14a; and a filter 16. In this example the filter is a nylon filter having a pore size of 0.2 μm. The multi-way valve may for example be a three-way valve. One suitable valve is part number 60MP0436, manufactured by Mediplast A/S. The multi-way valve 17 is connected to the syringe 14, the filter 16 and an input well (filtration inlet well 45). That is, the multi-way valve 17 can be connected to each of these depending on the position that the multi-way valve 17 is rotated to.

Figure 2A:
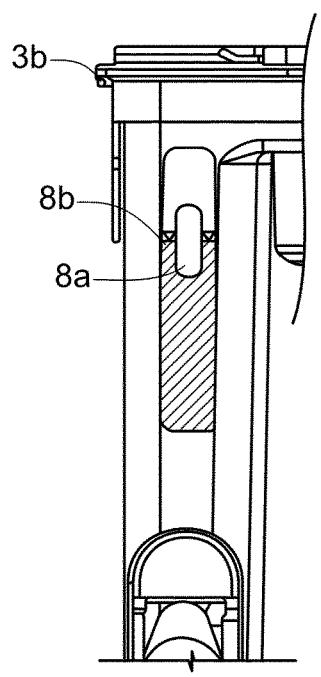
FIG. 2 shows further details of the sample preparation cartridge of FIG. 1.
Figure 2B:
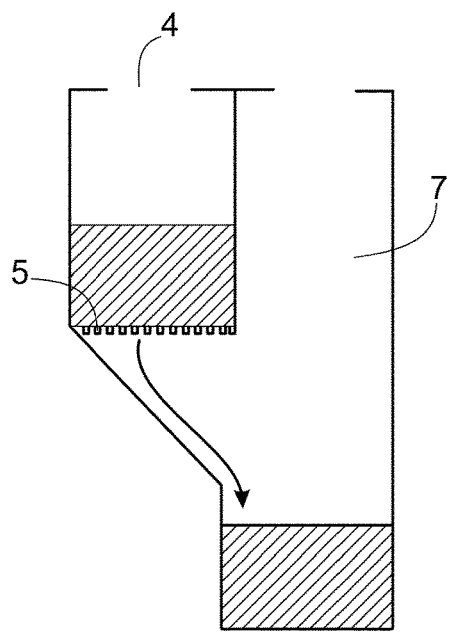
Figure 7:
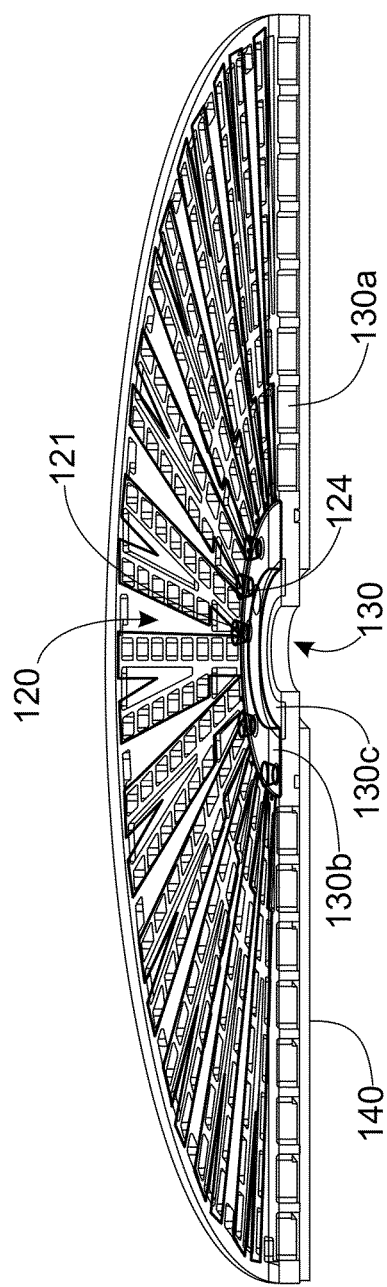
FIG. 7 shows a cut-away perspective view of the sample holder of FIG. 6.

The sample preparation cartridge 1 comprises a top deck 3 (shown in particular in FIG. 7). The top deck 3 forms the top of the sample preparation cartridge 1, and snaps over the housing 2 to be affixed thereto. The top deck comprises:

- A sample receptacle 7 (see FIG. 2B) for receiving the sample via a sample inlet 4, closed by a user-closable lid 6. Marked on the side of the sample receptacle (for example, on an adhesive sticker) is a minimum fill line 8b (see FIG. 2A). A transparent window 8a extends above and below the minimum fill line 8b, which allows the user to determine when sufficient sample has been supplied. After sufficient sample fill, the user-closable lid 6 is closed by the user.
- A sample introduction filter 5 (see FIG. 2B), held in-line within the sample receptacle 7. The sample introduction filter 5 is a 100 μm mesh filter. The sample introduction filter 5 is provided for filtering resin particles out of the sample. Such resin particles are usually provided in BCFs in order to adsorb any antimicrobials present in the blood of a patient (e.g. which may be present in the case that the patient has been taking antibiotics prior to the blood being drawn). The resins are removed to avoid that they adsorb further antimicrobials, which would affect the AST results.
- Positions for a plurality of pipette tips, for example up to 16 pipette tips 55, optionally holding pipette tips of a plurality of different sizes. In one example, the cartridge comprises six 1000 μl tips, one 300 μl tip and five 50p1 tips, with capacity is for one more 50 μl tip and two more 1000 tips. Providing a plurality of different sized tips allows different volumes of fluid to be handled. The precision of the volume handled may differ between different sized tips. The tips are pre-filled in the cartridge when it is received by the user.
- Various wells containing reagents, or for mixing reagents, or for incubating a sample and reagent(s).
- A top foil 10 or a lid, covering the deck, except the sample inlet 4 and sample receptacle 7 and the positions for user-inserted snap-in inserts (see below), to avoid contamination of the reagents during handling. The top foil 10 can be removed by the user prior to inserting the sample preparation cartridge into the analysis instrument. The lid or foil may have the functionality of protecting the parts covered by the lid or foil from contamination. Where a lid is provided, this may have the additional functionality of preventing the sample preparation cartridge from being loaded into the analysis instrument until the lid is removed, and the sample preparation cartridge is in a state such that it can be processed by the analysis instrument. The lid may be replaceable, once it has been removed (though it must be removed prior to placement of the sample preparation cartridge into the cartridge bay).

Some of the wells (in particular, some of the reagent wells) are provided as snap-in inserts, some of which may be delivered to the user in situ in the top deck 3 of the sample preparation cartridge 1, and some of which must be inserted into the top deck 3 by the user. The reagent wells may be covered by a foil that can be pierced by a pipette tip.

The housing 2 and/or top deck 3, and/or snap-in inserts comprise positions for a label (for example comprising human readable information and/or a bar code, QR code, or other machine-readable code) for identification purposes.

Some fluid handling within the sample preparation cartridge 1 is by way of the syringe 14 and multi-way valve 17 inside the sample preparation cartridge 1. Control of the syringe 14 and multi-way valve 17 to control such fluid handling steps is by the analysis instrument, and therefore the syringe 14 and multi-way valve 17 are accessible to be controlled by the analysis instrument. That is, the syringe 14 and multi-way valve 17 have interfaces with elements of the analysis instrument allowing the analysis instrument to move the syringe piston 14a, and to control the position of the multi-way valve 17.

A first interface is between the flange 14c of the syringe piston 14a and a syringe piston hook 222 provided in the analysis instrument. In order for the syringe piston flange 14c to be engaged by the syringe piston hook 222, the syringe piston flange 14c protrudes from the sample preparation cartridge 1 via a syringe piston aperture in the housing 2.

A second interface is between a valve interface slot 19 on the sample preparation cartridge 1 and a valve key 230 provided in the cartridge bay 220. The valve interface slot 19 is provided on one face 18a of a valve actuator 18 which protrudes from the housing 2 through a valve actuator aperture in the housing 2. The other face of the valve actuator 18b comprises a plurality of slots which receive arms of the multi-way valve 17. Rotation of the valve interface slot 19 turns the valve actuator 18 and hence causes rotation of the multi-way valve 17.

The valve actuator 18 has a broadly cylindrical shape, with the two faces 18a, 18b provided at either end of the cylinder.

The valve interface slot 19 comprises an open end 19a and a closed end 19b, with the broadly linear slot running between the open end and closed end. A valve interface slot 19 with this configuration is able to receive a key having a shape corresponding to the slot, but only when the valve interface slot 19 (and hence the multi-way valve 17) is in the correct orientation.

The open end 19a may flare outwardly (i.e. having an increasing towards the outermost edge of the slot 19). This allows the valve interface slot 19 and valve key 30 to slide into engagement more easily.

Figure 3:
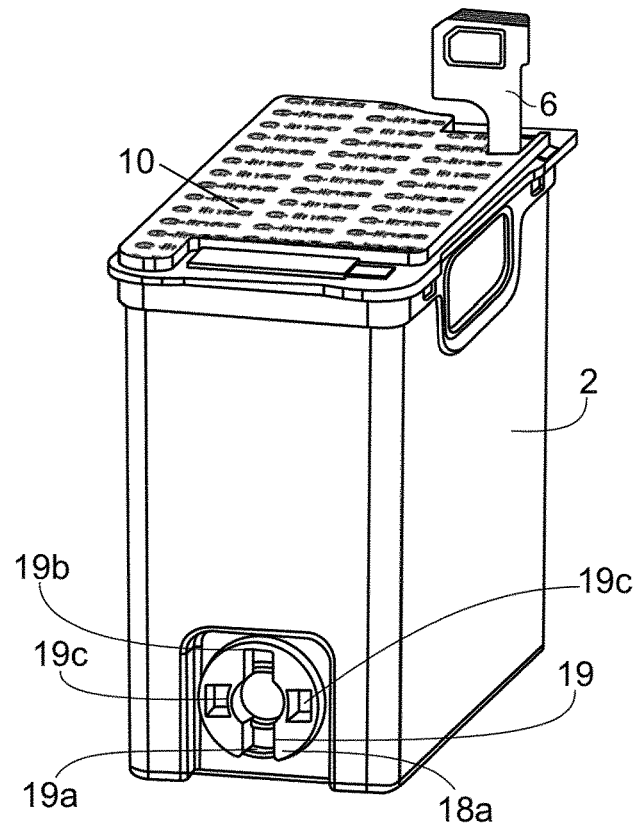
FIG. 3 shows the sample preparation cartridge of FIG. 1 from a second perspective view.
Figure 4:
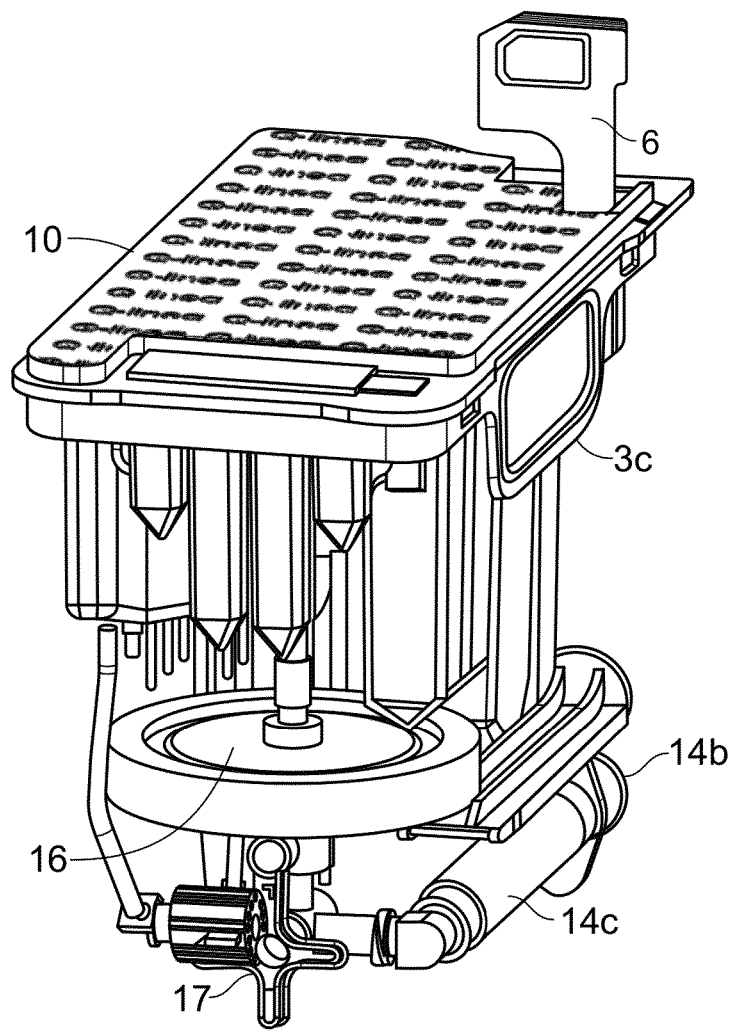
FIG. 4 shows interior features of the sample preparation cartridge of FIG. 1.

With reference to FIG. 3, the features labelled 19c are present for injection molding purposes only, and do not have any functional purpose. The valve interface slot 19 also comprises a central portion with an increased cross-section. This is again present for injection molding purposes, and does not have a functional purpose.

Figure 1D:
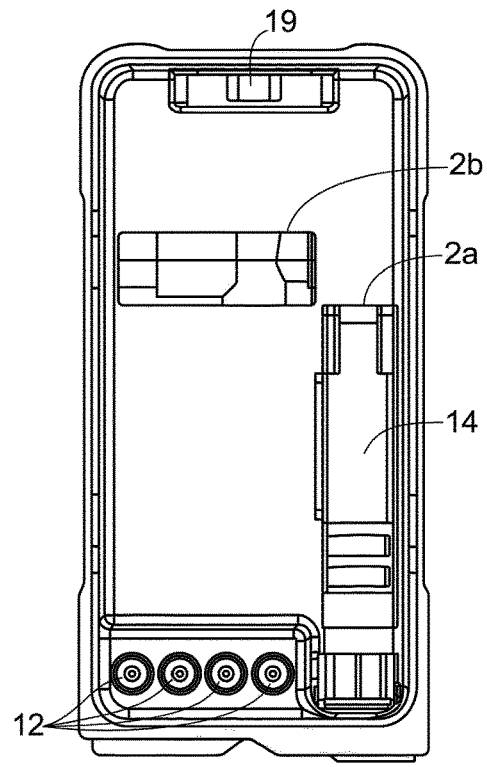
FIG. 1D shows the exemplary sample preparation cartridge from a bottom view.

With reference to FIG. 1D, aperture 2b in the housing 2 provides a means for the multi-way valve 17 to be supported from below by supporting features (not shown) in the cartridge bay 20.

A third interface provides controlled heating to the syringe barrel 14c. The housing 2 of the sample preparation cartridge 1 comprises an aperture 2a (see FIG. 1D) which allows a syringe heater 26 provided in the analysis instrument to directly contact the syringe barrel 14c.

The sample preparation cartridge 1 comprises a plurality of concentration determination wells 12, provided as part of the top deck 3. A fourth interface involves provision of heating (and cooling, if necessary) to the concentration determination wells 12 of the sample preparation cartridge 1. To allow access to the concentration determination wells 12 for heating/cooling, the concentration determination wells 12 are placed outside of the housing 2, so that they can be largely surrounded by a heating block 234 provided in the analysis instrument.

Figure 5:
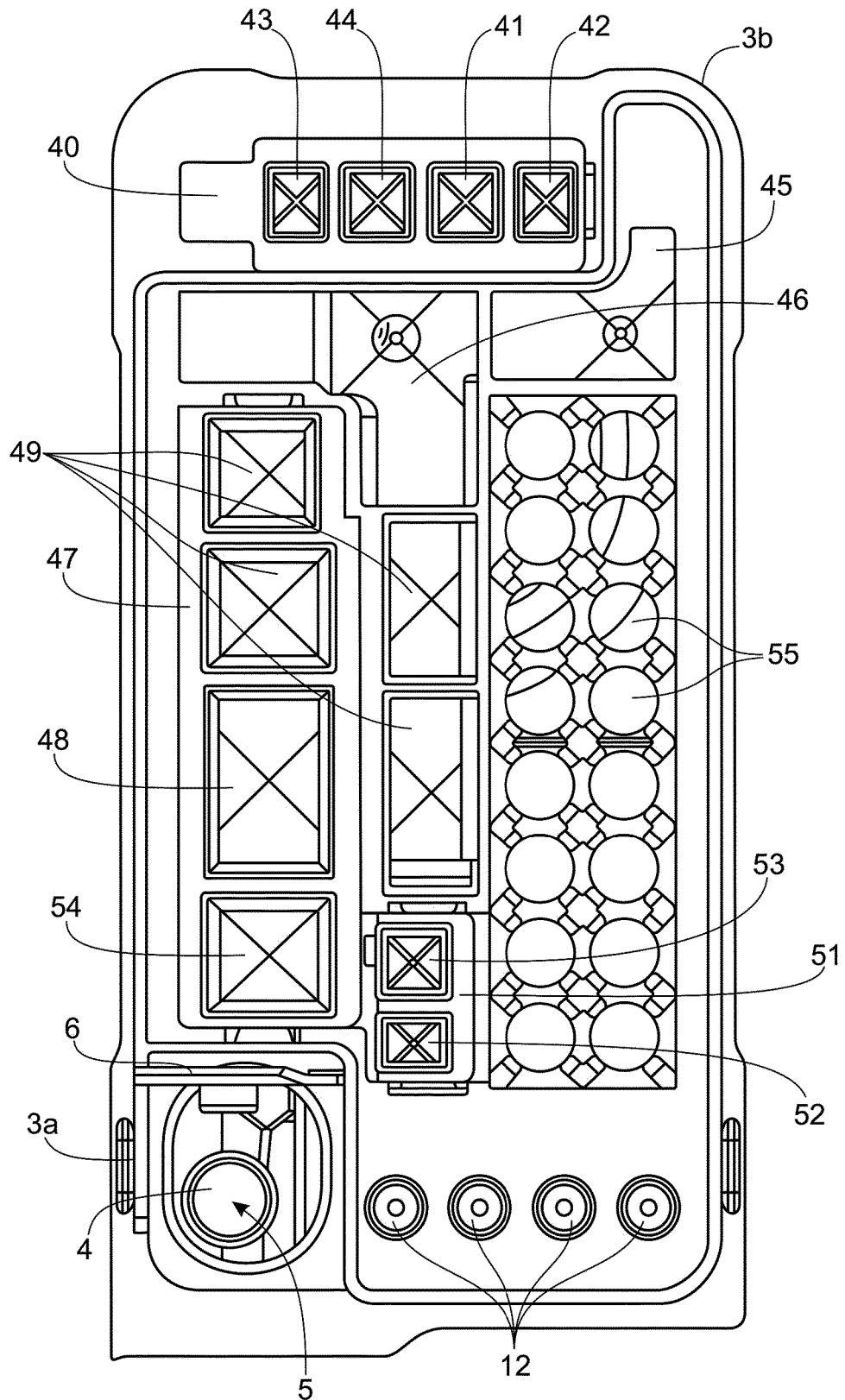
FIG. 5 shows the various reagent wells and mixing wells provided in the sample preparation cartridge of FIG. 1.

FIG. 5 shows the top deck 3 of the sample preparation cartridge 1, and illustrates the various wells which are used to contain and mix various different reagents in the process of preparing a sample for AST.

In particular, the top deck comprises a filtration inlet well 45, filtration outlet well 46, a plurality of concentration determination wells 12, a waste well 54 and a plurality of pipette tips 55. When ready to be received by the analysis instrument, the top deck 3 of the sample preparation cartridge 1 also comprises a frozen reagent insert 40 (which itself comprises a Proteinase K well 41, an ethanol well 42, a dye well 43 (containing the fluorescent stain) and a fastidious medium well 44), a CAMBH insert 47 (comprising CAMBH wells 48 and dilution wells 49) and a PBS and lysis buffer insert 51 (comprising a PBS well 52, and a lysis buffer well 53).

Finally, there are features of the sample preparation cartridge 1 and cartridge bay 220 which allow for correct alignment and positioning of the sample preparation cartridge 1 within the cartridge bay 220.

In this example, the outer dimensions of the sample preparation cartridge 1 are approximately 63×130×113 mm (W×D×H).

The sample preparation cartridge is a single-use device. As noted above, one suitable use for the sample preparation cartridge is in preparation of a sample for AST. However, the sample preparation cartridge is not limited to such a use.

Sample Holder

Figure 6:
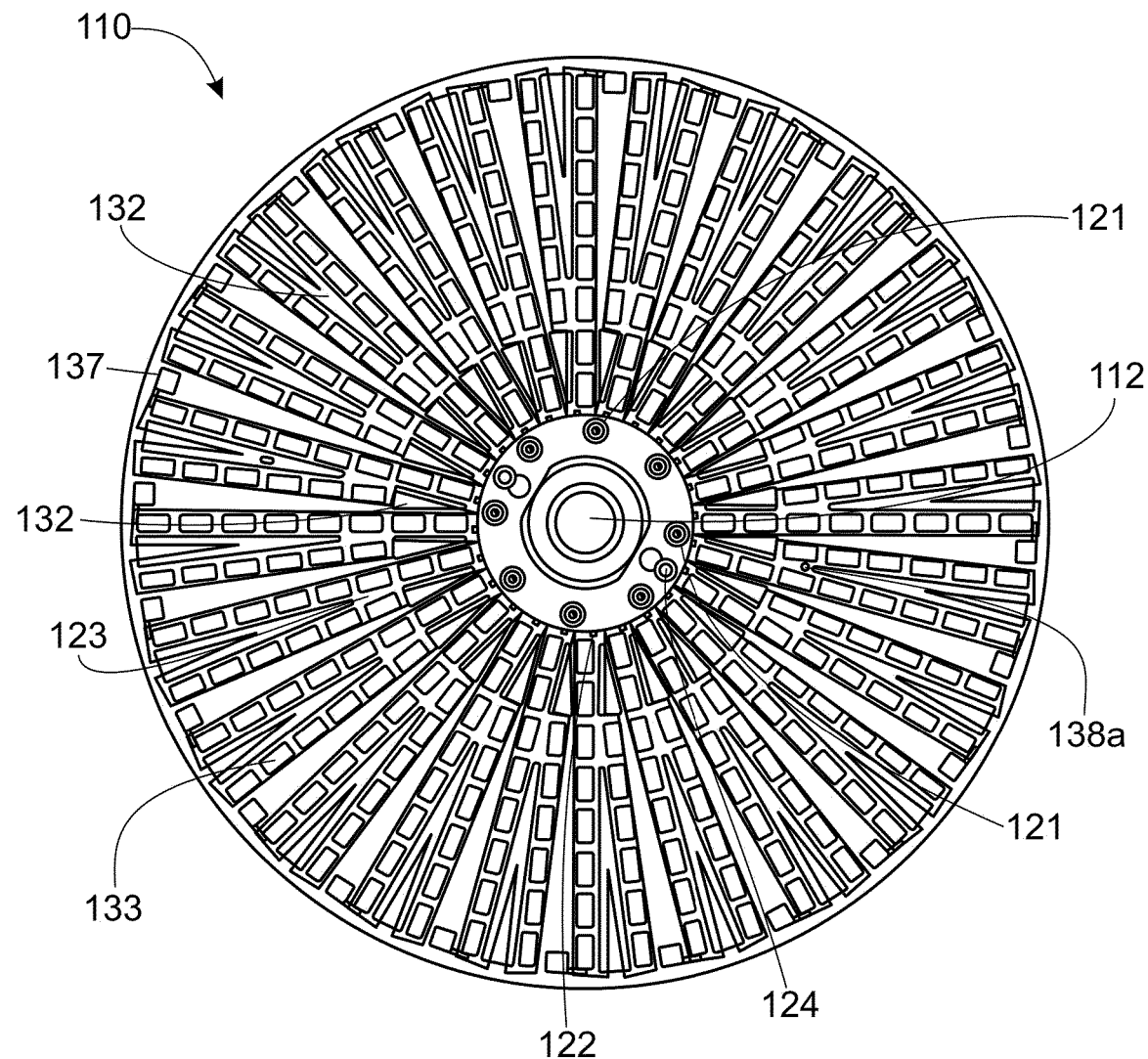
FIG. 6 shows an exemplary sample holder.

As shown in FIG. 6, the sample holder 110 has a circular disc shape, and in this case, comprises 336 sample chambers. The sample holder 110 comprises three layers (see FIG. 7 for example): an upper layer 120, a middle layer 130 and a lower layer 140, wherein the middle layer 130 is sandwiched between the upper layer 120 and lower layer 140.

As shown in FIG. 7, the middle layer comprises a main body 130a. As well as the main body 130a of the middle layer 130, a flexible membrane layer 130b and a magnetic metal layer 130c are provided between the upper layer 120 and lower layer 140 (on top of the main body 130a).

The flexible membrane layer 130b provides a sealing function to close off sample inlets to the sample holder 110, and comprises small holes (for example, pin holes) which can be opened under slight pressure, to allow sample to pass through the small holes.

The magnetic layer 130c allows the sample holder 110 to be moved or held in place using a magnet.

As shown in FIG. 7, the flexible membrane layer 130b and magnetic layer 130c only extend over an inner portion of the sample holder 110 (towards a radially inner area). The two layers are concentric, with the flexible membrane layer covering an outer annular area, and the magnetic layer covering an inner annular area, which overlaps slightly with the outer annular area.

The sample holder 110 in this example comprises a central hole 112. This central hole 112 may allow for placement of the sample holder 110 into an analysis device. In other embodiments, there is no central hole 112.

Figure 8:
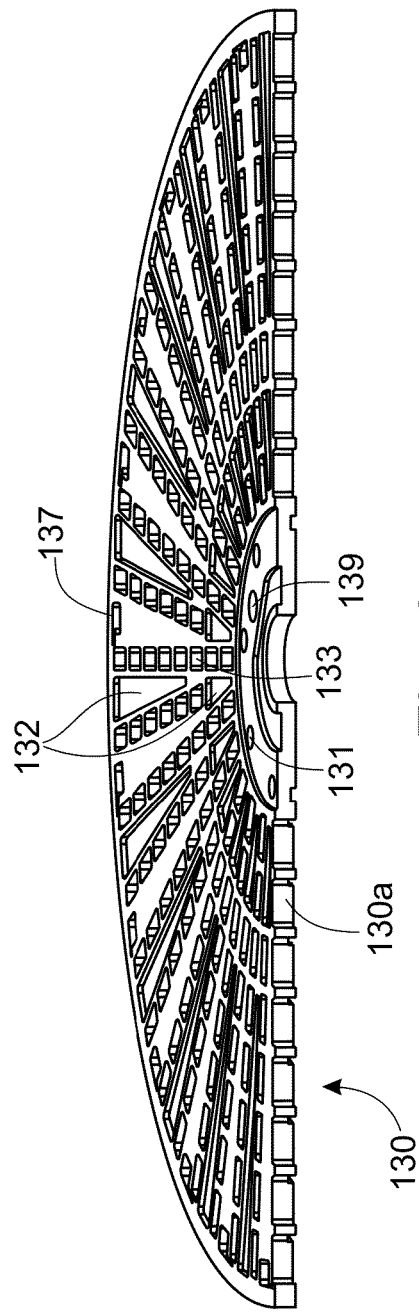
FIG. 8 shows a cut-away perspective view of a middle layer of the sample holder of FIG. 6.

The main body 130a of the middle layer 130 (best shown in FIG. 8) defines the main operational structures of the sample holder 110. The main operational structures comprise: a plurality of sample inlets 131, a plurality gas reservoirs 132, a plurality of sample chambers 133, a plurality of fluid filling channels 134, a plurality of branch channels 135, and a plurality of waste reservoirs 137. Also shown in FIG. 8 is a plurality of additional reservoirs 139. In this case, the additional reservoirs 139 are for receiving a sample for carrying out a concentration determination analysis. Instead, the additional reservoirs 139 may be used to hold a substance (for example, a reagent, in dried, liquid or lyophilized form) for use in an analysis, or for forming glue traps (such glue traps being provided to receive excess glue in embodiments in which the layers are glued together). As shown in FIGS. 6 and 7, additional inlets 124 to the additional reservoirs 139 may be provided in the upper layer 120.

Figure 9A:
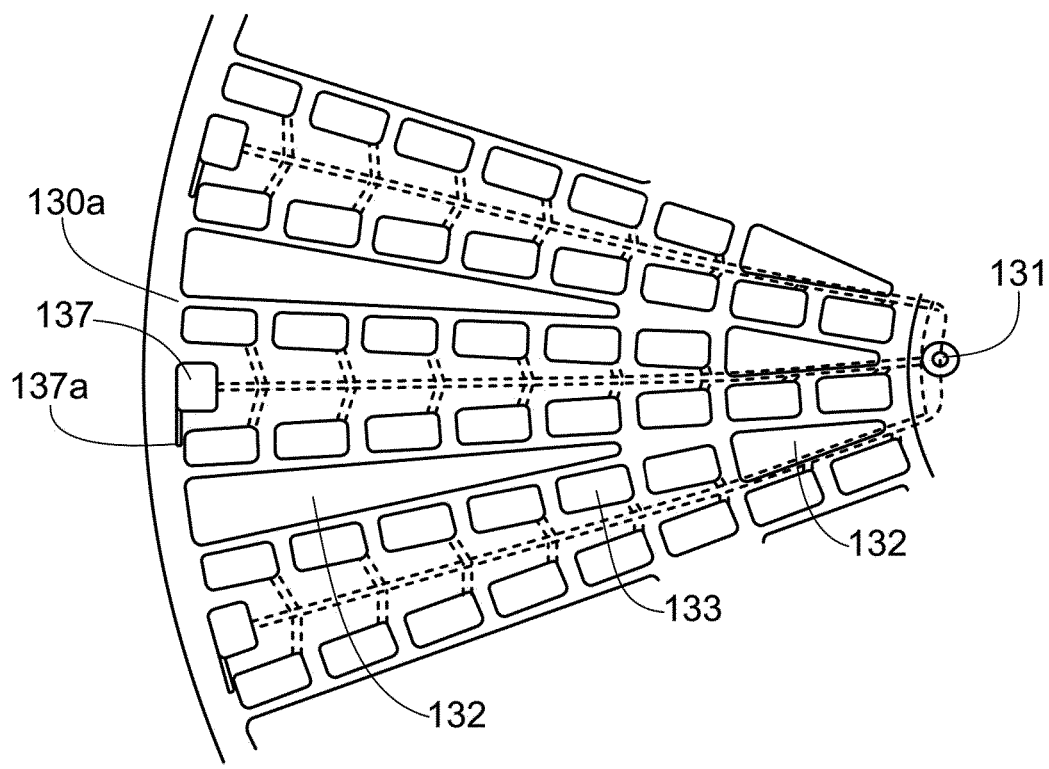
FIGS. 9A to 9C shows a fluidic network in the sample holder of FIG. 1 (FIG. 9A shows a top view of part of the sample holder, FIG. 9B shows a bottom view of part of the sample holder, and FIG. 9C shows a close up of a waste reservoir and the geometric restriction in the fluid filling channel leading into the waste reservoir)
Figure 9B:
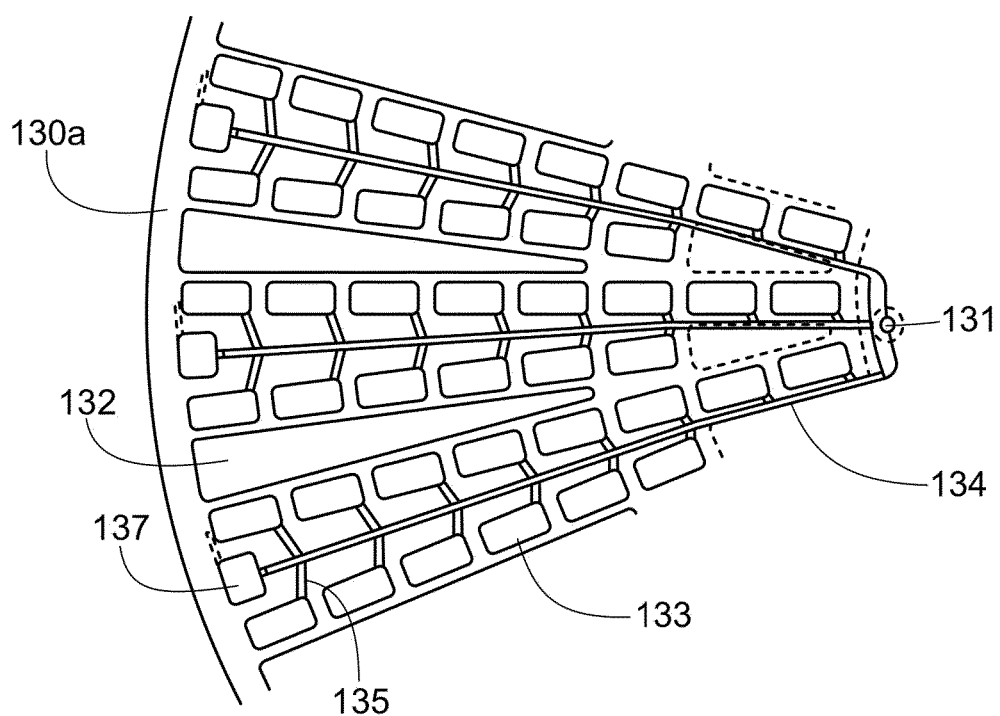

The locations of the gas reservoirs 132 are best shown in FIG. 9A, along with a plurality of sample chambers 133, a plurality of waste reservoirs 137 and an inlet 121. FIG. 9B shows the locations of the plurality of sample chambers 133, plurality of fluid filling channels 134, and plurality of branch channels 135, along with a sample inlet 131 and a plurality of waste reservoirs 137.

The sample inlets 131, sample chambers 133 and waste reservoirs 137 are formed from through-holes extending all the way through the main body 130a of the middle layer 130. The plurality of gas reservoirs 132 comprise blind holes extending downwardly from the top surface of the main body 130a of the middle layer 130 (i.e. the surface adjoining the upper layer 120). The plurality of fluid filling channels 134 and the plurality of branch channels 135 are formed as grooves in the bottom surface of the main body 130a of the middle layer 130 (i.e. the surface adjoining the lower layer 140). Thus, each fluid filling channel 134 and branch channel 135 is defined partially by the main body 130a of the middle layer 130 and partially by the upper surface of the lower layer 140.

As best shown in FIG. 9B, each fluid filling channel 134 extends from a sample inlet 131 to a waste reservoir 137. Each sample inlet 131 may be connected to a plurality of fluid filling channels 134; in FIG. 9B, three fluid filling channels 134 are connected to a sample inlet 131, i.e. each sample inlet 131 supplies sample to three fluid filling channels 134. Similarly, each waste reservoir 137 may be connected to a plurality of fluid filling channels 134, or may be connected to only one fluid filling channels 134; in FIG. 9B, just one fluid filling channel 134 is connected to a waste reservoir, i.e. each waste reservoir 137 receives waste from just one of the plurality of fluid filling channels 134.

As further shown in FIG. 9A, there is a venting channel 137a (formed in a top surface of the middle layer 130) which extends from the top of each waste reservoir 137 into an area where a micropillar array 123 is provided (as discussed in more detail below). This allows gas in the waste reservoir 137 to be vented to the atmosphere (via the micropillar array 123) as the waste reservoir 137 is filled with liquid.

Figure 9C:
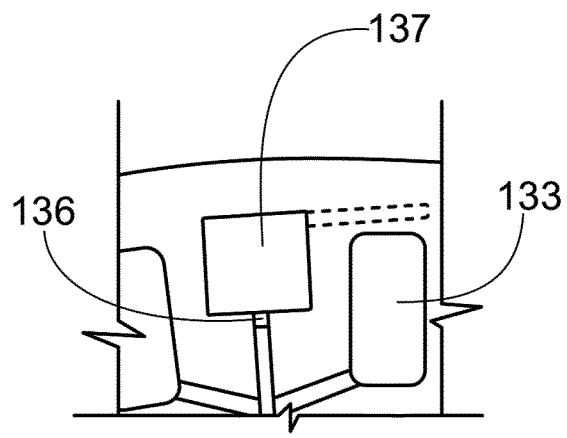

At the end of each fluid filling channel 134 where the fluid filling channel 134 connects to the waste reservoir 137, there is a geometric restriction 136 (see FIG. 9C) in the channel, i.e. the fluid filling channel 134 narrows at the point where it connects to the waste reservoir 137. The restriction 136 is mildly hydrophobic (which in this case is due to the intrinsic properties of the plastic used to manufacture the sample holder 110) and therefore the wetting resistance at this restriction 136 acts to stop the sample liquid from entering the waste reservoir 137 until the upstream fluid filling channel 134, sample chambers 133 and branch channels 135 are all filled with sample liquid.

The fluid filling channels 134 extend from the sample inlet 131 to the waste reservoir in a broadly radial direction. The sample inlet 131 is located at a radially inner position, and the waste reservoir 137 is located at a radially outer position.

A plurality of branch channels 135 extend from each fluid filling channel 134, and each branch channel 135 connects a single sample chamber 133 to the fluid filling channel 134. That is, multiple sample chambers 133 are connected to one fluid filling channel 134.

Each sample chamber 133 is effectively a blind chamber in respect of the sample liquid, i.e. it has a liquid inlet (via branch channel 135) but no liquid outlet. That is, each sample chamber 133 is isolated from the others. This minimizes the risk of diffusion of the sample and/or any substances from one sample chamber 133 to another.

As noted above, each fluid filling channel 134 and branch channel 135 is defined partially by the main body 130a of the middle layer 130 and partially by the upper surface of the lower layer 140. This means that the sample is introduced into the sample chambers 133 at the bottom of the sample chamber 133. This is advantageous in embodiments where a substance of some form is deposited on the lower surface of the sample chamber 133, as even mixing between the sample liquid and substance is then promoted. Moreover, filling from the bottom of the sample chamber 133 prevents the substance from being flushed out of the sample chamber 133.

The main body 130a of the middle layer 130 comprises an opaque material (in this case, polystyrene). In the embodiments shown herein, the main body 130a of the middle layer 130 is black. This ensures that, when a sample chamber 133 is optically read, the reading is not affected by spurious signals from neighboring sample chambers 133, or other structures in the middle layer 130. That is, the black opaque material of the main body 130a of the middle layer 130 provides optical isolation for each sample chamber 133 and reduces cross-talk between neighboring sample chambers 133.

The lower layer 140 comprises a flat planar disc. The lower layer 140 functions as an optical window for imaging of the sample chambers 133, and so has the property of being optically transparent to the wavelength(s) of light which are measured in the analysis.

The refractive index of the lower layer 140 is different from the refractive index of the contents of the sample chambers 133. In applications where the contents of the sample chambers 133 are imaged, such a feature allows the use of an autofocus system which detects the surface at which there is an interface between the lower layer 140 and the contents of the sample chambers 133, i.e. it detects the difference in refractive index of the lower layer 140 and the contents of the sample chambers 133. The lower layer 140 has a minimum thickness of 0.5 mm, as otherwise the autofocus unit may detect instead the surface at which there is an interface between the lower layer 140 and the air below, by detecting the difference in refractive index of the lower layer 140 and air.

To allow for rapid imaging with continuous focus, the lower layer 140 should be flat (i.e. the top and bottom surfaces of the lower layer 140 should be flat and parallel to one another). The surfaces of the lower layer 140 should be parallel within each sample chamber 133 to allow tracking autofocus, with a maximum deviation of the order of ±10 µm/cm. Any deviation from flatness across larger distances (for example, over a few centimeters) is less troublesome, as an autofocus system has more time to compensate for such defects.

Figure 10:
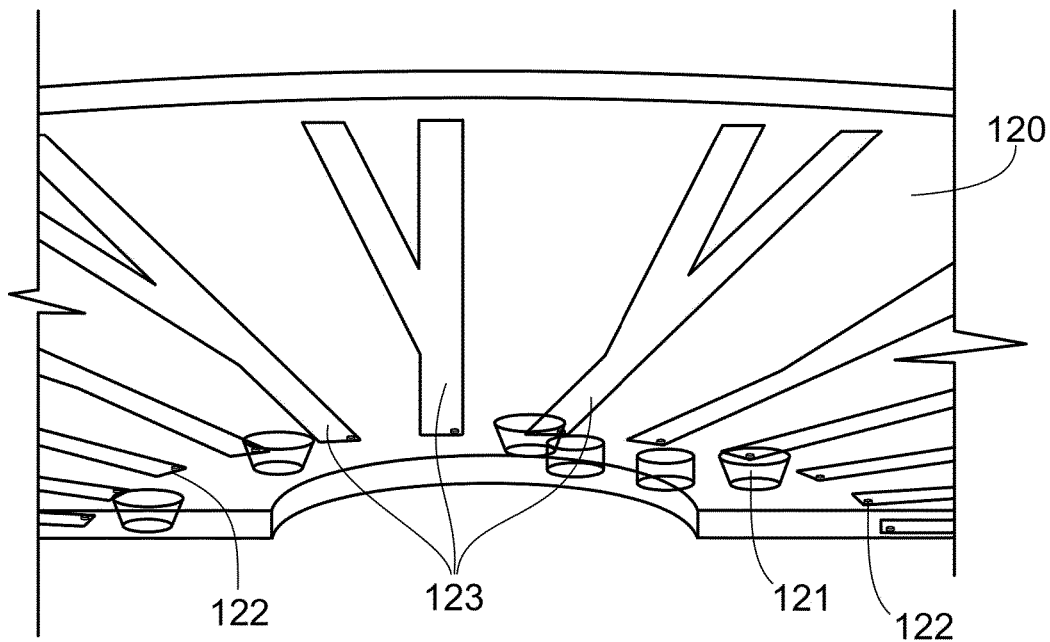
FIG. 10 shows an upper layer of the sample holder of FIG. 1.

The upper layer 120 covers the middle layer 130, and so acts as a lid which caps each of the sample chambers 133. Sample inlets 121 and gas vents 122 are provided in the upper layer 120, formed by through-holes extending all the way through the upper layer 120. These are best shown in FIG. 10. As further shown in this figure, the sample inlets 121 have a funnel shape (widest at the top surface of the upper layer, tapering to a minimum at the bottom surface of the upper layer) to provide a docking guide for an operator to dock a pipette to the sample inlet 121.

As shown in FIGS. 6 and 7, additional inlets 124 may be provided in the upper layer 120, to allow fluid to be introduced to the additional reservoirs 139 (shown in FIG. 8).

The bottom surface of the upper layer 120 (i.e. the surface of the upper layer 120 which faces the middle layer 130) comprises a micropillar array 123. The shape and positioning of the micropillar arrays are shown in FIGS. 6 and 10. From FIG. 6, it will be noted that the micropillar arrays 123 extend over the top of all of the sample chambers 133, over at least part of the periphery of the gas reservoirs 132, beneath a gas vent 122 and beneath a venting channel 137a extending from the waste reservoir 137. Gas exchange is possible between all of these locations, via the micropillar array.

From FIGS. 6 and 10 it will be appreciated that there are a plurality of micropillar arrays 123, each extending over a plurality of sample chambers 133. Each micropillar array 123 has a width slightly wider than the width of the sample chambers 133. The plurality of micropillar arrays 123 each extend in a broadly radial direction, following the radial lines of sample chambers.

In the embodiment of FIG. 10, the presence of the micropillars array 123 results in the bottom surface of the upper layer 120 covering the sample chambers 133 becoming hydrophobic. As a result, the bottom surface of the upper layer 120 covering the sample chambers 133 cannot be wetted by the sample in the sample chambers 133, and so the micropillar array acts to seal the sample in the sample chambers 133.

A second embodiment of the sample holder 110 is shown in FIGS. 11 to 16. The main differences between this embodiment and the previous embodiment are outlined below. For brevity, explanations of features which are identical to those in the preceding embodiment are not repeated here.

Figure 11A:
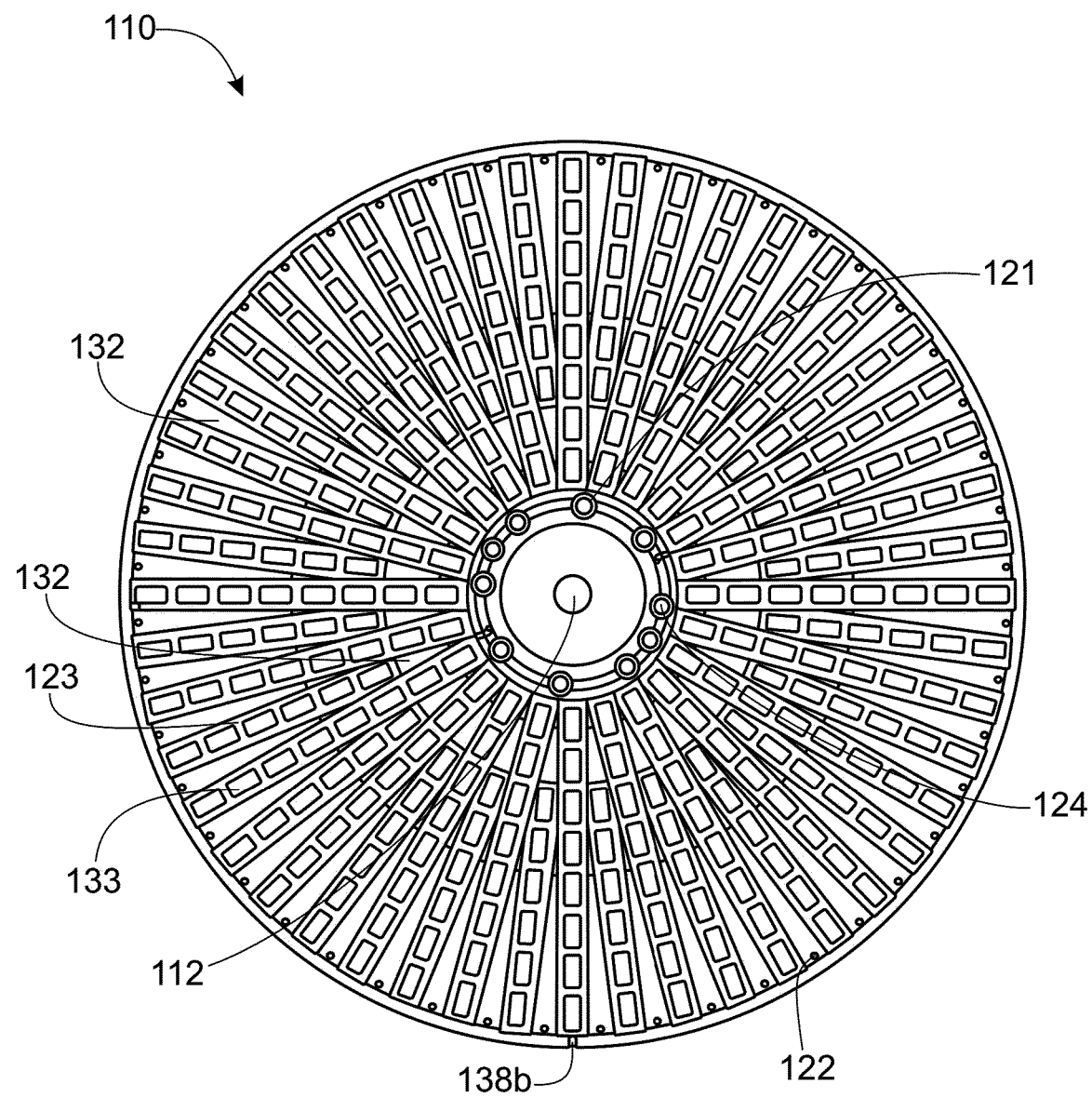
FIG. 11A shows a second exemplary sample holder.
Figure 11B:
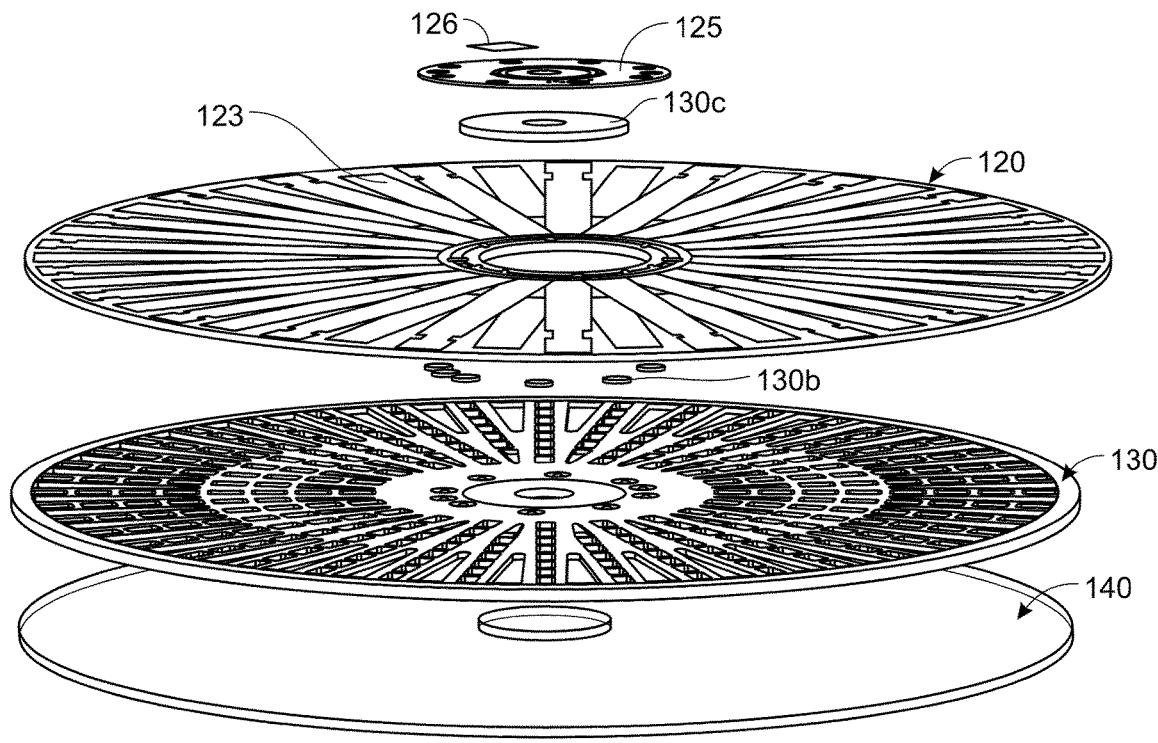
FIG. 11B shows the sample holder of FIG. 11A, in expanded view.
Figure 12:
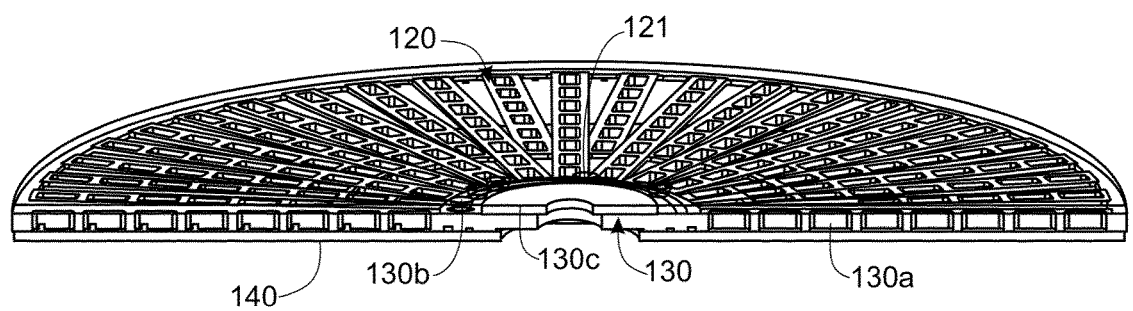
FIG. 12 shows a cut-away perspective view of the sample holder of FIG. 11.
Figure 13:
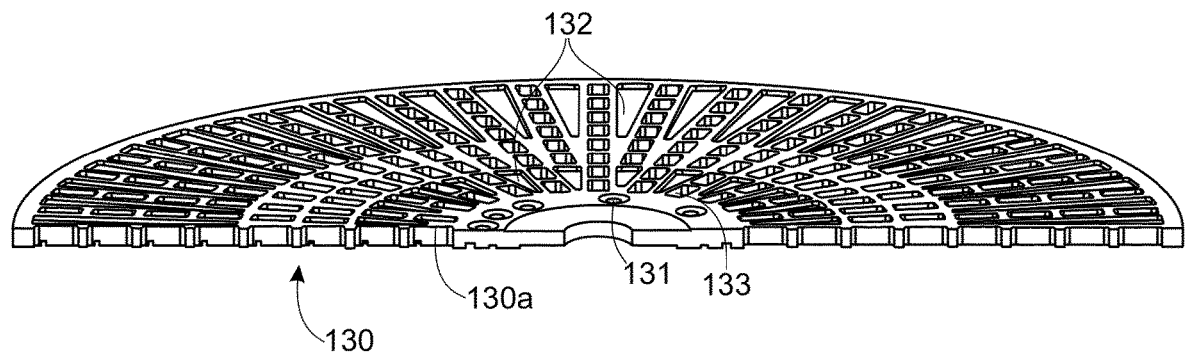
FIG. 13 shows a cut-away perspective view of a middle layer of the sample holder of FIG. 11.
Figure 14A:
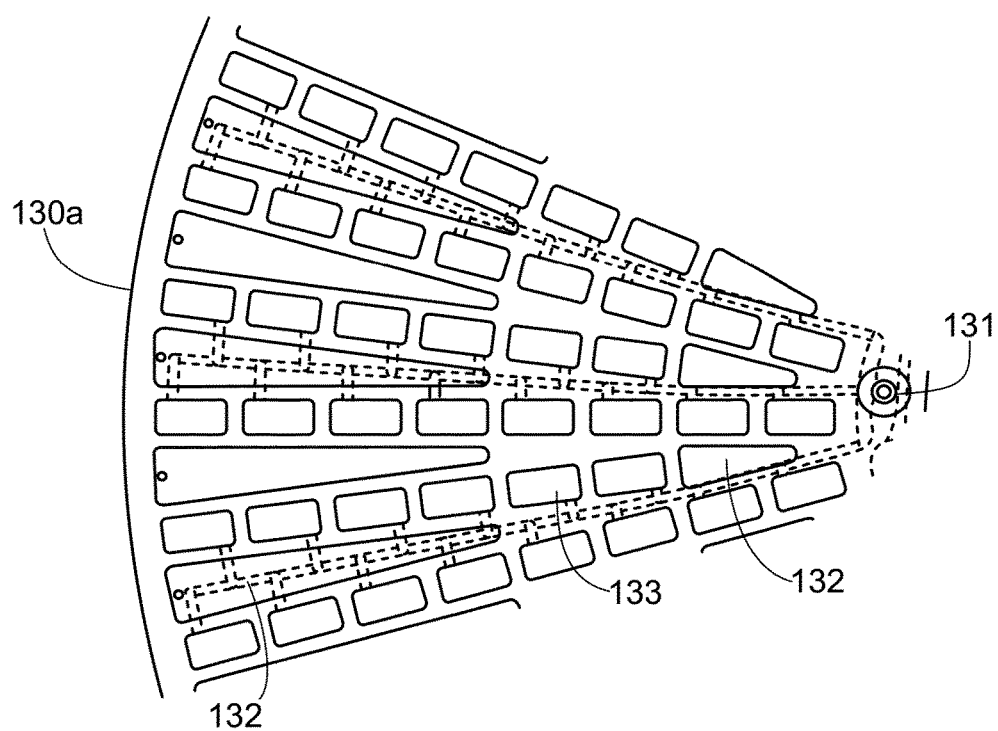

FIG. 11B shows that the sample holder 110 may comprise (affixed to the upper layer 120) a label 125 and/or QR code 126. The label 125 and QR code may be provided as one single label.

In the configuration shown in FIG. 11B, the flexible membrane layer 130b comprises a plurality of smaller membranes, for example, one for each sample inlet to the sample holder 110. In contrast, in the preceding embodiment, one membrane 130b is provided, covering all of the sample inlets.

As will be appreciated from FIGS. 11 to 16, the fluidic networks in this embodiment do not comprise dedicated waste reservoirs 137, as were present in the previous embodiment. This is especially clear from FIGS. 14A to 14D, which show a fluidic network. In particular, FIG. 14A shows a top view of part of the middle layer of the sample holder, FIG. 14B shows a bottom view of part of the middle layer of the sample holder, and FIGS. 14C and 14D show respectively a close-up view of the top and bottom of the middle layer. In this embodiment every other gas reservoir 132a also serves as waste reservoir. Only a small portion of the volume of the gas reservoir 132a is used for waste. These gas reservoirs 132a are isolated from the sample chambers 133 by the micropillars array 123, and so waste in the gas reservoir 132a cannot contaminate the sample chambers 133. FIGS. 14C and 14D shown that the gas reservoir 132a is connected to the end of the fluidic filling channel 134 via a through-hole 132b.

In contrast to the preceding embodiment, in this embodiment, there is no geometric restriction 136 between the end of the fluidic filling channel 134 and the gas reservoir 132a. Instead, the fluidic filling channel 134 itself acts as a flow restriction. The flow resistance within each sample chamber 133 is lower than the resistance in the fluidic filling channel 134, therefore the sample chambers 133 will be filled first, before waste flows into the gas reservoir 132a.

Figure 15A:
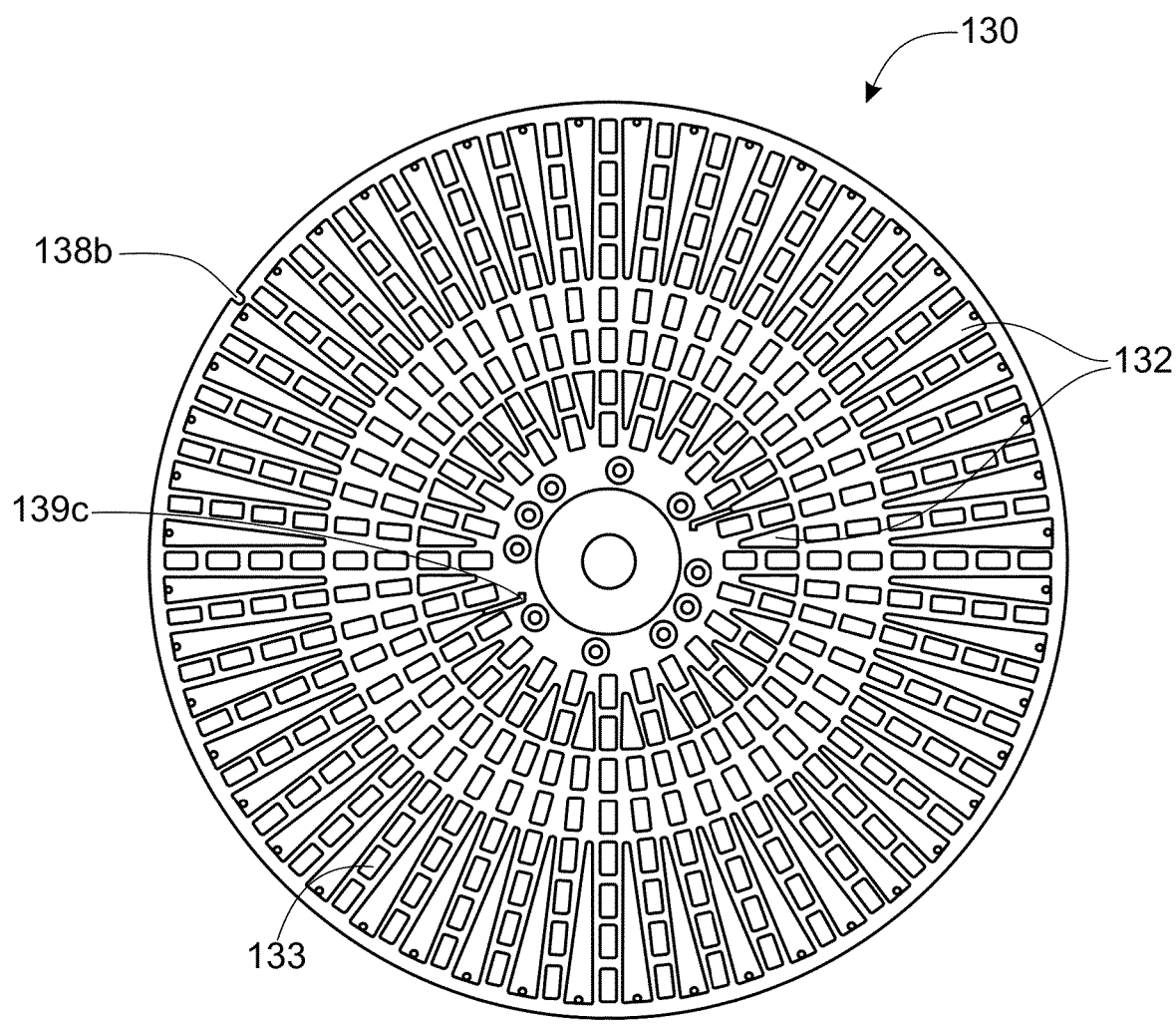
FIG. 15A shows a top view of the middle layer of the sample holder of FIG. 11.
Figure 15B:
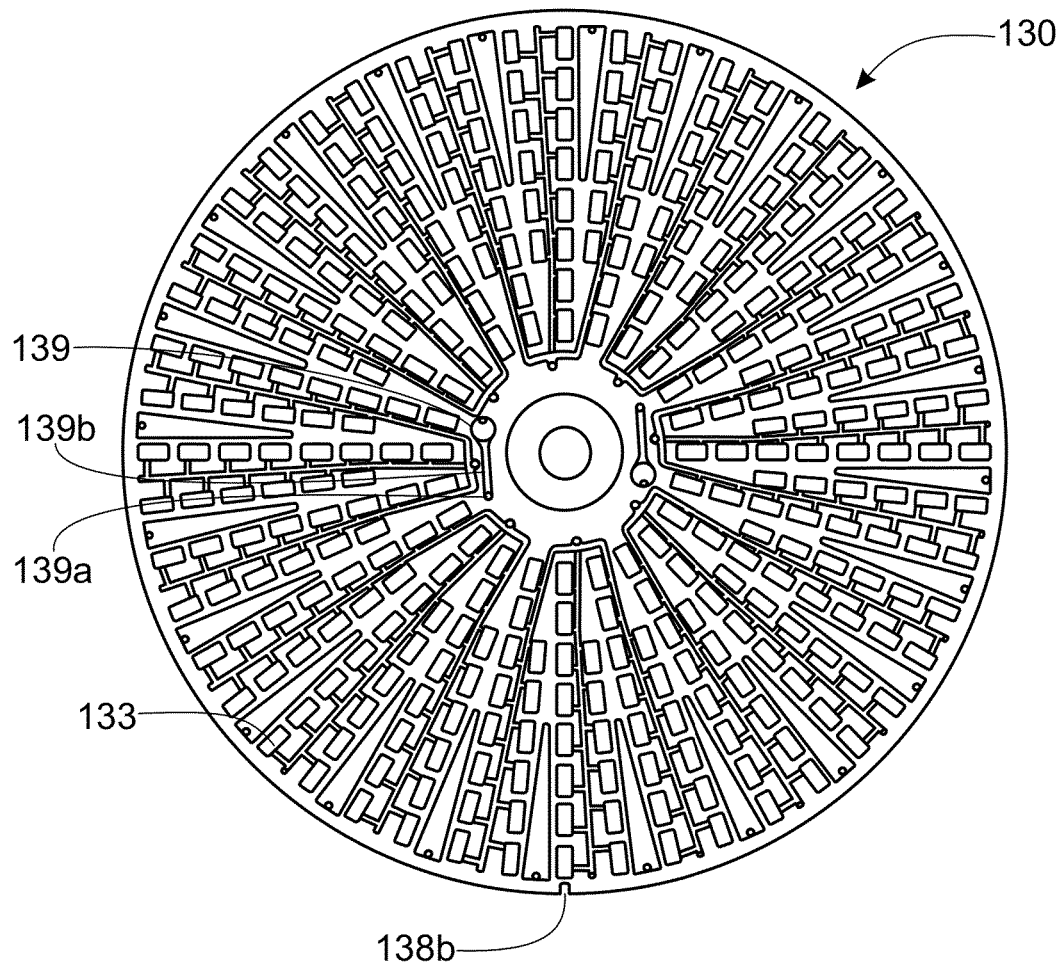
FIG. 15B shows a bottom view of the middle layer of the sample holder of FIG. 11.
Figure 15C:
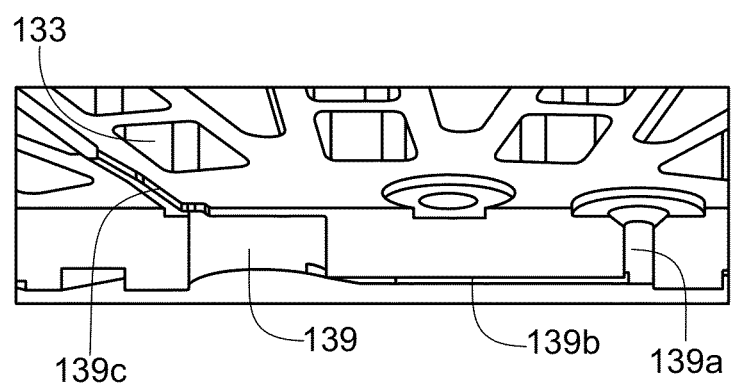
FIG. 15C shows a partial cutaway perspective view of the middle layer of the sample holder of FIG. 11.

FIG. 15C shows a partial cutaway perspective view of the middle layer of the sample holder of FIG. 11. This figure particularly shows that the additional reservoirs 139 are filled through corresponding inlets 139a, and inlet channels 139b. They are vented via vent channel 139c. The same structure may also apply to the embodiment of FIG. 6.

Figure 16:
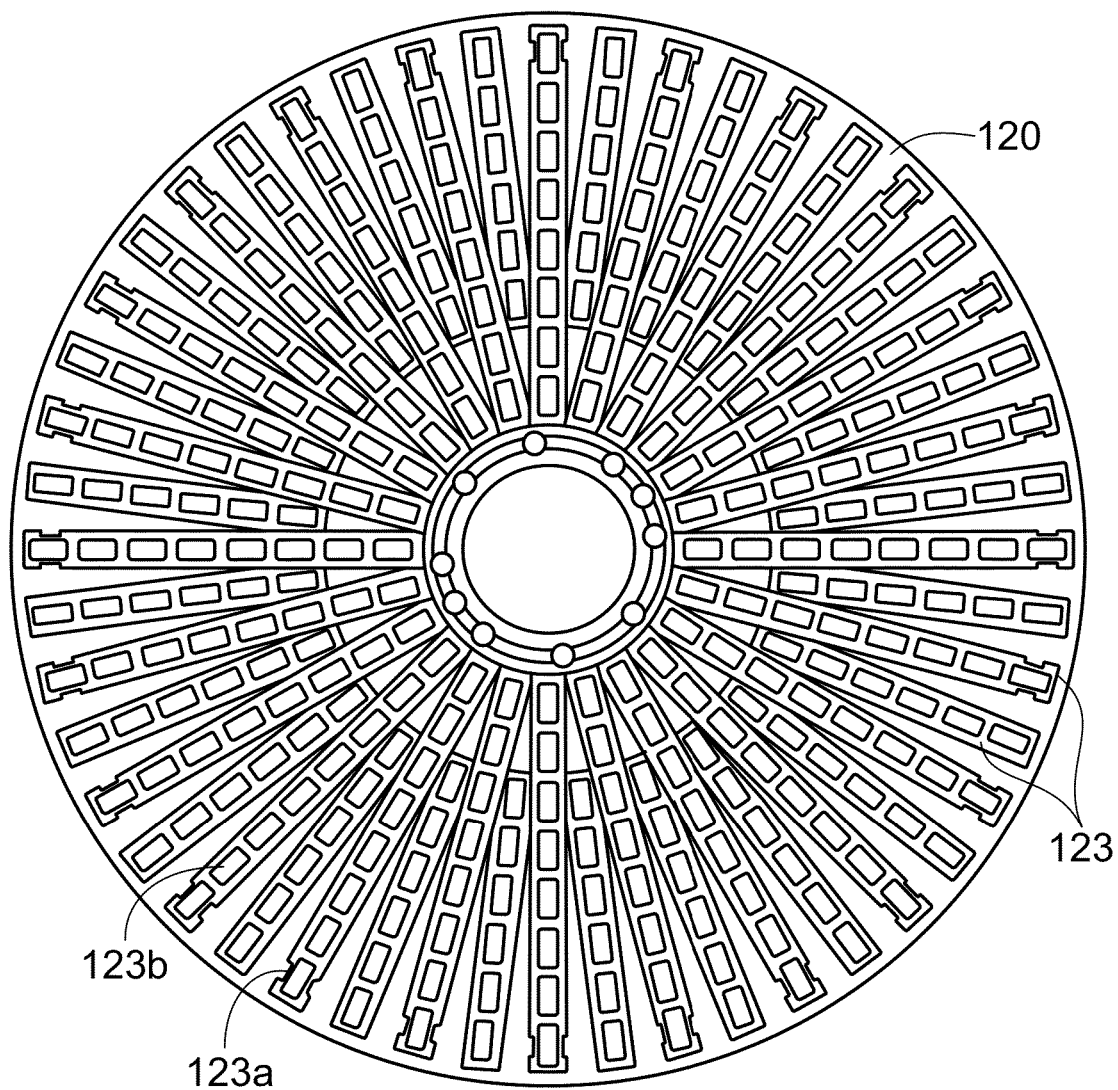
FIG. 16 shows a top layer of the sample holder of FIG. 11.

FIG. 16 shows a top layer of the sample holder of FIG. 6. Of note here is that some of the micropillar arrays 123 shown in FIG. 16 have a shape facilitating alignment with the sample chambers below, during manufacture of the sample holder. In this embodiment, every other micropillar array 123 (i.e. alternate micropillar arrays) comprises a narrowed portion 123a where the width of the micropillar array 123 narrows to be only slightly wider than the width of a sample chamber 133. This narrowed portion 123a is provided at a position along the micropillar array 123 to align with the radially outermost sample chamber 133.

Of further note is that FIG. 16 shows micropillar arrays 123 which extend only around the upper periphery of each sample chamber 133, not over the entire upper surface of the sample chamber 133. Parts 123b are not provided with micropillars. The micropillars arrays 123 nevertheless act to seal the sample in the sample chambers 133.

In the foregoing embodiments, the micropillars 123a forming the micropillar array 123 have a height of approximately 100 μm and a diameter of approximately 80 μm, in this example. The center-center distance (separation distance) between adjacent micropillars 123a is approximately 100 μm.

Figure 18:
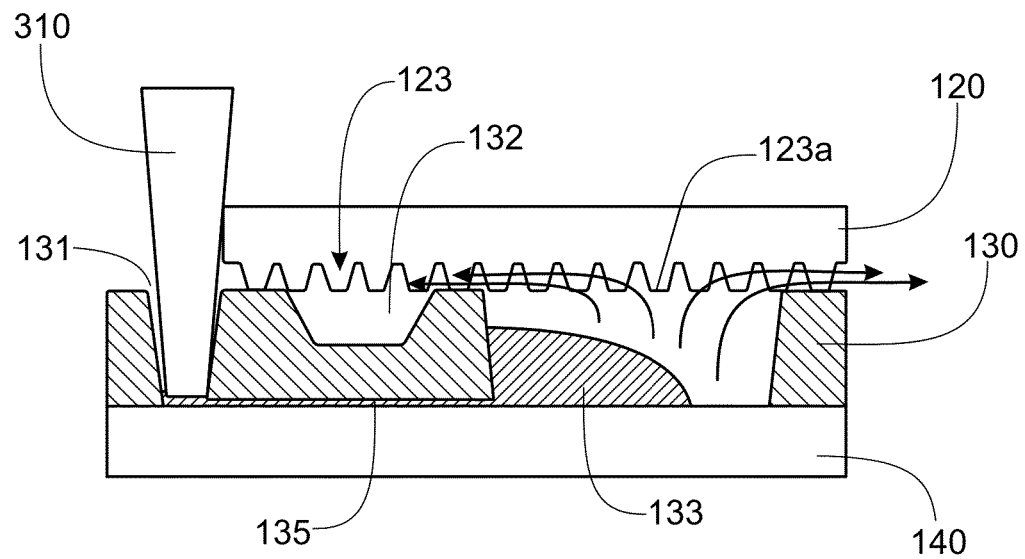
FIG. 18 shows sample liquid being introduced into a sample chamber of a sample holder.
Figure 19:
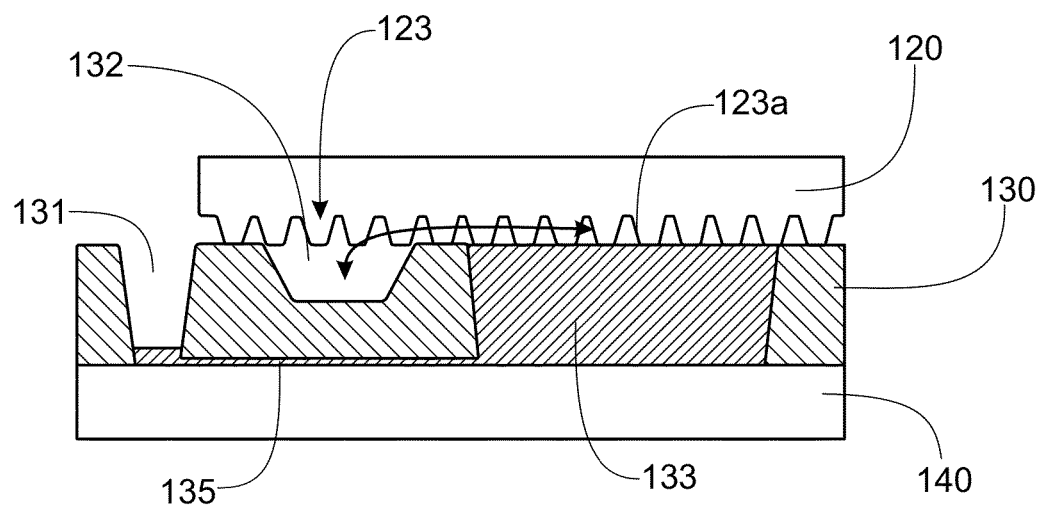
FIG. 19 shows the sample liquid filled into the sample chamber of FIG. 18, and gas exchange from a gas reservoir.

The micropillars 123a in this example have a frustoconical shape, as shown in FIGS. 18 and 19. Such a shape is advantageous as it is easily formed by injection molding.

The upper layer 120 is at least semi-transparent in order to allow for the sample chambers 133 to be illuminated for imaging.

To manufacture the sample holder 110, the upper layer 120, main body 130a of the middle layer 130 and lower layer 140 are each produced by injection molding polystyrene, to form the necessary structure of each layer. For example, the upper layer 120 may be molded as a flat disc including through-holes for forming sample inlets 121 and gas vent 122. The main body 130a of the middle layer 130 may be molded as a flat disc including through-holes for forming sample inlets 131, a plurality of sample chambers 133, and a plurality of waste reservoirs 137, blind holes for forming a plurality of gas reservoirs 132, and grooves for forming a plurality of fluid filling channels 134 and branch channels 135.

The lower layer 140 may be molded as a flat disc including indentations forming focus-verification structures. These may be aligned with one or more of the sample chambers 133, such that the focus-verification structures are present in the base of one or more of the sample chambers 133.

Figure 17A:
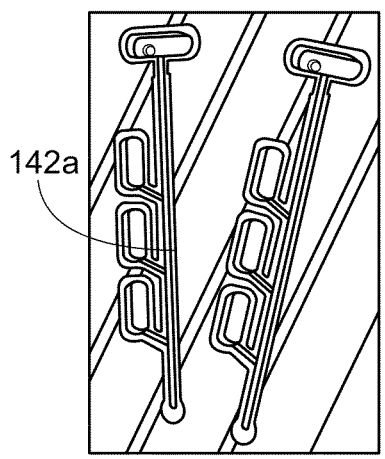
FIGS. 17A to 17C illustrates exemplary bonds between the lower layer and the middle layer (FIGS. 17A and 17C) and the upper layer and the middle layer (FIG. 17B)
Figure 17B:
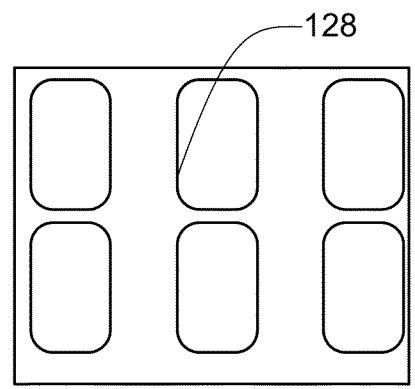
Figure 17C:
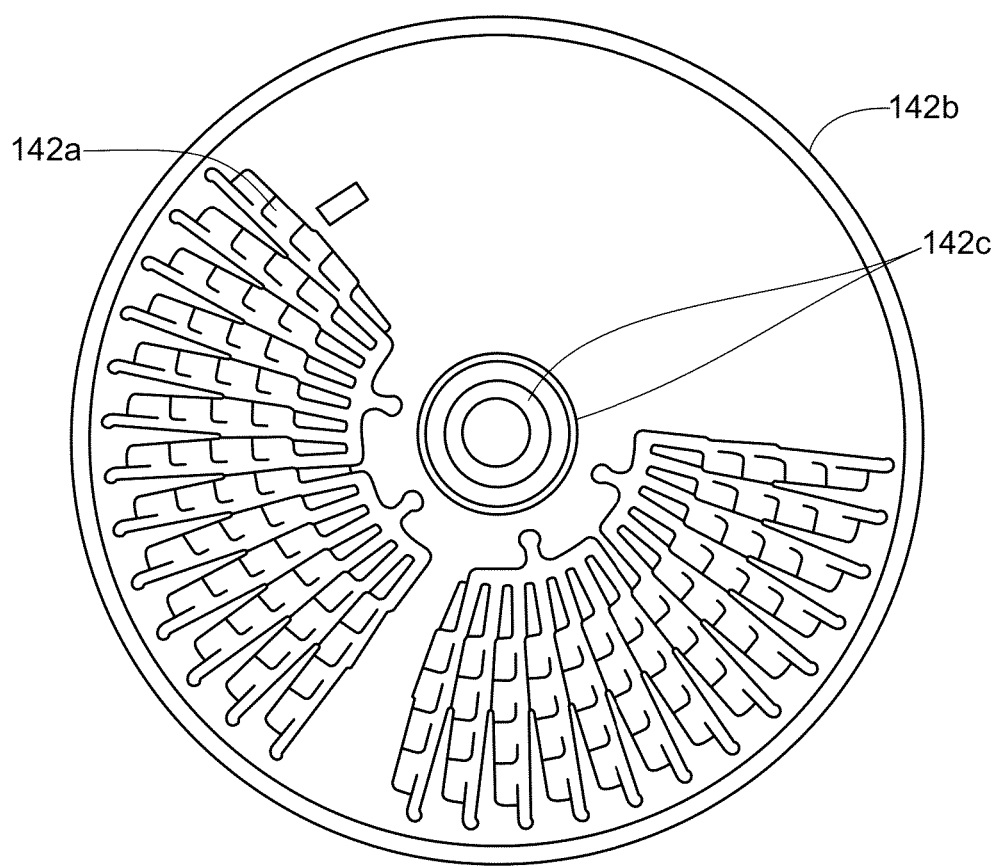

The three layers 120, 130, 140 are joined together by laser welding to create a leak proof, irreversible bond along the welding pattern. FIGS. 17A to 17C show exemplary laser welds. FIGS. 17A and 17C show welds 142a, 142b, 142c between the lower layer 140 and middle layer 130, and FIG. 17B shows welds 128 between the upper layer 120 and middle layer 130.

FIG. 17C illustrates an exemplary bonding pattern used to bond the lower layer 140 to the middle layer 130. An outer seal weld 142b is provided round the outer edge of the sample holder 110. In this example, two inner seal welds 142c are provided round the inner edge of the sample holder 110. Then, a plurality of network welds 142a (also shown in FIG. 17A) are provided to prevent fluid leakage out of each fluidic network. Not all of the network welds are shown. Specifically, each network weld 142a is provided partially around the sample inlet 131, along the fluid filling channels 134 connected to the sample inlet 131, and partially around each sample chamber 133 in the fluidic network. The network welds 142a do not completely surround the sample chamber 133 to avoid welding closed the inlet to the sample chamber 133.

The inner and outer welds 142c, 142b are present for safety reasons, to decrease the risk of leakage out from the sample holder 110. These welds are therefore wider than the network welds 142a. Typically, the inner/outer welds 142c, 142b welds may have a width of the order of a few millimeters, for example 0.5 to 13 mm, optionally 1 to 2 mm. Additionally or alternatively, a plurality of welds may also be provided (for example, in FIG. 17D two inner welds 142c are provided).

The network welds 142a typically have a thickness of 0.1 to 0.6 mm, optionally 0.2 to 0.4 mm.

The positioning of the bonding may be used to control gas exchange within the sample holder 110 (for example, to allow gas exchange with the atmosphere, or only with gases provided in certain gas reservoirs), i.e. by isolating portions of the sample holder 110 from other portions, and/or from the atmosphere. This allows different conditions to be applied in different portions of the sample holder.

Where a bond is present between an area of the micropillar array 123 (on the upper layer 120) and the middle layer 130, only the micropillar tips are bonded to the middle layer 130, to maintain the spacing between the micropillars.

In use, the sample is supplied into the middle layer 130 via the sample inlet port 121 of the upper layer 120 and the inlet 131 of the middle layer, into the fluid filling channels 134. For example, the sample is supplied into the sample holder 110 via a pipette 310 (shown in FIG. 18). The pipette tip is docked to the sample inlets and pressurized by actuating the pipette plunger. Air present in the fluid filling channels 134, branch channels 135 and sample chambers 133 is evacuated through the micropillar array on the top layer 120. When the liquid front reaches the micropillar surface in a sample chamber 133 it will stop, as the hydrophobic surface constitutes a barrier (see FIG. 19). Propagation of the sample liquid will instead continue in other parts of the fluid network (for example, other sample chambers 133 connected to the fluid filling channel 134 may fill up). When filling the sample holder of the first embodiment (shown in FIGS. 6 to 10), the geometric restriction 136 positioned at the end of each fluid filling channel 134, where the fluid filling channel 134 meets the waste reservoir 137, ensures that the liquid front stops at this position, as long as any sample chambers 133 remain to be filled (due to the hydrophobic nature of the restriction 136, which provides a wetting resistance). The restriction to the waste reservoir is greater than the inlet restriction to ensure all sample chambers 133 are filled.

When all sample chambers 133 connected to a given sample inlet 131 are full, the liquid front will pass through the geometric restriction 136.

When filling the sample holder of the second embodiment (shown in FIGS. 11 to 15), the restriction to fluid flow into the gas reservoirs 132a (which serve as waste reservoirs) is due to the restriction to flow imposed by the fluid filling channel 134 itself. There is no geometric restriction 136 in this embodiment. The flow resistance within each sample chamber 133 is lower than the resistance in the fluidic filling channel 134, therefore the sample chambers 133 will be filled first, before waste flows into the gas reservoir 132a. When all sample chambers 133 connected to a given sample inlet 131 are full, the liquid front will pass through to the waste reservoir 132a.

The final step in the filling sequence is to evacuate the fluid filling channels 134. This is achieved by docking an air-filled pipette to the sample inlets 121, 131 and actuating the plunger. The liquid in the fluid filling channels 134 is then pushed through the geometric restriction 136 into the waste reservoir 137. This leaves the fluid filling channels 134 filled with air, and the branch channels 135 and sample chambers 133 filled with sample. Each sample chamber 133 (and associated branch channel 135) is therefore isolated from the other. Thus, there is no possibility of contamination between sample chambers 133.

As the branch channels 135 retain a small amount of sample (once the sample has been introduced into the sample holder 110), they can be used as a sample top-up reservoir to maintain the level of fluid in the sample chamber 133, in the event that some of the sample in the sample chamber 133 evaporates during the analysis.

The sample holder 110 is a single-use plastic device. One suitable use for the sample holder 110 is in antimicrobial susceptibility testing (AST). In such an analysis, a sample containing a pathogen is cultured in the presence of various antimicrobial substances at different concentrations. In this case, the antimicrobials are dispensed into the sample chambers and dried (for example, antimicrobials are provided in dried, liquid or lyophilized form), as part of the production process for manufacturing the sample holder 110. Each radial line of sample chambers 133 contains the same antimicrobial in different concentrations.

As mentioned above, focus-verification structures (for example, pyramid-shaped indentations), may be provided in the lower layer 140. Such structures are described in Q-Linea AB's co-pending application PCT/EP2017/064715. The focus-verification structures may be provided in the bottom of each sample chamber 133, at the end of each channel 134, adjacent each sample chamber 133 or adjacent each fluid filling channel 134. In another arrangement, each channel 134 may have a plurality of associated focus-verification structures spaced at set distances from the center of the sample holder 110, such that the focus-verification structures lie along concentric circles centered on the center of the sample holder 110. The focus-verification structures may be provided between adjacent sample chambers 133, spaced inwardly of the outer width of the sample chambers 133.

The Analysis Instrument

Particular elements of the instrument itself will now be described in greater detail, by way of example only and with continuing reference to the appended drawings.

The analysis instrument described below, when used in conjunction with the described consumables, may provide fully automated antibiotic susceptibility testing, providing MIC and SIR data within 3 to 12 hours, for example 3 to 6 hours (for certain combinations of pathogens and antimicrobial agents) with a throughput of up to 50 samples per 24 hours.

In the following discussion, reference is made to X, Y and Z directions in the analysis system. The coordinate system is defined as follows: the positive Z-axis points upwards, the positive X-axis points to the right when viewing the front of analysis instrument (the front is the side of the analysis instrument which the user interacts with), and the positive Y-axis points to the rear of the analysis instrument (the rear of the instrument is the side of the analysis instrument opposite the front).

Figure 20:
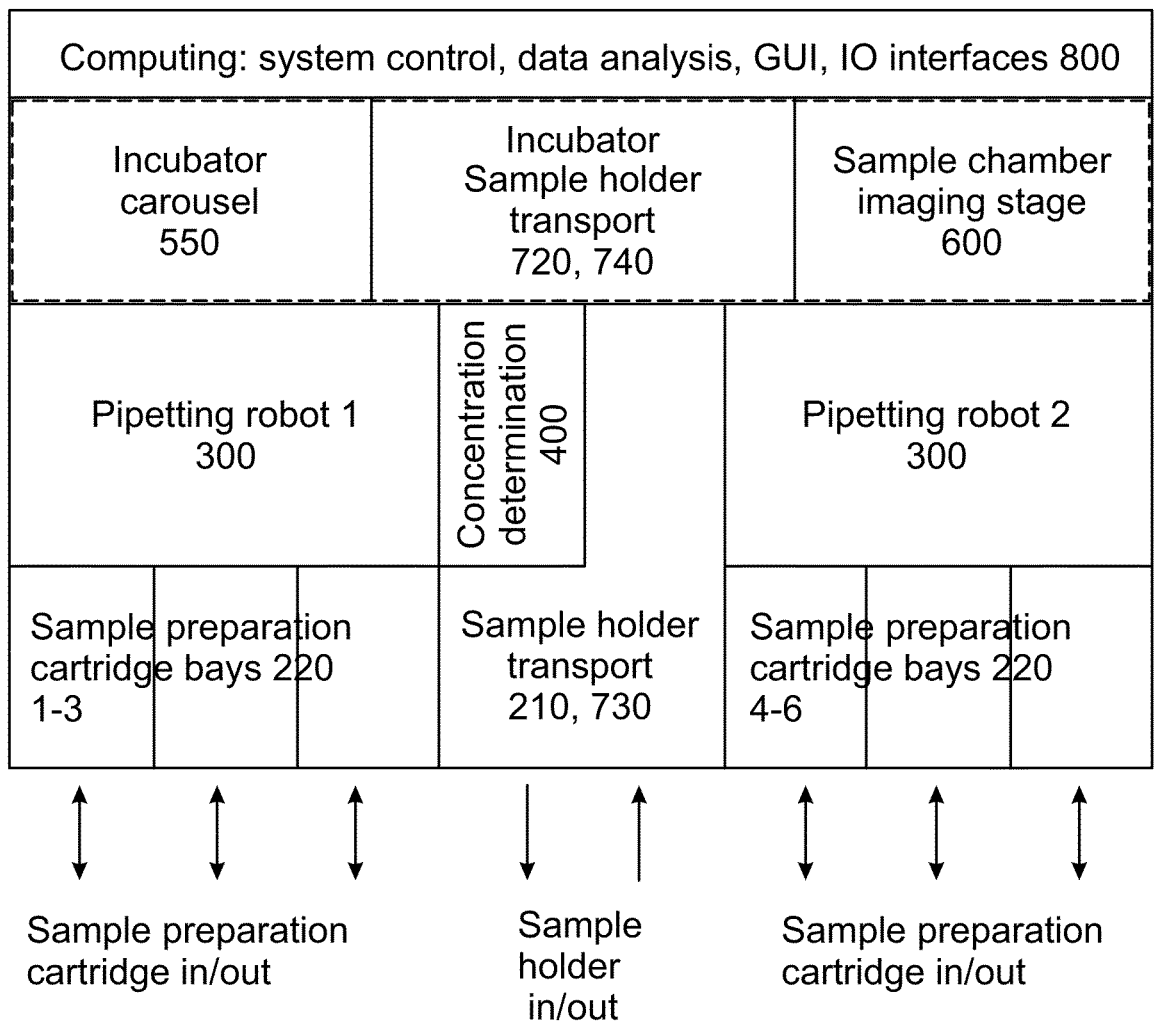
FIG. 20 shows the analysis instrument schematically.
Figure 21A:
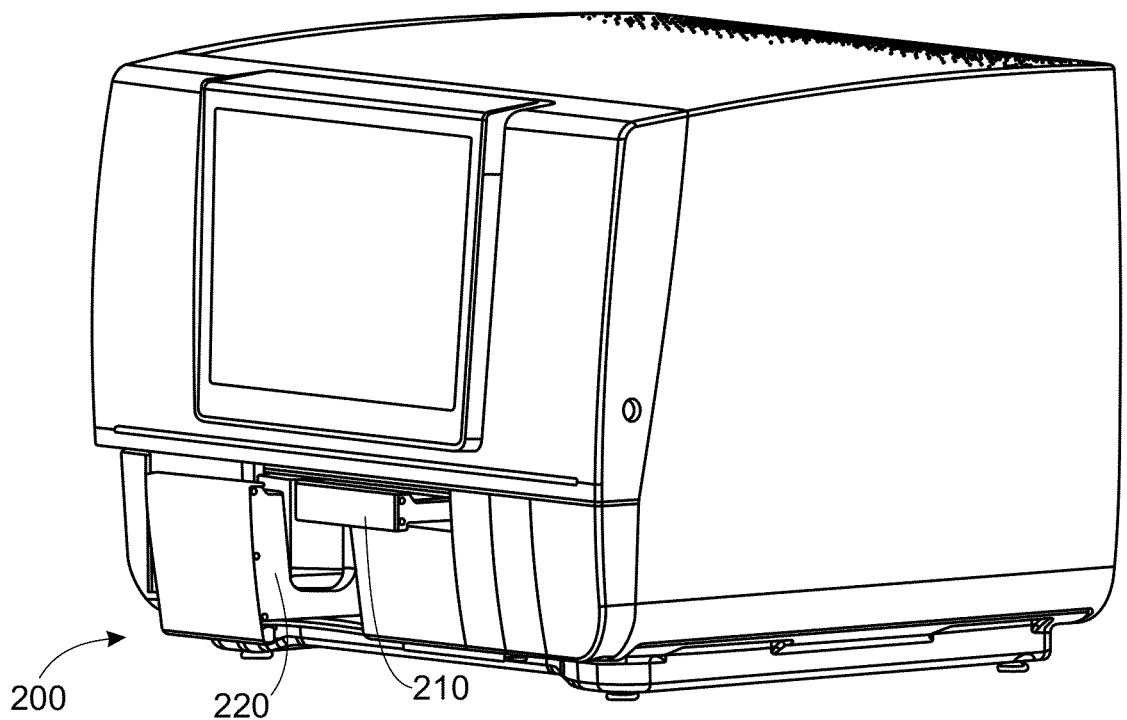
FIGS. 21A and 21B show the front chassis of the analysis instrument.
Figure 21B:
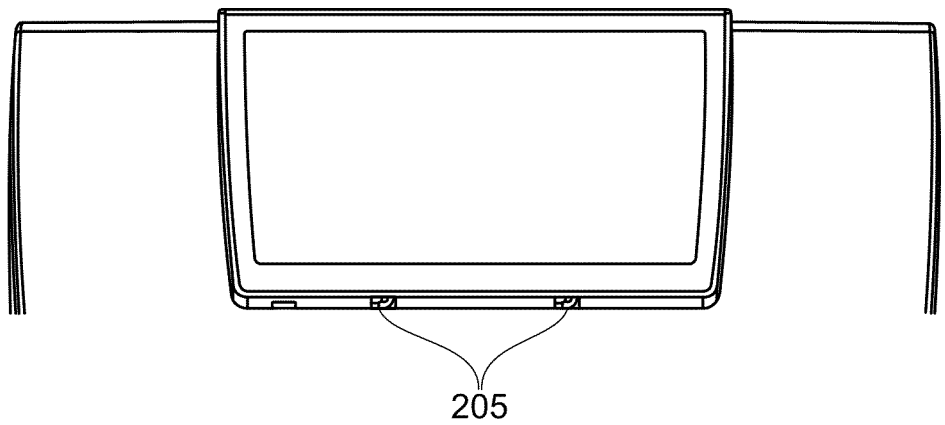

The analysis instrument 1000 is shown schematically at FIG. 20. As will be clear from the figure, the analysis instrument comprises:

- A consumable input stage 200 (comprising a sample holder receiver 210, and a plurality of cartridge bays 220);
- A pipetting stage, comprising two pipette robots 300;
- A concentration determination stage 400;
- An incubator 500;
- A sample chamber imaging stage 600;
- A sample holder transport sub-system 700; and
- A computing sub-system 800.

Consumable Input Stage

The consumable input stage 200 comprises:
- 1 sample holder receiver 210;
- 6 sample preparation cartridge bays 220;
- 2 barcode readers 205, capable of reading barcodes or QR codes provided on the sample holders and sample preparation cartridges.

The sample holder receiver comprises a slide-out tray (similar to a CD tray interface, as is well known in the art). The slide-out tray may open and close by a command input by the user via the touch-screen interface.

The sample preparation cartridge bays are described in greater detail below.

The barcode readers 205 are provided on the front of the analysis instrument (the front of the analysis instrument is the face that the user interacts with), mounted beneath a touch-screen for user interface (described in greater detail below).

A first barcode reader 205 is configured to read a barcode or QR code provided on each sample holder. The barcode/QR code allows the system to determine whether the sample holder is a valid sample holder (for example, one than can be used by the system, or one that is manufactured by an approved manufacturer), and also to determine what type of sample holder is received. For example, the barcode/QR code may be read to determine whether the sample holder is a single sample or multi-sample sample holder, and/or may be read to determine the geometry of the sample holder, and/or may be read to determine what set of antimicrobial agents are provided.

The first barcode reader 205 scans the barcode/QR code on the sample holder automatically as the sample holder is moved into the analysis instrument by the sample holder receiver (i.e. as the sample holder receiver closes). Alternatively, the barcode reader may read the barcode/QR code before the sample holder receiver begins to close.

In the event that the sample holder is not valid for use with the system, the user is informed accordingly by a message on the touch-screen. If the sample holder is not valid for use with the system and the sample holder receiver 210 has closed, the sample holder receiver may slide open to allow the user to remove the invalid sample holder. Otherwise, if the sample holder receiver has not closed, the sample holder receiver then may not close, to enable the user to remove the invalid sample holder.

A second barcode reader is positioned above the sample holder waste station. A barcode is provided at the base of the sample holder waste station, visible to the second barcode reader only when there are no sample holders in the sample holder waste station and the waste station is in the out/open position, i.e. the position in which spent consumables can be removed. This allows the analysis instrument to confirm that all sample holders have been removed from the sample holder waste station—this can be confirmed when the second barcode reader can view the barcode at the base of the sample holder waste station.

The second barcode reader 205 is also configured to read barcodes or QR codes provided on each sample preparation cartridge 1. A plurality of barcodes/QR codes are provided on each sample preparation cartridge. A first barcode/QR code identifies the sample, i.e. it identifies the patient who provided the sample. A second barcode/QR code allows the analysis instrument to determine whether the sample preparation cartridge is a valid sample preparation cartridge (for example, one than can be used by the analysis instrument, or one that is manufactured by an approved manufacturer). Where the sample preparation cartridge comprises snap-in components (for example, a snap-in to the top deck containing reagents for use by the sample preparation cartridge), then a further barcode/QR code allows the analysis instrument to verify that the snap-in is present, and to identify the snap-in and verify that it is valid.

The barcodes/QR codes on the sample preparation cartridge are scanned manually by the user prior to the sample preparation cartridge being placed into a cartridge bay. Each of the plurality of barcodes/QR codes must be scanned. The touchscreen user interface ensures that the user scans each code. A cartridge bay does not open to receive the sample preparation cartridge until all the necessary barcodes/QR codes have been scanned.

As an alternative to barcode readers, other devices configured to read machine-readable data could be provided. For example, an RFID reader configured to read RFID tags provided on the consumables could be provided.

Instead of a single reader configured to read information from a sample preparation cartridge prior to insertion into a cartridge bay, one or more readers could be provided in each cartridge bay to read the information automatically on insertion of a sample preparation cartridge into a cartridge bay.

Instead of two readers, one provided to read information for the sample holders, and one provided to read information for the sample preparation cartridges, a single reader could be provided, configured to read all necessary information from the sample holders and sample preparation cartridges.

Cartridge Bay

Prior to loading the sample preparation cartridge 1 into the analysis instrument, a sample from a positive blood culture flask is pipetted by the user into the sample preparation cartridge 1. The features of the analysis instrument relating to handling of the sample preparation cartridge 1 are discussed further below.

The analysis instrument can receive up to six sample preparation cartridges 1, and has six cartridge bays 220. For clarity, only one cartridge bays 220 is described in the following description; the others are substantially identical.

Figure 22:
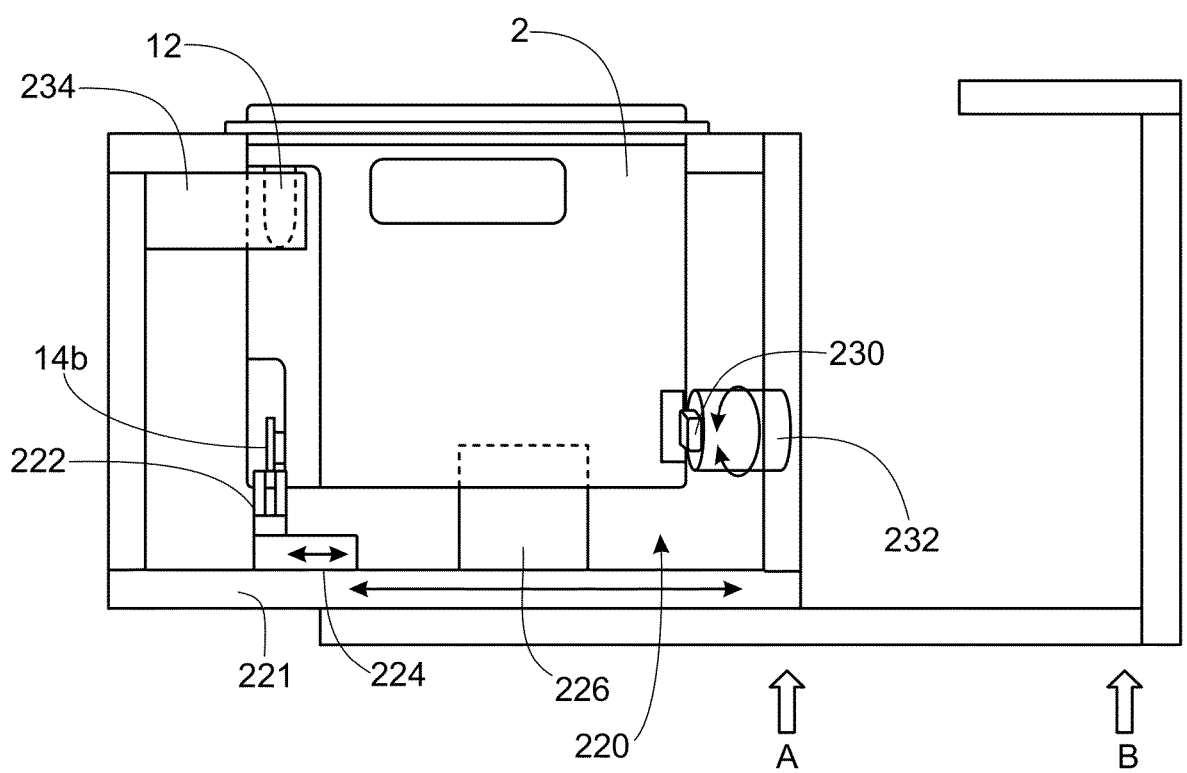
FIG. 22 shows a schematic view of the exemplary sample preparation cartridge of FIG. 1 received within a cartridge bay of an analysis instrument.

The sample preparation cartridge 1 is received into a cartridge bay 2 20 carried by a sled 221, shown in FIG. 22. The sled 221 is configured to slide between an input position and a processing position. In the input position, the cartridge bay 220 protrudes from the analysis instrument, and is open to the user for insertion of the sample preparation cartridge 1. The rear of the sample preparation cartridge 1 in the input position is labelled A in FIG. 22. In the processing position, the cartridge bay 220 is slid back into the analysis instrument, such that it is no longer accessible by the user. The rear of the sample preparation cartridge 1 in the processing position is labelled B in FIG. 22. Motion of the sled 221 between the input and processing positions is driven by a motor (not shown).

The sample preparation cartridge 1 is lowered down and pushed into the cartridge bay 220 such that interface points on the sample preparation cartridge 1 are received by corresponding interface points in the cartridge bay 220.

Figure 23:
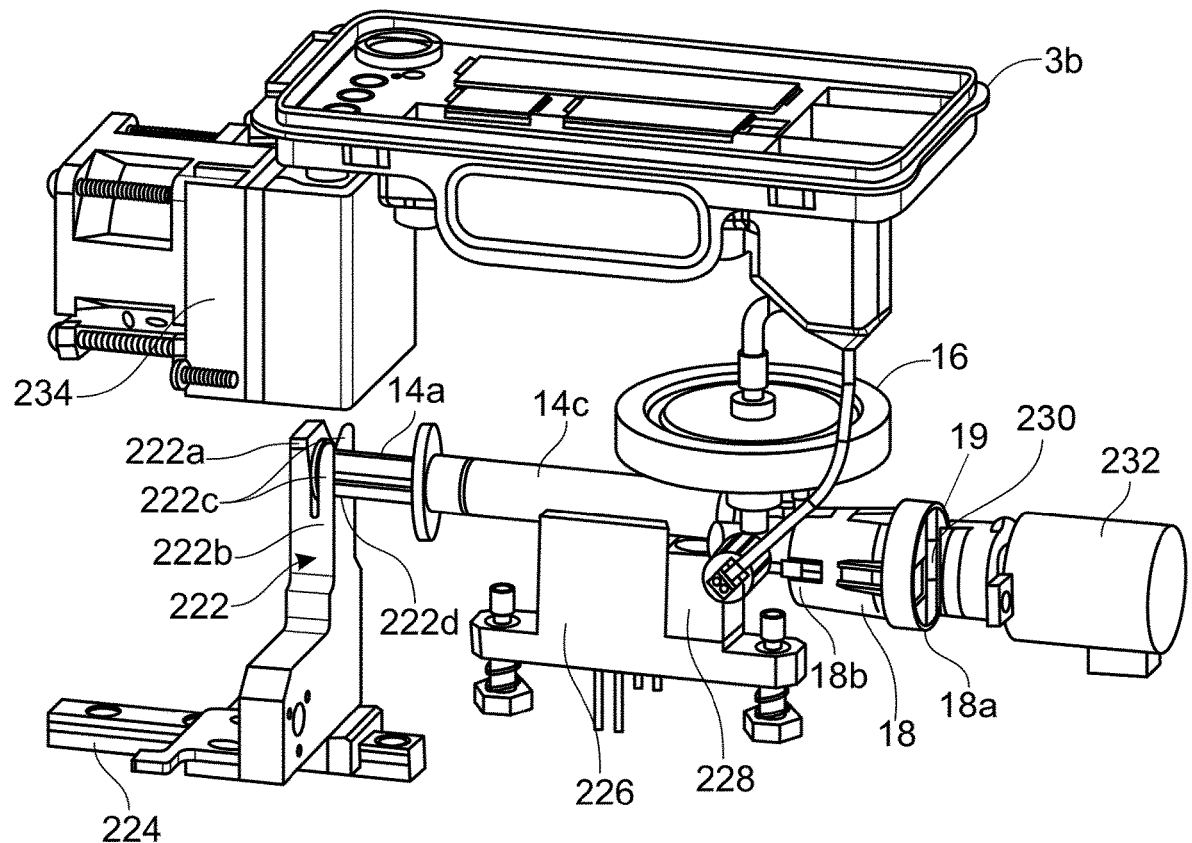
FIG. 23 shows points of interface between the exemplary sample preparation cartridge of FIG. 1 and an exemplary analysis instrument, when the sample preparation cartridge is received within the cartridge bay of the analysis instrument.

The interface positions are best shown in FIGS. 22 and 23. The top deck 3 of the sample preparation cartridge 1 shown in FIG. 23 is exemplary only.

A first interface is between the syringe piston 14*a* and the syringe piston hook 222. The syringe piston hook 222 comprises two projections, respectively forming a first abutment surface 222*a* of the syringe piston hook 222 and a second abutment surface 222*b* of the syringe piston hook 222. The two surfaces 222*a*, 222*b* are parallel vertical surfaces and are spaced apart by approximately the width of the syringe piston flange 14*b*. The second abutment surface 222*b* comprises two tines 222*c* with a groove 222*d* therebetween. The groove 222*d* is sized so as to receive the syringe piston 14*a*.

On insertion of the sample preparation cartridge 1 into the cartridge bay 220, the syringe piston flange 14*b* drops between the first and second abutment surfaces 222*a*, 222*b* of the syringe piston hook 222. The syringe piston flange 14*b* (and hence the syringe piston 14*a*) is held between the first abutment surface 222*a* and the tines 222*c* of the second abutment surface 222*b*. The syringe piston hook 222 is slidable along a rail 224 to move the syringe piston 14*a* in and out of the syringe barrel 14*c*.

A second interface provides controlled heating to the syringe barrel 14*c*. Provided in the cartridge bay 220 (on sled 221) is a syringe heater 226. The syringe heater 226 comprises a heater (in this case, MCH1-38 W-003 from COMSTAT), and an aluminum block which has a heating surface shaped to conform to the outer surface of the syringe barrel 14*c*. The housing 2 of the sample preparation cartridge 1 comprises an aperture which allows the syringe heater 226 to directly contact the syringe barrel 14*c*.

The syringe heater 226 is spring-mounted on springs (not shown), such that when the sample preparation cartridge 1 is fitted into the cartridge bay 220, the syringe barrel 14*c* presses down onto the syringe heater 226 against the biasing force of the springs, to ensure good contact between the heating surface of the syringe heater 226 and the syringe barrel 14*c*.

The heating provided by the syringe heater 226 is controlled by a controller which receives data from first and second temperature sensors, and adjusts the output of the syringe heater 226 accordingly.

The first temperature sensor (not shown) is a negative temperature coefficient (NTC) thermistor which measures the temperature of the syringe heater 226 itself. The first temperature sensor is integrated into the syringe heater 226. One such suitable temperature sensor is NTCLP100E3103H from Vishay BC Components.

The second temperature sensor 228 is an IR sensor (in this case, MLX-90614 from Melexis) configured to measure the temperature of the syringe contents.

The first and second temperature sensors measure temperature several times per second, in this case.

Use of the two independent temperature sensors enables the sample to be heated to a desired predetermined temperature as quickly as possible, without risking the integrity of the sample. For example, when the sample is a blood sample for AST, there is a risk that the sample could be clotted by overheating, or that pathogens in the sample could be killed by overheating. This should be avoided.

In the described configuration, heating of the syringe is carried out only from one side (i.e. predominantly where the syringe barrel 14*c* is in contact with the syringe heater 226). To heat as quickly as possible, the syringe heater 226 is initially heated to a higher temperature (for example, 50° C., as measured by the first temperature sensor) than the temperature to which it is desired to heat the contents of the syringe (for example, the sample in the syringe may be at a temperature of 35° C. when the syringe heater 226 is at a temperature of 37° C.). The syringe heater 226 is not heated above 50° C. These temperatures are of course exemplary only.

Figure 24:
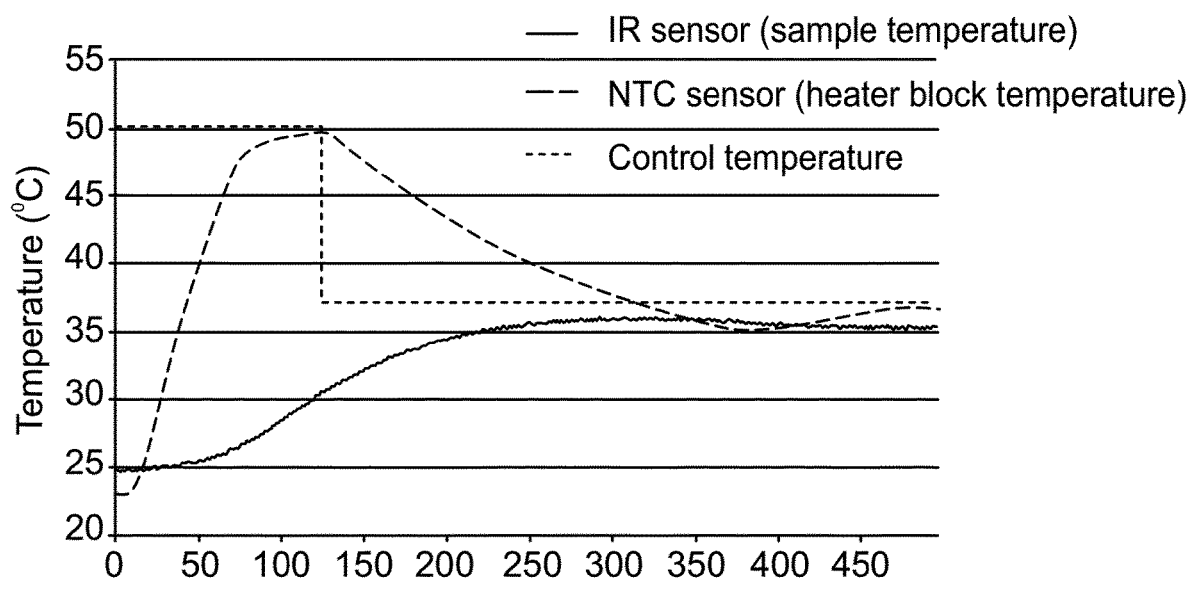
FIG. 24 shows exemplary control temperatures and measured temperatures relating to the first controllable heater.

FIG. 24 shows the control temperature (at 50° C. and 37° C.), and the resultant temperatures measured by the NTC sensor (measuring the syringe heater temperature 226) and the IR sensor (measuring the temperature of the sample in the syringe 14).

As the sample in the syringe barrel 14*c* is heated by the syringe heater 226, the second temperature sensor 228 simultaneously measures the temperature of the sample in the syringe barrel 14*c*.

The temperature of the sample in the syringe 14 may not be at a predetermined temperature when the sample is first received within the syringe 14. For example, the sample may have been pre-heated (in a blood culture cabinet, for example) or may have been left under room temperature conditions for some time before being input into the sample preparation cartridge 1. Moreover, the cartridge bay 220 is not in a temperature-controlled area of the analysis instrument, such that the temperature in the cartridge bay 220 may vary. Provision of the second temperature sensor 228 therefore allows the sample to be heated more accurately, by taking into account the actual ambient conditions and the initial temperature of the sample.

Additionally, contact between the syringe heater 226 and the syringe barrel 14*c* may not be equally good every time a sample preparation cartridge 1 is placed in the cartridge bay 220 (i.e. contact between the syringe heater 226 and the syringe barrel 14*c* may not be consistent for every sample preparation cartridge 1). Again, provision of the second temperature sensor 228 allows the sample to be heated more accurately, even under these circumstances.

When the temperature measured by the second temperature sensor 228 reaches a predetermined value (for example, 30° C.), the temperature of the syringe heater 226 (as measured by the first temperature sensor) is reduced to the predetermined desired temperature of 37° C. This allows the sample in the syringe 14 to reach a temperature of 35° C. That is, the control temperature (i.e. the temperature that the syringe heater 226 eventually reaches) is set 2° C. above the desired sample temperature in the syringe 14, as this compensates for temperature loss in the system (for example due to the fact that the syringe heater 226 does not entirely surround the syringe 14).

A third interface is between the valve interface slot 19 on the sample preparation cartridge 1 and the valve key 230 provided in the cartridge bay 220.

The valve key 230 is connected to a valve motor 232 configured to turn the valve key 230. The valve interface slot 19 is provided on one face 18*a* of a valve actuator 18, which is itself connected to the multi-way valve 17. Turning the valve key 230 (using the valve motor 232) turns the valve actuator 18 (via the interface of the valve key with the valve interface slot 19), which turns the multi-way valve 17.

As explained above, the valve interface slot 19 comprises an open end 19*a* and a closed end 19*b*, with a linear slot running between. The valve interface slot 19 is received over the valve key 230, which has a shape corresponding to that of the linear slot 19.

The valve interface slot 19 can only be received over the valve key 230 when the valve interface slot is in a predetermined orientation, i.e. with the open end 19*a* of the valve interface slot 19 oriented vertically downwardly, to be received over the valve key 230 which is also orientated vertically (i.e. the longitudinal extent of the valve key is orientated vertically). When the valve interface slot 19 is not orientated vertically, or when it is orientated vertically but with the closed end 19*b* oriented vertically downwardly, the valve interface slot 19 cannot be received over the valve key 230. This means that, when the sample preparation cartridge 1 is received in the cartridge bay 220, the multi-way valve 17 is in a known, predetermined position (it must be in that position in order for the valve interface slot 19 to be received over the valve key 230).

The valve actuator 18 and syringe piston flange 14*b* may protrude from opposite sides of the sample preparation cartridge 1. Accordingly, the valve key 230 and the syringe piston hook 222 which respectively engage with these portions may be provided at opposite sides of the cartridge bay 220.

A fourth interface involves provision of heating to the concentration determination wells 12 of the sample preparation cartridge 1. Heating is by way of a heating block 234 shaped to receive the four concentration determination wells 12 of the sample preparation cartridge 1. The heating block 234 comprises an aluminum block milled to provide holes corresponding to the shapes of the concentration determination wells 12, coupled to a heater. The heating block 234 comprises an integrated temperature sensor (not shown). One such suitable temperature sensor is NTCLP100E3103H from Vishay BC Components.

The cartridge bay 220 also comprises a cooling means (a Peltier element comprising a cooling fan, both integrated into the heating block 234) which is operated in the event that the temperature rises too high within the cartridge bay 220, causing the heating block 234 to become too hot (as measured by the integrated temperature sensor in the heating block 234). Under these circumstances, the Peltier element and fan are operated to cool the heating block 234.

The fan may be mounted at an angle to the heating block 34 so that the airflow both cools the heating block 34, but also serves to move air in and out of the cartridge bay 20 through holes (perforations) in the sides of the cartridge bay shell.

Finally, there are features of the sample preparation cartridge 1 which allow for correct alignment and positioning of the sample preparation cartridge 1 within the cartridge bay 220 In particular, these relate to the shape of the upper outer rim 3b of the top deck 3 (see FIGS. 2, 5 and 23), and to projecting stop 3a projecting upwards therefrom (see FIG. 5).

As will be seen from FIG. 5, the upper outer rim 3b of the sample preparation cartridge 1 is wider at the syringe-end of the cartridge (the lower edge, as shown in FIG. 5)— this is the side that faces outwards from the system, i.e. closest to the user on insertion of the sample preparation cartridge 1 into the cartridge bay 230.

As the sample preparation cartridge 1 is pulled into the analysis instrument, the upper outer rim 3b is guided into two opposed C-shaped guides in the cartridge bay 220. At the end closest to the front of the analysis instrument, the C-shaped guides have a maximum height, and the distance between the two opposed C-shaped guides is a maximum. Moving into the interior of the analysis instrument, the height of the C-shaped guides reduces, and the distance between the two opposed C-shaped guides also reduces. The guides grip the sample preparation cartridge 1 with increasing tightness as its increasing width (at the upper outer rim 3b) is pulled through the C-shaped guides.

The projecting stop 3a abuts a corresponding narrowing in the height of the C-shaped guides when the valve-end of the sample preparation cartridge 1 (this is the side that faces inwards towards the system, i.e. furthest from the user on insertion of the sample preparation cartridge 1 into the cartridge bay 220) reaches the end of the C-shaped guides. Movement of the sample preparation cartridge 1 is then stopped.

The sample preparation cartridge 1 is positioned within the cartridge bay 220 with a tolerance of 50-100 µm, in each of the X, Y and Z directions.

The presence of a sample preparation cartridge 1 is checked by the analysis instrument after closure of the cartridge bay 220 (i.e. after sled 221 has been slid into the analysis instrument to the processing position). This is carried out by an optical sensor (not shown) used to check that there is a sample preparation cartridge 1 loaded into the cartridge bay 220 before processing of the sample preparation cartridge 1 begins. One such suitable sensor is reflective sensor, for example OPB740WZ from TT Electronics.

Pipetting Stage

Figure 25:
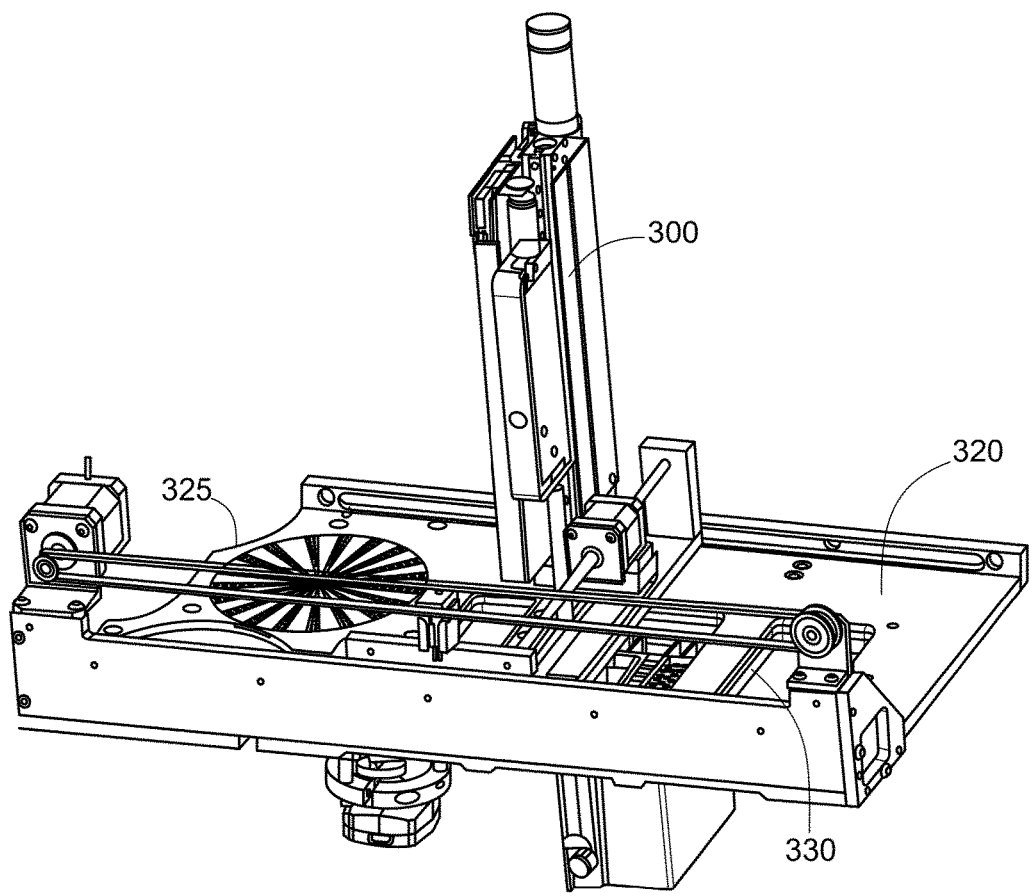
FIG. 25 shows a pipette robot.

The instrument comprises two pipetting robots 300 (shown in FIG. 25), which perform liquid handling functions in respect of the consumables (the sample preparation cartridge and sample holder). All liquid handling in the sample holder 110 is performed by the pipetting robots 300, and most of the liquid handling in the sample preparation cartridge is carried out by the pipetting robots, except that performed within the sample preparation cartridge by the syringe.

The two pipetting robots 300 are functional mirror images, where the constituent components (except, in this case, the pipetting head) are mirrored.

Each pipetting robot 300 comprises a ZEUS Pipetting Module manufactured by Hamilton, forming the pipette head. This carries out the step of pipetting, and also controls Z-movement of the pipette head (i.e. movement vertically upwards and downwards) via a built-in servo motor. Motion in the X-direction is effected using a belt drive. Motion in the Y-direction is effected using a lead screw.

Each pipetting robot 300 comprises a deck 320 for accessing the consumables. Each deck comprises openings 330 to access three sample preparation cartridges. Each deck comprises a sample holder filling stage 325, where a sample holder can be positioned for filling.

Each sample holder filling stage 325 comprises an electromagnet for holding the sample holder in a predetermined position while filling. In particular, the electromagnet attracts the magnetic metal layer of the sample holder to position and retain the sample holder.

The pipetting robots 300 interface with a sample preparation cartridge at several different points in the process of preparing a sample in the sample preparation cartridge, i.e. in the processes of preparing a pure sample of pathogens in growth medium, in the process of preparing this for concentration determination, in the process of preparing proper dilutions of the pathogens, and in the process of dispensing these to the sample holder. An exemplary process which could be carried out is set out below.

1. Pipette lysis buffer from the lysis buffer well to the proteinase K well (here, proteinase K is only one non-limiting example of a suitable lysis reagent);
2. Pipette the mix of lysis buffer and proteinase K to the input well
3. Pipette sample from sample well to input well.

After the sample has been lysed, and a suspension of pathogens in growth medium (referred to as the resuspendate) has been prepared (using the syringe and filter in the sample preparation cartridge), the following pipetting operations may be carried out:

4. Pipette an aliquot of the resuspendate from the input well to a first concentration determination well;
5. Pipette ethanol from the ethanol well to the first concentration determination well (containing resuspendate);
6. Pipette phosphate-buffered saline (PBS) from the PBS well to a second concentration determination well;
7. Pipette PBS from the PBS well to the first concentration determination well (containing resuspendate and ethanol);
8. Pipette some of the contents of the first concentration determination well (containing resuspendate, ethanol and PBS) into the second concentration determination well (containing PBS);
9. Pipette fluorescent stain to third and fourth concentration determination wells;
10. Pipette contents of the second concentration determination well (containing resuspendate, ethanol and PBS) into the fourth concentration determination well (containing fluorescent stain);
11. Pipette contents of the first concentration determination well (containing the resuspendate, ethanol and PBS) into the third concentration determination well (containing fluorescent stain);
12. Pipette the contents of the fourth concentration determination well into a first concentration determination chamber in the sample holder;
13. Pipette the contents of the third concentration determination well into a second concentration determination chamber in the sample holder.

After the concentrations of the pathogens in the first and/or second concentration determination wells of the sample holder have been determined, the following pipetting operations are carried out (in a given scheme where the concentration is determined to be in a given range):

14. Pipette growth medium to a first dilution well;
15. Pipette growth medium to a second dilution well;
16. Pipette a portion of resuspendate from the input well to the first dilution well (containing growth medium);
17. Pipette a portion of contents of first dilution well (resuspendate and growth medium) into the second dilution well (containing growth medium).
18. Pipette some of the contents of second dilution well (resuspendate and growth medium) into the third dilution well (containing growth medium).
19. Pipette some of contents of second dilution well (resuspendate and growth medium) into the fourth dilution well (containing growth medium).
20. Pipette fastidious additives from the fastidious additive well (containing fastidious additives (1 and 2)) to the fourth dilution well (containing growth medium);
21. Pipette the contents of the third dilution well (containing diluted resuspendate and growth medium) to the sample input port(s) of the sample holder designated for non-fastidious sample, to fill the sample wells for AST;
22. Pipette the contents of the fourth dilution well (containing diluted resuspendate, fastidious additives and growth medium) to the sample input port(s) of the sample holder designated for fastidious sample, to fill the sample wells for AST.

The foregoing is only an example of one process that could be carried out. The particular reagents are exemplary only. The procedure could be changed in the event that some of the reagents are provided in a different state (for example, dried or lyophilized). Steps may also be carried out in a different order, where feasible. Additionally, the dilutions steps may be handled differently depending on the initial concentration of the sample.

The pipetting robots 300 interface with a sample holder 110 at two different points in the analysis process for that particular sample holder:

1. To pipette an aliquot of the sample from the sample preparation consumable 1 into the concentration determination wells 139 of the sample holder 110, for determining the concentration of pathogens in the aliquot of the sample;
2. To fill the sample wells 133 of the sample holder 110. This includes dispensing pathogens suspended in non-fastidious and/or fastidious medium into the sample holder 110 through the sample inlet ports to fill the sample wells 133, and then dispensing air or mineral oil in order to evacuate the fluid filling channels 134, isolating the wells from each other.

This latter step is discussed in more detail below. In this step, the sample is supplied into the middle layer via the sample inlet port of the upper layer, through the septa in the membrane, through the inlet of the middle layer, and into the fluid filling channels. The pipette tip is docked to the sample inlets and pressurized by actuating the pipette plunger. Air present in the fluid filling channels, branch channels and sample chambers is evacuated through the micropillar array on the top layer. When the liquid front reaches the micropillar surface in a sample chamber it will stop, as the hydrophobic surface constitutes a barrier (see FIG. 19). Propagation of the sample liquid will instead continue in other parts of the fluid network (for example, other sample chambers connected to the fluid filling channel may fill up). In embodiments where there is a geometric restriction 136, the geometric restriction (positioned at the end of each fluid filling channel, where the fluid filling channel meets the waste reservoir) ensures that the liquid front stops at this position, as long as any sample chambers remain to be filled (due to the hydrophobic nature of the restriction, which provides a wetting resistance). The restriction to the waste reservoir is greater than the inlet restriction to ensure all sample chambers are filled.

When all sample chambers 133 connected to a given sample inlet are full, the liquid front will pass through the geometric restriction 136.

The final step in the filling sequence is to evacuate the fluid filling channels. This is achieved by docking an air-filled pipette (or mineral oil-filled pipette) to the sample inlets and actuating the plunger. The liquid in the fluid filling channels is then pushed (for example, through the geometric restriction 136 into the waste reservoir. This leaves the fluid filling channels 134 filled with air (or mineral oil), and the branch channels 135 and sample chambers 133 filled with sample. Each sample chamber 133 (and associated branch channel 134) is therefore isolated from the other. Thus, there is no possibility of contamination between sample chambers 133.

Pipette Alignment

The sample inlet ports of the sample holder 110 are relatively small and therefore accurate placement of the pipette head and pipette tips in a predetermined position is important to ensure that the pipette tip is reliably mated to the sample inlet ports of the sample holder.

Each pipetting robot 300 therefore comprises a pipette head/tip alignment sub-system located at the sample holder filling stage 325.

Figure 26A:
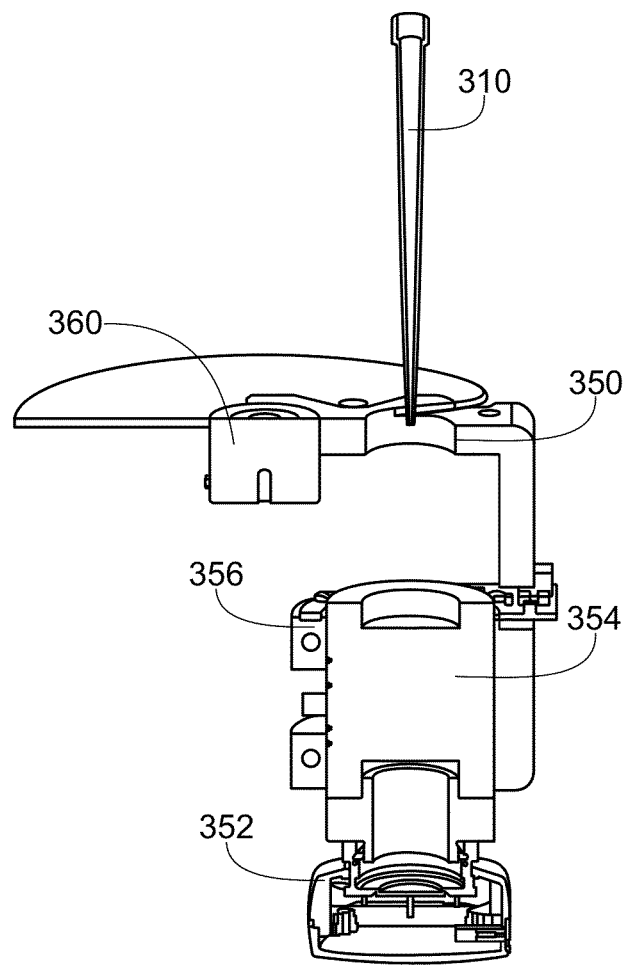
FIGS. 26A and B show alignment of a part of the pipette.

As shown in FIG. 26A, the pipette head/tip alignment sub-system comprises a camera 352 (and associated optics 354), a light source 356, and an alignment aperture 350 in the deck of the at the sample holder filling stage. The camera, optics, light source and alignment aperture are fixed in position.

In the present case, the camera 352 is a monochromatic CMOS area camera. In particular, the camera is a model UI-3480LE-M-GL, manufactured by IDS Imaging Development Systems GmbH.

The optical component 354 in the pipette head/tip alignment sub-system is item 87-187 from Edmund optics. This is an achromat pair 1:3.33 with 30 and 100 mm focal lengths. It is mounted with the 30 mm focal length end towards the camera, giving a 0.3× magnification.

The light source 356 comprises a plurality of LEDs, in this case 6. The LEDs are placed evenly spaced in a circle surrounding the 100 mm focal length end of the objective. The LEDs are placed as close to the end of the objective as possible without risking direct light from the LED into the objective. The foregoing configuration was chosen to achieve close to symmetrical illumination, and to avoid stray light into the objective. The particular LEDs used have part number LT G6SP-CBEB-25-1-Z, manufactured by OSRAM Opto Semiconductors Inc.

Images from the camera 352 are analyzed by the instrument-control computer.

The pipette head/tip is located on one side of the deck, and the camera and light source are located on the opposite side of the deck. In particular, the camera and light source are below the alignment aperture 350, so as to be able to image the alignment aperture 350, and the pipette head/tip through the alignment aperture.

Figure 26B:
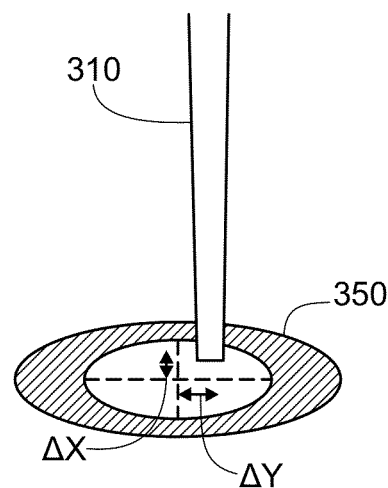

The offset ($\Delta X$, $\Delta Y$, see FIG. 26B) of the pipette head/tip relative to a nominal position is then determined and adjusted for. In this case, the center of the alignment aperture is the nominal position. However, a different nominal position could be used.

The pipette head, pipette tip and alignment aperture each have broadly circular cross-sections. The alignment aperture has a larger diameter than the pipette head or pipette tip.

In this example, the alignment aperture 350 has a diameter of approximately 8 mm. The bottom of the head has a diameter of approximately 5 mm. In some embodiments, the air channel running along the central axis of the head will be imaged and the position corrected on that basis. The diameter of the air channel is approximately 5 mm. The diameter of the pipette tip may be between 0.7 mm and 1 mm, or between 0.5 to 1.5 mm, depending on the tip volume.

Alignment of the pipette head/tip is carried out when there is no sample holder present in the sample holder filling stage 325. To check and adjust the alignment of the pipette head/tip, the pipette head/tip is positioned above the alignment aperture 350, approximately opposite the camera 352. This allows the camera to image the alignment aperture and the pipette head/tip (the pipette head/tip is imaged through the alignment aperture).

When imaging the pipette head/tip and the alignment aperture, the camera 352 images an outer circle (the alignment aperture) and an inner circle (the pipette head or pipette tip) within the outer circle. If the pipette head/tip is correctly aligned in X and Y (i.e. aligned in such a way as to ensure proper mating to the sample input port of the sample holder), then the outer circle and inner circle should be concentric. If the pipette head/tip is incorrectly aligned, then the outer circle and inner circle will not be concentric, and the inner circle will be offset (in at least one of the X and Y directions) from the center of the alignment aperture (the outer circle).

The offset of the pipette head/tip relative to the center of the alignment aperture (the outer circle) is then determined, and corrected for by driving the pipette head in the X and/or Y direction to correct the offset as appropriate.

Alternatively or additionally to correction of the X and/or Y positions of the pipette head/tip, calibration of the Z-position of the pipette head/tip can be performed using the same imaging system.

In particular, a series of images of the head/tip are taken, each with the pipette head/tip at a different Z position (the pipette robot moves the pipette head/tip in the Z direction). A suitable range is 30 to 50 images, each separated from the next by 0.1 mm in the Z direction. The image series should be centered at the nominal Z position of the head/tip, with approximately half the images taken at Z positions above the nominal Z position, and approximately half the images taken at Z positions below the nominal Z position. The images should span (in Z-positions) the expected maximum misalignment of the Z position of the head/tip, i.e. the uppermost image should lie above the maximum upwards misalignment, and the lowermost image should lie below the maximum downwards misalignment.

For each image, the area of the head/tip and the immediate surrounding is identified, and a contrast function is used to quantify the contrast of the tip edge in relation to the surroundings. A value of this function is calculated for each image, and the Z position of the image with highest contrast is determined to be the Z position of the tip. If necessary, interpolation of the contrast function between discrete Z positions of images is used.

The calibration of the Z-position of the pipette head/tip can alternatively be performed by touching a reference surface. This is possible because the pipette head can register force in the Z direction. The head is lowered towards a reference surface, and a specific value of the force, or an interpretation of the Z-position—force function registered as the head touches the surface is used to determine the Z position.

The reference surface may be a designated area of the pipette robot deck at a predetermined Z-position.

The calibration of the Z-position of the pipette head/tip can alternatively be performed by using an optical fork sensor placed horizontally (not shown). The pipette head/tip can be lowered into the fork until a signal from the head/tip is registered. This is then used to set the Z-position.

The procedures outlined above (for calibration of the X, Y and Z positions) may be used to calibrate the position of the pipette head (i.e. without a pipette tip attached) or a pipette tip attached to the pipette head.

The pipette tip alignment may be carried out before each filling of the sample holder, or after mounting each new tip, if more than one tip is used per sample holder, since there is a possibility that the lower open end of a tip may vary in X-Y position, as the tip mounting may vary slightly each time a tip is mounted.

The pipette head may be aligned at start-up of the analysis instrument. Alternatively, it may be aligned only at initial instrument installation. Such mechanical calibration is carried out to compensate for production deviations or movement during transportation, for example.

The above-described pipette head/tip alignment sub-system may also be used to provide fine-tuning of the position of the sample holder whilst it is positioned on the sample holder filling stage. Specifically, a specific reference structure on the sample holder (which could be a sample chamber, for example) is imaged through the alignment aperture by the camera, to determine the relative position of the reference structure compared to a nominal position. The position of the sample holder can then be corrected accordingly.

Another procedure that can be carried by the pipette head/tip alignment sub-system to provide fine-tuning of the position of the sample holder whilst it is positioned on the sample holder filling stage is as follows. The sample holder may be provided with a reference line structure in its mid or bottom layer, wherein the reference line structure is oriented along a radius of the sample holder (i.e. the reference line structure is along a section of a notional line radiating from the center of the sample holder). The sample holder is positioned on the concentration determination stage and is rotated into coarse alignment so that the reference line structure will be visible through the alignment aperture 350 of the sample holder filling stage, when moved there. After relocation to said sample holder filling stage, the camera 352 images the part of the sample holder visible through the alignment aperture 350, and an intensity profile is generated along an arc concentric with the sample holder to find the reference line structure. An angular offset from the nominal position is calculated, and used to modify the polar co-ordinates defining the fill positions of the sample holder.

Whilst the camera 352 described above is a CMOS area camera, a CCD area camera could instead be used. The camera could be substituted for any camera with a similar pixel size, pixel count, and similar or better light sensitivity. While a monochromatic camera is used, a color camera could instead be used.

The optics and illumination source could of course also be varied from the set up described above.

Concentration Determination Stage

The analysis instrument comprises a concentration determination stage 400 (shown in FIGS. 27A, 27B and 27C)

configured to determine a concentration of pathogens in an aliquot of the sample, which has been prepared as discussed above in steps 1 to 11 (i.e. the steps of: mixing the sample with lysis buffer and proteinase K; lysing the sample; filtering the lysed sample to capture pathogens on the filter; flushing the filter with growth medium to form a resuspendate comprising the growth medium and resuspended pathogens; and mixing the resuspendate with ethanol, PBS and fluorescent stain). This process is described in more detail in Q-linea AB's co-pending application GB 1801022.3 (filed 22 Jan. 2018).

The concentration determination stage 400 receives a single sample holder 110, which comprises one or more concentration determination chambers 139 (in this case two). For simplicity, only one concentration determination chamber will be considered below.

The concentration determination chamber 139 of the sample holder 110 receives a mixture of resuspendate, ethanol, PBS and fluorescent stain (referred to as a suspension-stain mixture).

The concentration determination stage 400 is operable to image the suspension-stain mixture at the emission wavelength of the fluorescent stain, to determine an image analysis value for the number of objects corresponding to microorganisms in the imaged mixture. Subsequently, a pre-determined calibration curve is used to convert the image analysis value to a concentration of microorganisms in the suspension.

In order to carry out the foregoing method, the concentration determination stage 400 comprises the structure described below.

The concentration determination stage comprises a turntable 410 for receiving a sample holder. To enable the sample holder to be rotated (for example, to switch from imaging a first concentration determination chamber in the sample holder to imaging a second concentration determination chamber in the sample holder), the turntable is rotatable.

The turntable is rotatable via a drive wheel 415 and a drive belt 420, provided round the outer periphery of the turntable 410.

The turntable 410 defines a horizontal plate for the sample holder to rest upon, surrounded by a circular rim having a radius corresponding to the radius of the sample holder.

The turntable 410 also comprises a rotational positioning sensor 450 allowing rotational alignment of the sample holder in a predetermined position. The rotational positioning sensor determines the position of an alignment marker comprising a through-hole through the middle layer of the sample holder, or a notch in the outer edge of the middle layer of the sample holder. The rotational positioning sensor comprises a photodetector (one such suitable detector is model OPB743WZ, from OPTEK). The turntable is rotated until the rotational positioning sensor detects the alignment marker. Once the alignment marker is detected, the absolute rotational position of the sample holder is known.

Below the turntable 410 is provided a fluorescence microscope module comprising an objective, a parfocal length extender, a filter set comprising excitation and emission filters, as well as dichroic mirrors (all shown schematically as 430), illumination 435 to cause the fluorescent stain to fluoresce, a tube lens, and a camera 440 with separate but associated circuit board for camera and LED control.

In this example, the objective is a 10× Olympus Plan Fluorite Objective, 0.3 NA, 10 mm WD from Olympus. Apart from the extender, the remaining components of the fluorescence microscope module (the camera, illumination, filters and dichroic mirrors) are provided as an integrated module—in this case OEM L5620 CORE from Etaluma Inc. The illumination is provided by an LED (or a plurality thereof). The LED and associated filter set (excitation and emission filters, as well as dichroic mirrors) provides excitation wavelengths of 473-491 nm, which is suitable for the specific fluorescence stain used. Other wavelengths could also be used, as necessary for other stains.

The fluorescence microscope module is movable in the Z-direction (i.e. vertically upwards and downwards) using a drive 445 (in this case, model E25443-05-900 from Haydon-Kerk). Movement in the Z-direction allows the fluorescence microscope module to capture a series of images taken at different Z-positions through the concentration determination chamber. A total of approximately 60 images are taken for each concentration determination chamber, each at a different Z position.

The turntable 410 comprises a through-hole 425 allowing the concentration determination reader to image the concentration determination chamber from beneath.

The turntable 410 described above is one suitable for receiving a circular sample holder. If the sample holder is not circular, the turntable is modified such that the rim is shaped to correspond to outer periphery of the sample holder, in order to hold the sample holder in a fixed position in the horizontal plane.

The fluorescence microscope module described above is configured to illuminate the suspension-stain mixture at a single wavelength to cause the fluorescent stain in the suspension-stain mixture to fluoresce. In other embodiments, the suspension-stain mixture comprises a plurality of fluorescent stains, in which case the fluorescence microscope module is configured to illuminate the suspension-stain mixture at a plurality of wavelengths to cause fluorescence of each of the plurality of fluorescent stains.

As described above, the rotational positioning sensor comprises a photodetector. However, the rotational positioning sensor may instead comprise an IR fork sensor.

Incubator and Incubation Stage

Figure 28:
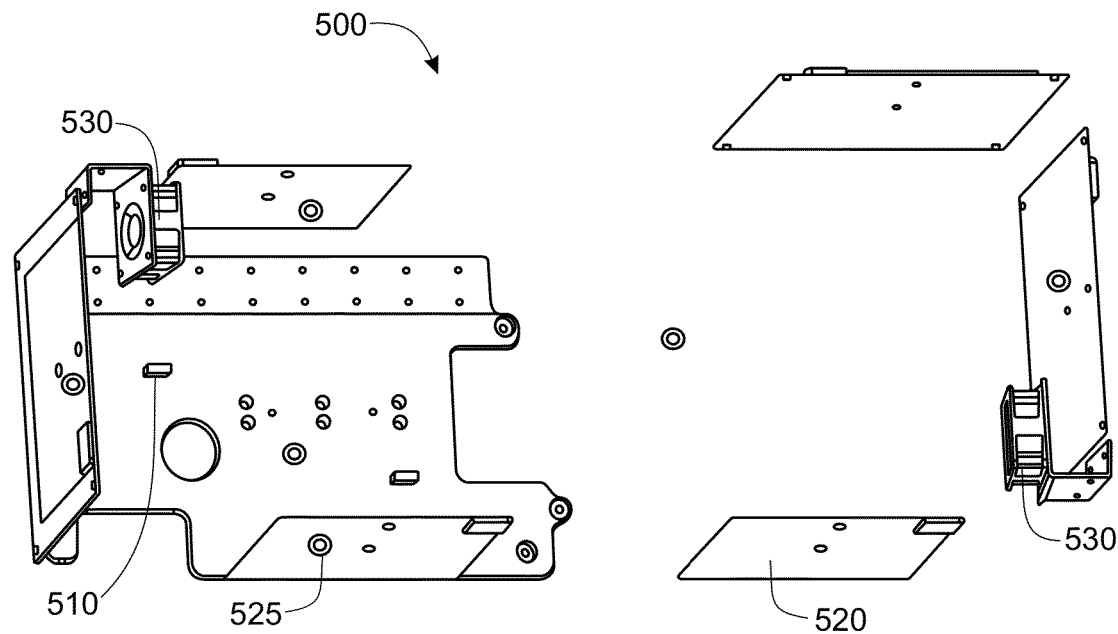
FIGS. 28 and 29 show an incubator.
Figure 29:
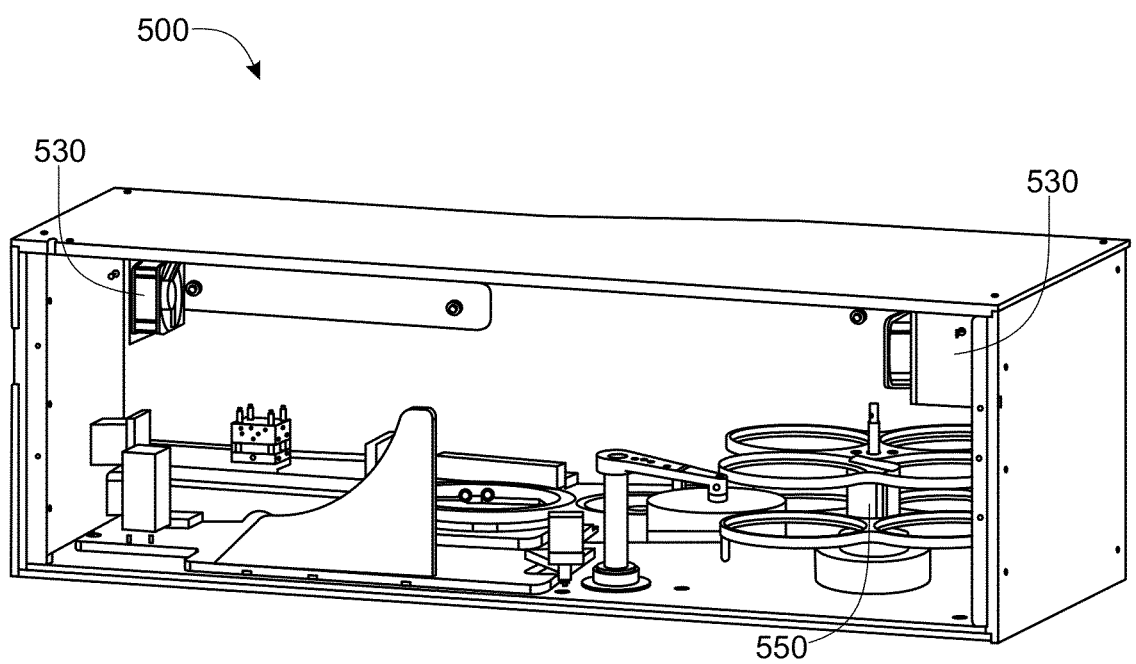

The analysis instrument comprises an incubator 500 (see FIGS. 28 and 29), configured to provide predetermined environmental conditions for incubation of samples in the sample holders. In an AST analysis instrument such as that described herein, the predetermined environmental conditions comprise incubation temperatures suitable for growth of pathogens.

The incubator may also adjust or monitor other environmental conditions, such as humidity, and/or $CO_2/O_2$ levels, as is known in the art.

The incubation temperature may also be chosen in consideration of other factors, for example reduction of evaporation of sample from the sample wells, and condensation onto the upper surface of the sample chambers in the sample holder.

The target incubation temperature is 35° C. Temperatures in the range of 34 to 36° C. may also be suitable. The incubation temperature is uniform throughout the incubator to a tolerance of approximately ±3%.

The incubator comprises a casing comprising an outer insulating layer (comprising plastic, for example expanded polypropylene, PVC or polystyrene).

The incubator is heated using a plurality of resistive foil heaters 510. In this case, six such heaters are used, placed on the four sides, top and bottom surfaces of the incubator. In another case, a different number of heaters may be used (such as four heaters, for example placed on two sides, and the top and bottom surfaces of the incubator).

The resistive foil heaters 510 are attached to four separate inner heat-conducting shields 520, which in turn are attached to the insulating layer.

The resistive foil heaters 510 are covered by four inner heat-conductive sheets (comprising aluminum, for example).

On the one of the sides of the incubator (in this case, one of the short sides), a heat exchange surface is mounted to allow heat dissipation from the inside of the incubator to the outside. The outside of this part of the incubator is also part of the surface of the inlet airflow for cooling of the computer compartment (described below).

The temperature of the incubator is monitored and controlled using a plurality of temperature sensors 525 (for example, model NTCALUO2A103F161 from Vishnay BC components). In this case, temperature sensors 525 are provided on the four sides, top and bottom surfaces of the incubator, each associated with one of the plurality of heating foils and placed on the inside of the respective inner heat conducting sheets. Each heating foil 510 has its own regulation loop using the associated sensor. A further temperature sensor is suspended in free air. This last sensor may be used for monitoring of air temperature, but is not necessarily used in control/regulation of the temperature (though of course it may be).

Even temperature distribution within the incubator is aided by two fans 530 (for example, model AFB0624EH-SP50 from Delta electronics providing an airflow of 1.086 m³/min), providing rapid air circulation. A first fan 530 may be mounted so that it directs air towards the side-mounted heat exchanger. The second fan may be mounted centrally at the top of the incubator interior. The fan speed may be regulated, thereby varying the airflow and heat exchange over the inside of the heat exchanger.

The incubator comprises a means for transporting a sample holder from outside of the incubator, into the interior of the incubator. The means is a slide-tray, having a similar construction to the sample holder receiver, i.e. it is similar to a CD tray interface, as is well known in the art.

Figure 38:
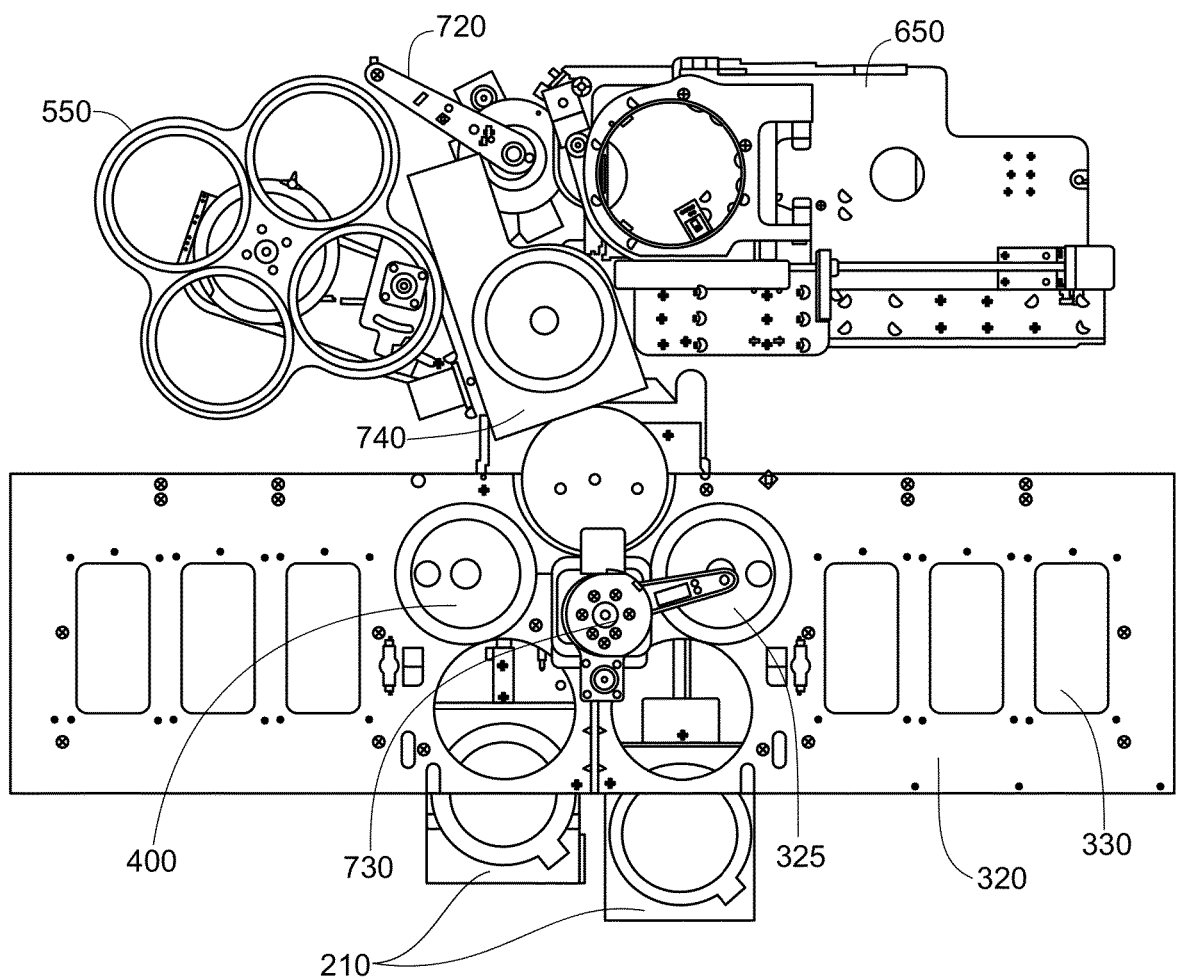
FIGS. 38 and 39 show features of the sample holder transport sub-system.

The incubator slide-tray 740 (see FIG. 38) is configured to move from a loading position (outside of the incubator) to an unloading position (inside the incubator). When not in use, the incubator slider-tray is in the unloading position, to block the entrance to the incubator, thereby reducing heat loss from the incubator.

As explained in further detail below, the analysis instrument comprises an imaging sub-system for microscopy-based analysis of samples. The imaging sub-system comprises a support 650 configured to receive a sample holder for imaging. The support 650 comprises a platform 652. The imaging sub-system also comprises a line camera 610, a tracking autofocus system 615, a dichroic mirror 620, an objective lens 625, an illumination light source 630, a band-pass filter 631, a condenser 632, and a tube lens 640.

The imaging sub-system is provided partially within the incubator, and partially outside of the incubator. Specifically, the support 650 configured to receive a sample holder for imaging is within the incubator. Moreover, an opening in the incubator casing allows the objective lens 625 to be positioned inside the incubator.

The remaining components of the imaging sub-system are provided outside of the incubator. This means that the heat-producing components of the imaging sub-system are outside of the incubator, and therefore do not disturb the temperature within the incubator.

Additional heaters are placed on the support 650. As this component has a large thermal mass, it is advantageous to provide it with dedicated heating, to enable the incubator to reach the predetermined incubation temperature more rapidly. In this case, the heaters used are resistors: model H525 22R J from ARCOL. Two may be placed on the support 650.

An additional heater may be placed on the spindle of the incubator carousel 550 (described below), for example below the lowermost floor of the carousel. Again, as this component has a large thermal mass, it is advantageous to provide it with dedicated heating, to enable the incubator to reach the predetermined incubation temperature more rapidly. In this case, the heater used is a resistor: model H525 22R J from ARCOL.

The heaters placed on the support and/or spindle may be used only at start-up of the analysis instrument, to allow the system to reach the operating temperature quickly. Once the operational temperature is reached, these heaters may be turned off.

Figure 30:
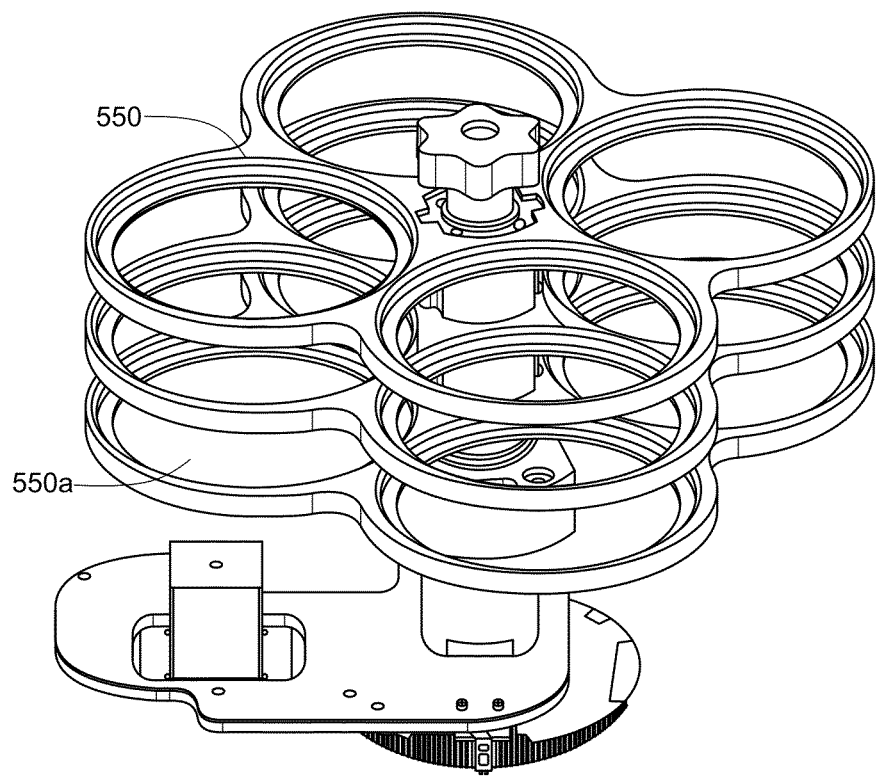
FIG. 30 shows a carousel located in the incubator.

A further temperature sensor 525 is attached to the image reader platform 650 The incubator comprises a carousel 550 (within the incubator housing)—see FIG. 30) for receiving sample holders to be incubated. The carousel 550 comprises three floors, each comprising four incubation positions 550a. Each floor is vertically spaced from the other floors, i.e. each floor is at a different height. The floors are spaced apart by 38 mm in this example, which is sufficient clearance to allow the sample holders to be accessed for placing and removal in the carousel.

Each incubation position 550a is configured to receive one sample holder, and hence the carousel is configured to receive 12 sample holders.

The four incubation positions 550a on each floor are horizontal and coplanar, and are spaced evenly around the central axis of the carousel 550. Each incubation position 550a is defined by a circular opening in the floor, having a diameter slightly smaller (by approximately 10 mm) than the diameter of a sample holder. The sample holder sits over this circular opening, supported by the floor around the circular opening.

Projecting upwards around the circular opening, at a larger radius, is a circular rim having a radius corresponding to the radius of the sample holder. This ensures that the sample holder is snugly held at the predefined incubation position, and does not move in the horizontal plane. The circular opening and rim are coaxial.

The carousel 550 is rotatable in order to move a sample holder to a position where it can be picked up by the sample holder transport sub-system (described in more detail below) in order to be moved to and from the carousel.

The carousel 550 is configured to rotate during incubation to compensate for an uneven temperature distribution, to ensure even heating of the sample holders. The speed of rotation is insufficient to cause agitation of the samples in the sample wells of the sample holders. One revolution of the carousel takes approximately 8 seconds to complete.

Rotation of the carousel 550 is also used bring a sample holder held by the carousel to a location where it can be picked up by the sample holder transport sub-system, or to bring a free position of the carousel to a location where the sample holder transport sub-system can deposit a sample holder into the free position The speed and direction of rotation during incubation is constant, except that it is interrupted by periods of changed speed and/or direction in order to enable the sample holder transport sub-system to access the carousel for picking up or dropping off a sample holder.

The incubator 500 is described above as providing environmental conditions suitable for pathogen growth. Other environmental conditions may be suitable for other applications (for example, cell culturing), and the incubator may be controlled accordingly to provide such conditions.

The carousel 550 described herein comprises three floors, each capable of holding four sample holders. However, other configurations are of course possible. For example, the carousel 550 may comprises only two floors, each capable of holding four sample holders. More generally, the carousel may comprise one floor, two floors, three floors, four floors, five floors, or more. Each floor may be configured to hold one sample holder, two sample holders, three sample holder, four sample holders, five sample holders, or more.

As explained above, the incubation positions 550a are defined by circular openings and correspondingly shaped rims. However, where the sample holder is a shape other than circular, the openings and rims may have shapes corresponding to the shape of the sample holder, and sized accordingly.

Sample Chamber Imaging Stage

Figure 32A:
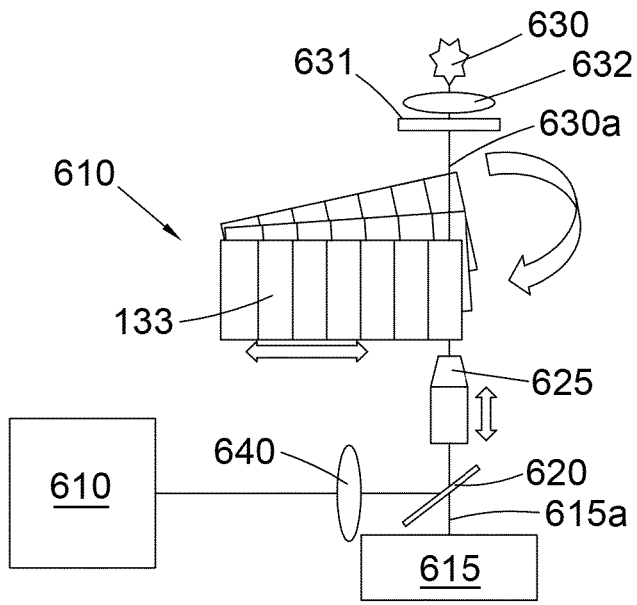
Figure 32B:
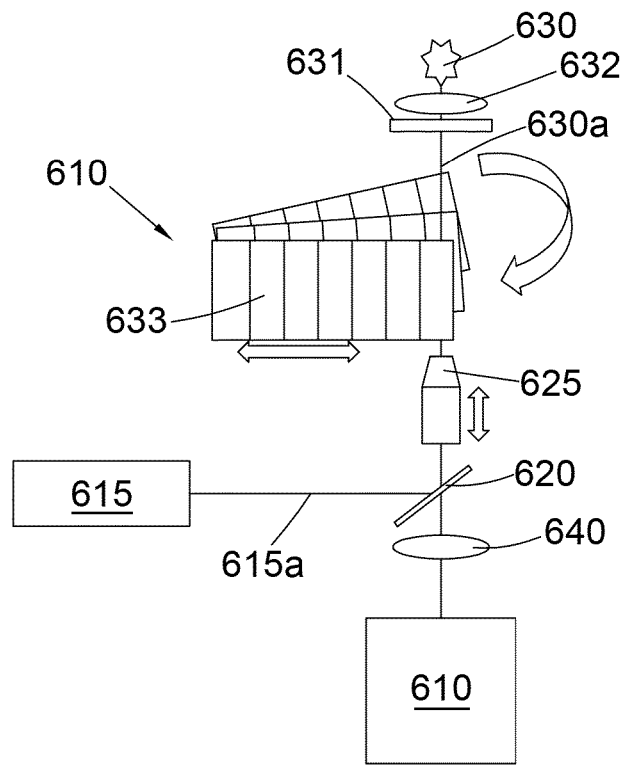

FIGS. 32A and 32B show a system for microscopy-based analysis of samples. The systems shown in FIGS. 32A and 32B comprise a device for microscopy-based analysis of samples comprising a line camera 610, a tracking autofocus system 615, a dichroic mirror 620, an objective lens 625, an illumination light source 630, a band-pass filter 631, a condenser 632, and a tube lens 640. The two systems in FIGS. 32A and 32B are very similar, except that the location of the line camera 610 (and tube lens 640) and autofocus system 615 are swapped.

In one example, the line camera 610 is a Linea LA-CM-16K05A (comprising a CMOS digital image sensor) manufactured by Teledyne DALSA, coupled with an XTIUM-CL MX4 frame grabber (not shown), also by Teledyne DALSA. The camera array size is 1×16,384 pixels, with each pixel being 3.5 µm×3.5 µm. The line width is therefore 3.5 µm, and its length is 57.7 mm. Only a portion of this length may be used, in practice. The autofocus system 615 comprises an ATF6 SYS system, from WDI WISE Device Inc., comprising the ATF6 SWIFT digital autofocus system (with laser wavelength of 785 nm) and an MCZ controller for controlling the position of the objective lens 125 in the z-direction. The objective lens 625 is a N10X-PF lens (10× magnification, NA 0.3), manufactured by Nikon. The dichroic mirror 620 is a 662 nm edge BrightLine single-edge imaging-flat dichroic beamsplitter manufactured by Semrock. The light source 630 comprises an LED light source Luxeon LXZ1-PX01 (with central wavelength of about 556-569 nm), a condenser 632, along with a 560/94 nm BrightLine® single-band bandpass filter 631, manufactured by Semrock. The tube lens 640 is an ITL200 tube lens, from Thorlabs, with a focal length of 200 mm. The condenser 632 produces an illuminated area in the plane of the bottom of the sample chamber 133 at the imaging location of approximately 8×8 mm, with the central 5×5 mm area having an intensity variation less than approximately ±10%. The tube lens 640 focuses the collimated beam coming out of the objective 625 onto the line camera 610. The tube lens 640 is matched to the objective 625 to achieve a magnification of 10×.

The sample holder 110 is received by a support 650 (shown in FIG. 33, for example) configured to receive the sample holder 110. The support 650 comprises a platform 652 comprising a recessed region 651 shaped to conform to the outer dimensions of the sample holder, such that, when placed within the recessed region, the sample holder cannot move laterally.

The platform 652 is provided on linear tracks 656a, 656b attached to the support, and a motor may be provided to drive the platform in either direction along the tracks. The motor (not shown) may drive movement of the platform along the tracks via a rack and pinion arrangement (not shown), for example.

The platform 652 comprises a platform lid 653 (see FIGS. 35A to 35D) which, particularly during imaging, holds the sample holder 110 in a fixed position with respect to the vertical axis, i.e. such that the sample holder 110 does not move upwardly or downwardly.

The platform lid 653 is hingedly connected to the platform 652, so that it can pivot upwardly and away from the platform 652 about the hinged connection.

Figure 35A:
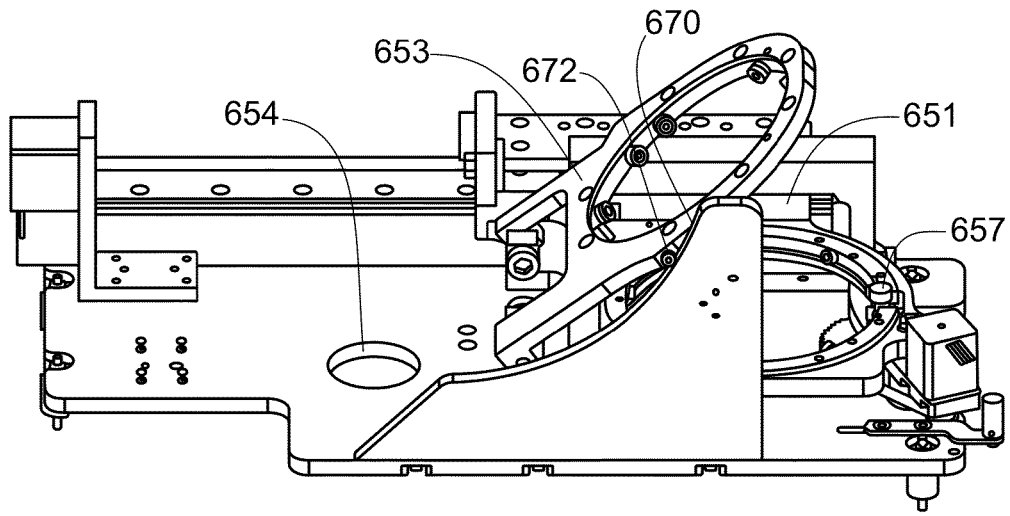
Figure 35B:
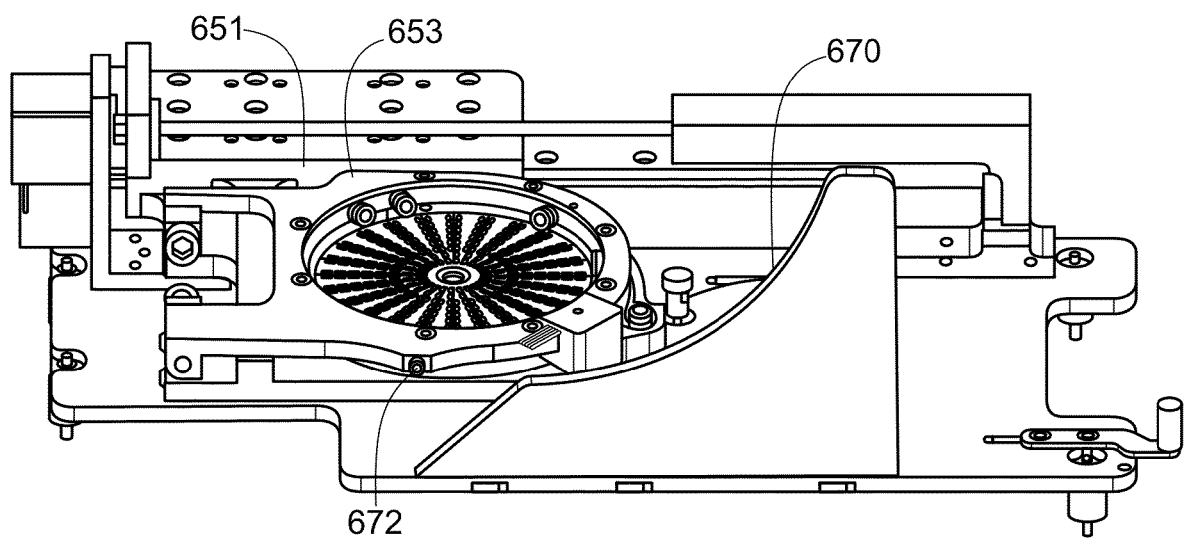
Figure 35C:
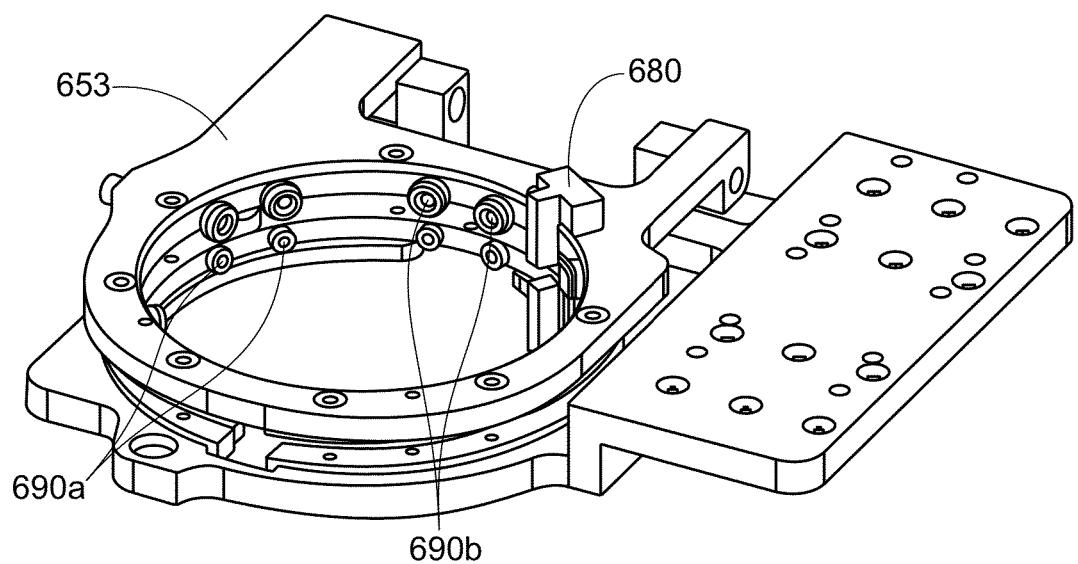
Figure 35D:
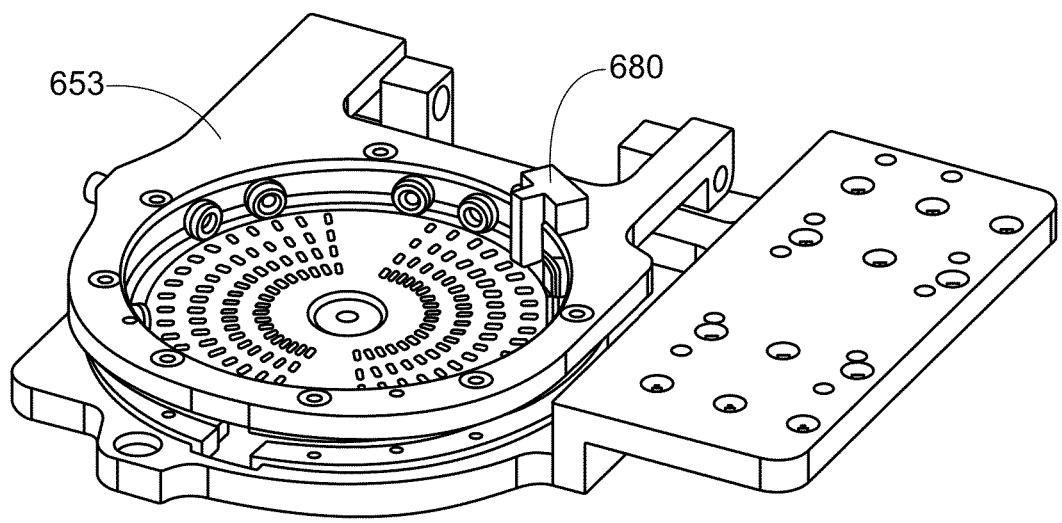
Figure 36A:
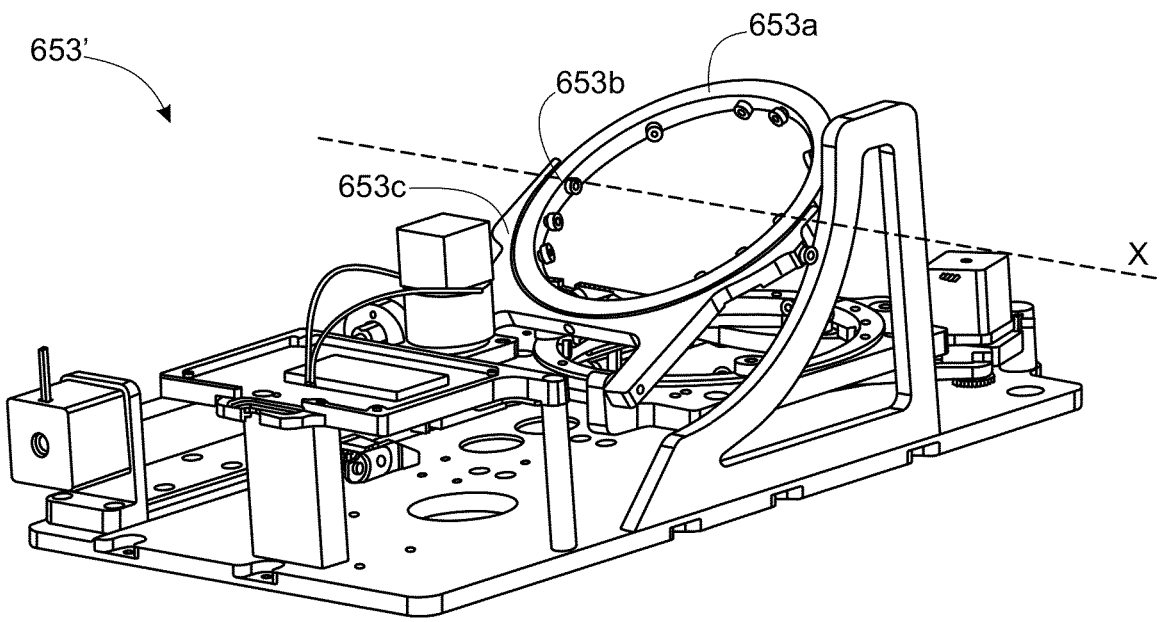
Figure 36B:
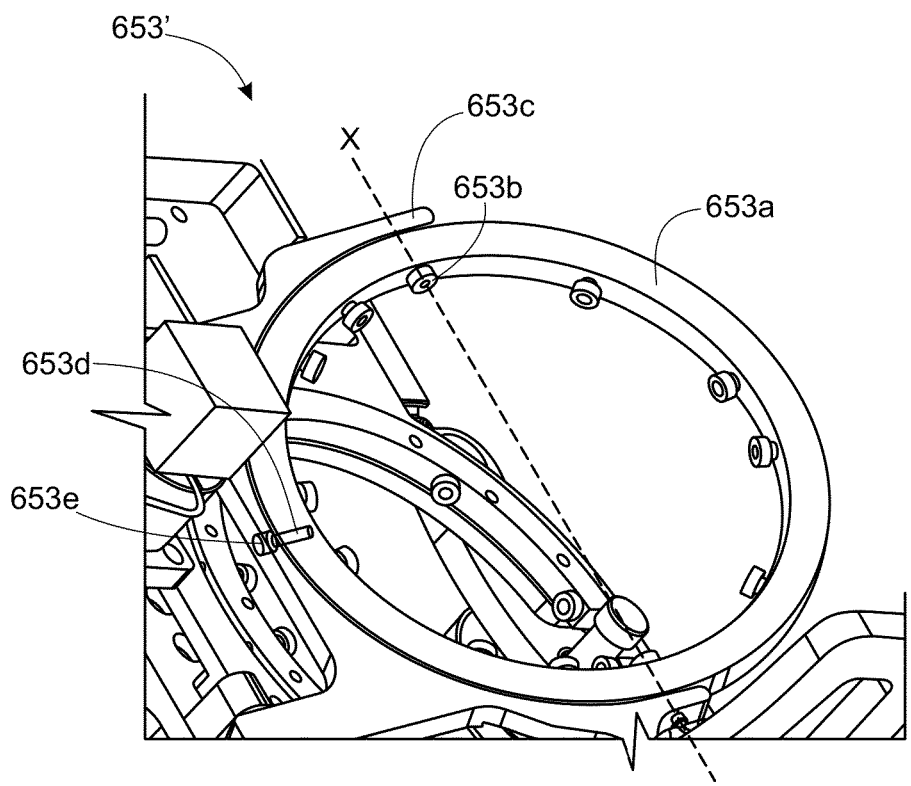

The platform lid 653' shown in FIGS. 36A and 36B differs from that shown in FIGS. 35A to 35D in that it comprises an inner frame 653a which is attached via gimbal mounts 653b to an outer frame 653c. Due to the gimbal mounting, the inner frame 653a is able to pivot about the gimbal axis X shown in FIGS. 36A and 36B. This allows the inner frame 653a to settle parallel to the upper layer of the sample holder. As for the platform lid 653 shown in FIG. 35A to 35D, the platform lid 653' shown in FIGS. 36A and 36B holds the sample holder 110 in a fixed position with respect to the vertical axis, i.e. such that the sample holder 110 does not move upwardly or downwardly. The degree to which the inner frame 653a can pivot about the axis X is limited by an angular limiter. The angular limiter comprises a pin 653d which protrudes from the inner frame 653a and is received within a hole 653e in the outer frame 653c. (Instead, the pin 653d could protrude from the outer frame 653c to be received within a hole 653e in the inner frame 653a.) The pin and hole may each have a central axis, and the axes may be coaxial when upper and lower faces of the inner frame and outer frame are parallel.

The diameter of the pin 653d is smaller than the diameter of the hole 653e such that the pivoting motion of the inner frame 653a about the axis X is limited by the extent to which the pin 653d can move (upwards and downwards) within the hole 653e. In this example, the axis of the pin 653d and hole 653e is perpendicular to the gimbal axis X.

Figure 31:
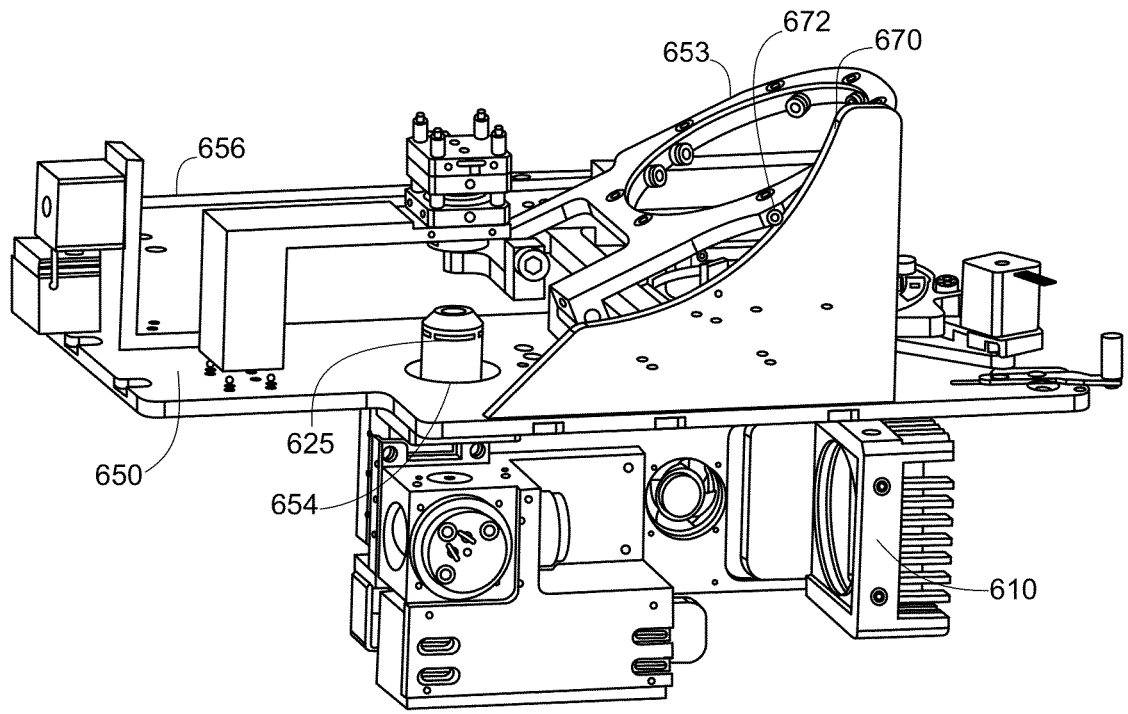
FIGS. 31 to 36 show features of the sample holder imaging stage.
Figure 33:
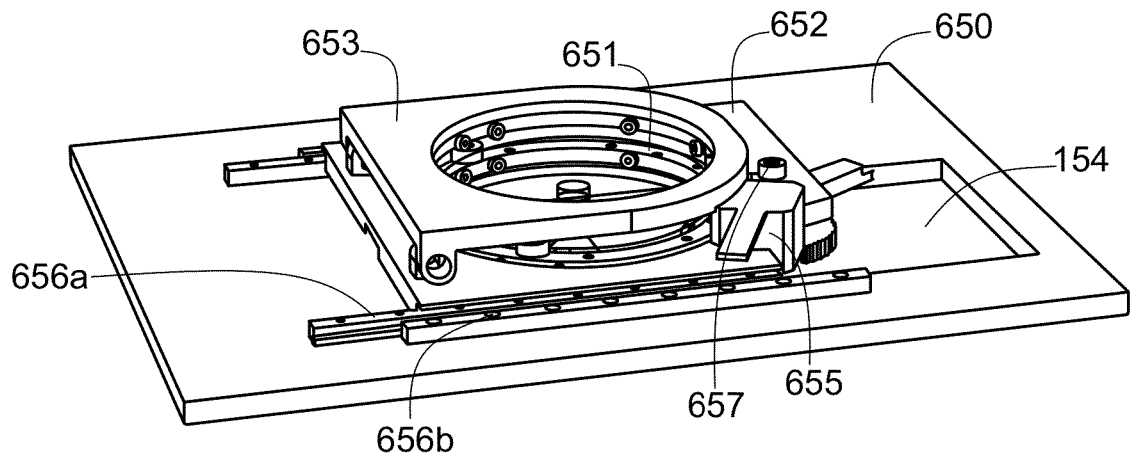
Figure 34:
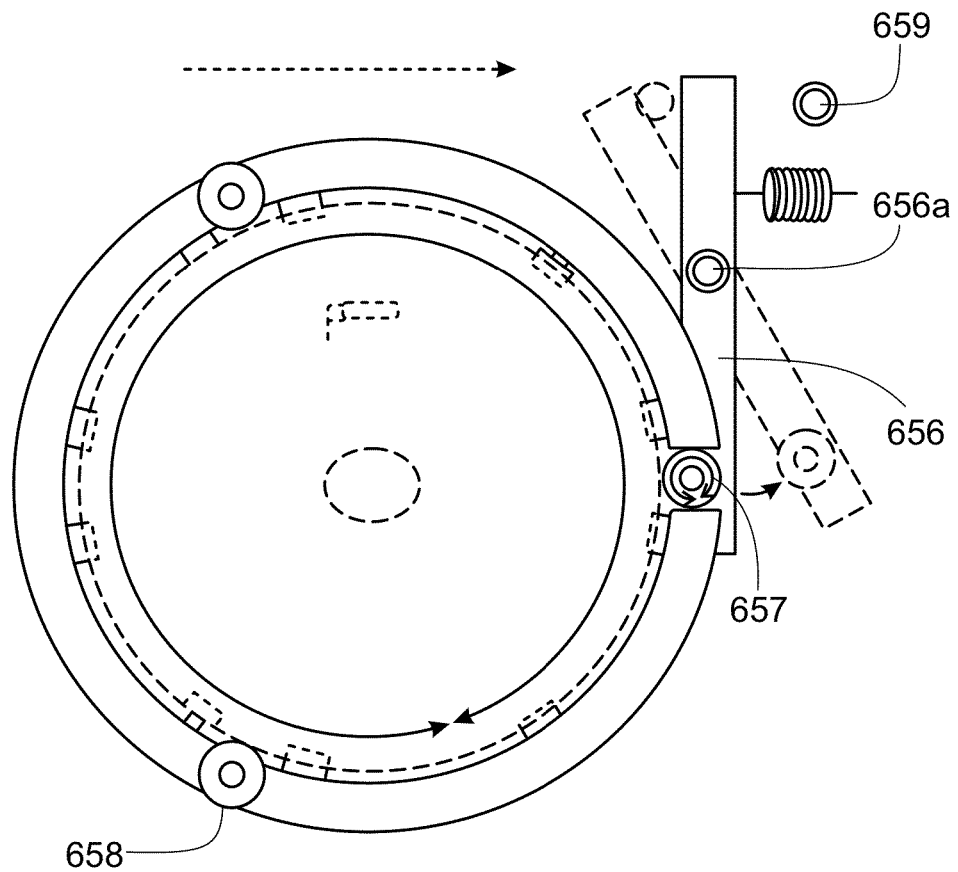

The platform lid 653, 653a is configured to pivot upwardly and away from the platform 652 about the hinged connection in this way when the platform 652 is translated to an extreme position (the loading position) at one end of the linear tracks 656a, 656b (to the far right, as shown in FIG. 33). This movement is the result of the platform lid 653, 653a engaging with a guide rail 670 (shown in FIGS. 31, 35A and 35B), shaped so as to lift the platform lid 653, 653a at the loading position. The sample holder 110 is loaded from above onto the support 650 (i.e. into the recessed region 651 of the platform 652) at the loading position. In this position, the sample holder 110 rests on axial positioning wheels 690a (see FIG. 35C) (i.e. wheels configured for positioning the sample holder in its axial direction, i.e. vertically) in the recessed region 651 and is prevented from lateral movement by the recessed region 651, and by radial positioning wheels 658 (i.e. wheels configured for positioning the sample holder in its planar direction, i.e. in the horizontal plane—see FIG. 34). As the platform 652 moves from the loading position, the platform lid 653, 653a is guided down by the guide rail 670 to press down on the sample holder 10 via axial positioning wheels 690b (see FIGS. 35D and 36A and B) in the platform lid 653, 653a, so that the sample holder 110 is prevented from movement upwardly by the downward force applied by the platform lid 653, 653a. That is, the platform lid 653, 653a provides a vertical clamping function. The sample holder 110 is prevented from movement downwardly by being supported by the recessed region 651.

A single X-motion moves the sample holder 110 between the load and read positions (the load position is shown in FIG. 35A, and the read position is shown in FIG. 35B), and the same movement also clamps the sample holder 110 from the top for reading, and releases the clamp in the load position. This is achieved by a guide wheel 672 (see FIG. 31) on the side of the platform lid 653, 653a following the guide rail 670 when the platform 652 (including the platform lid 653, 653a) is moved in the X direction. The same motion also causes a drive wheel 657 positioned on the platform 652 to be pressed against the sample holder by a spring-loaded pivot in the reading position. This pressure also positions the sample holder 110 radially (along with the fixed radial positioning wheels 658 mentioned above) and allows the sample holder to be rotated by the drive wheel 657 (discussed in more detail below).

When moving from the reading to the load position (see FIGS. 35A and B), the X-movement together with an opening pin 659 (see FIG. 34) acts on a pivot 656a on a rod 656 when the support 650 approaches the load position, releasing the drive wheel 657 and making the sample holder 110 accessible for removal. Moreover, movement from the reading to the loading position raises the platform lid 653, 653a off of the sample holder, releasing the clamping.

In summary, for loading, the platform 651 is moved to the load position, opening the platform lid 653, 653a, and releasing the spring-loaded drive wheel 657. When moved to the read position, the platform lid 653, 653a closes and the drive wheel 657 engages, holding the sample holder 110 both axially and radially.

The support comprises a through-hole 654, below the plane at which the sample holder 110 is supported, which allows a portion of the sample holder 110 to be imaged by the line camera 610, from below.

In order to bring different radial lines of sample chambers 33 into line with the line camera 610 for imaging, the drive wheel 657 rotates the sample holder 110 (about a vertical axis of the sample holder 110). When a sample holder 110 is held in the support 650, the drive wheel 657 is located adjacent to the rim of the sample holder 110, to frictionally engage the rim of the sample holder 110. The drive wheel 657 is pressed to the rim using the above described spring action. The drive wheel 657 is driven by a second motor 655, via a drive belt (not shown).

As noted above, The drive wheel 657 is configured to disengage from the rim of the sample holder 110 (i.e. the spring action pressing the drive wheel 657 to the rim of the sample holder 110 is relaxed) when the platform 652 is translated to the loading position at the right-hand end (as shown in FIG. 33) of the linear tracks 656a, 656b. The drive wheel 657 is configured to engage with the rim of the sample holder 110 when the platform 652 is translated away from the loading position. The drive wheel 657 is configured to rotate the sample holder 110 at a speed of approximately 30° per second.

The support 650 is configured to align the sample holder 110 in a specific position such that the starting position for the imaging is known. The support 650 comprises a dedicated detector (for example, a photodetector such as a reflective sensor, not shown) configured to detect a single alignment structure 138a (see FIGS. 6, for example which is present on the sample holder 110 at a distance from the center of the sample holder 110 where no other structures are present. The single alignment marker comprises for example a through-hole through the middle layer 130, similar to the through-holes which form the sample chambers 133, but smaller in size, or a frosted line on the bottom layer. This structure defines the absolute position, and then a predetermined offset gives the rotational position of the starting imaging position. The system can find the starting position for the imaging to within ±500 μm, as measured at the outermost sample chamber.

Instead of a photodetector, an IR optical fork provided 680 (see FIGS. 35C and 35D) on the support 650 and platform lid 653, 653a may be used to find the location of a notch 138b in an outer edge of the sample holder (see FIG. 15A, for example). (In particular, the notch may be provided in the outer edge of the middle layer of the sample holder 110.)

After movement to the position of the first sample chamber of the first line of sample chambers, a fine tuning of the radial position is done by edge detection on images acquired by the camera 610.

In the use of the device, the sample holder 110 is provided with appropriate samples in sample chambers 133 and images of the samples are gathered using the line camera 610.

Referring to FIG. 32A again, in use, light from the illumination source 630 is incident onto the sample holder 110 from above (via the band-pass filter 631 and condenser 632). The light passes through the sample chambers 133 of the sample holder 110, and is collected by the objective lens 625. After passing through the objective lens 625, the light reflects from the dichroic mirror 620, passes through the tube lens 640, and is then imaged by the line camera 610.

Similarly, in the system shown in FIG. 32B, in use, light from the illumination source 630 is incident onto the sample holder 110 from above (via the band-pass filter 631) and condenser 632. The light passes through the sample chambers 133 of the sample holder 110, and is collected by the objective lens 625. After passing through the objective lens 625, the light passes through the dichroic mirror 620, passes through the tube lens 640, and is then imaged by the line camera 610.

The sample holder 110 is moved in a first linear direction in the horizontal plane, such that the imaging line of the line camera 610 successively images different lines perpendicular to the radial line along which the sample chambers 133 are distributed.

The speed at which the sample holder is translated is, in this example, matched to the imaging rate (line rate) of the line camera, such that the resultant image is not distorted. The speed s of the linear movement of the sample holder is given by:

$$s = \frac{\text{pixel width} \times \text{line camera imaging rate}}{\text{magnification}}$$

Here, the pixel width is 3.5 μm, the line camera imaging rate is 48 kHz and the magnification is 10×. This gives a speed s of 16.8 mm/s. This allows imaging of 50 radial lines, each of 50 mm length, within 6 minutes (including the time taken for rotation to each new radial line, and data transfers). A sample holder 110 comprising 384 sample chambers can be fully scanned in 7 minutes. The total analysis time per sample chamber, including movement to the sample chamber, adjusting the focal plane during imaging, and acquiring images within the sample chamber is less than 2 seconds.

Following the completion of the translational movement of the sample holder 110, the sample holder 110 is rotated by the support 650 in order to bring another radial line of sample chambers 133 into alignment with the imaging line of the line camera 610. The sample holder 110 is then translated in a linear direction in the opposite to the first linear direction, to image the second radial line of sample chambers.

As a radial line of sample chambers 133 is imaged by the line camera 610, a composite image comprising the plurality of imaged lines is built up. The composite image obtained by the line camera 610 includes all of the sample chambers 133 along the radial line. This composite image may be processed by an image processing algorithm to split the composite into separate image areas, each including one sample chamber 133, for example.

The composite image obtained by the line camera 610 includes all of the sample chambers 133 and focus-verification structures 141 along the channel 134. This composite image may be processed by an image processing algorithm to split the composite into separate image areas, each including a sample chamber 133 and at least one focus-verification structure 141. In one example, the focus-verification structure 141 associated with a given sample chamber 133 comprises two pyramid indentations at each end of the sample chamber 133. In another example, there is a focus-verification structure 141 comprising four pyramid indentations at the end of each sample chamber 133. In each case the geometry (i.e. layout of the pyramid indentations) may be the same, but the subsequent association of a focus-verification structure) 41 with a sample chamber 133 in the imaging processing is different.

An image analysis system may check the images to determine if they are in focus by identifying the focus-verification structures 141 and checking whether or not they are in focus (as described for example in Q-Linea AB's co-pending application PCT/EP2017/064711). If any of the images are not in focus then an indication can be given to the user and/or remedial action can be taken.

An image analysis system may receive the images taken by the system, and may carry out further image analysis, for example to determine the presence, absence, or amount of microscopic objects and/or to determine the type of microscopic objects (for example, as disclosed in Q-Linea AB's co-pending application PCT/EP2017/064713).

The autofocus system 615 comprises a laser light source (not shown) with wavelength of 785 nm. The laser light 615a passes through the dichroic mirror 620 and the objective lens 625 (in the opposite direction to the light gathered by the objective lens 625 from the sample chambers 133), to be incident onto a bottom surface of the sample holder 110. The autofocus system 615 sets the focal plane at the bottom surface of the sample chambers 133 in the sample holder. The focal plane of the line camera 610 may be set at a predetermined upward offset therefrom (such that the focal plane lies at a plane within the sample chamber 133, above and parallel to the bottom surface of the sample chamber 133), by offsetting the line camera 110 along the optical axis (by between 0 mm and 20 mm).

The autofocus system 615 can adjust the focal position (if necessary) every 0.15 ms. This allows the autofocus system 615 to recheck the focal position approximately every 7 lines read by the line camera 110 (which has an imaging rate of 48 kHz). If the focal position needs to be adjusted, the autofocus system 615 outputs a signal which causes the lens holder to translate the objective lens 625 in order to adjust the focal plane. The lens holder translates the objective lens 625 along an axis parallel to a plane of the support 650, with a precision of 1 µm. Movement of the lens holder is driven by a linear actuator (not shown). To image a single sample chamber 133, the line camera 610 may capture thousands of lines (for example, between 10,000 and 15,000), and so the focal plane may be adjusted by the autofocus system 615 hundreds or thousands of times, across each sample chamber 133. Any non-uniformity in the base of the sample chamber 133 can therefore be accounted for in the imaging process.

In some embodiments, the upper layer 120 of the sample holder 110 may be optically active, and may cause non-uniformity in the light incident onto the sample chambers 133. In particular, the micropillars on the upper layer 120 refract or block light so that the illumination intensity as perceived over the imaged areas is not even, but shows variations dependent on the shape and size of the micropillars. Such variations may be detrimental to the image, and subsequent image processing. To counteract this, a diffuser may be positioned between the illumination source 630 and the upper layer 120 of the sample holder 110). The diffuser may be an optical diffuser which diffuses the light evenly, or it may be an engineered diffuser comprising an engineered surface having structures designed to cancel out the light intensity variations caused by the micropillars. Alternatively, a plurality of light sources may be provided, positioned to provide different path lengths for illumination of the sample chambers. The diffuser or plurality of light sources act to provide a more even illumination to the sample chambers 133.

Sample Holder Transport Sub-System

The sample holder transport sub-system (see FIGS. 38 and 39) is operable to handle all movement of sample holders between different stages in the analysis instrument. The following components make up the sample holder transport sub-system.

Sample Holder Receiver

As described above, the sample holder receiver comprises a slide-out tray 210 (similar to a CD tray interface, as is well known in the art). The slide-out tray may open and close by a command input by the user via the touch-screen interface. In the open position, the sample holder receiver is accessible to the user to place a sample holder into the sample holder receiver. As the sample holder receiver is slid back into the analysis instrument towards the closed position, the first barcode reader (described above) automatically scans the barcode/QR code on the sample holder. When the sample holder receiver is in the closed position, the sample holder is accessible to the front gripper (i.e. the front gripper is able to pick up and transport the sample holder.

Front Gripper

The front gripper 730 (see FIG. 37B) consists of an arm 731 with rotational and Z movement. The movements are performed by two coordinated motors 735 (in this case, model 14HS20-15045 from OMC) driving ball screw/spline movement (in this case, R20-2051-2FSHR2-360-410-0, 012H from Hiwin).

The tip of the front gripper comprises an attachment mechanism for holding and controlled release of the sample holder.

The attachment mechanism comprises a conical tip (shown at 723 on the corresponding rear gripper 720 of FIG. 37A) to be received by the central hole in the magnetic metal plate of the sample holder. The attachment mechanism comprises an electropermanent magnet 732 (in this case, model 71-1815 from Hyab Magneter AB) which attracts or releases the magnetic metal layer of the sample holder in order to hold or release the sample holder. The attachment mechanism may comprise a means of gripping the sample holder other than by magnetism.

The tip of the front gripper comprises a reflective sensor 734. The reflective sensor is configured to detect the presence or absence of a sample holder. One exemplary reflective sensor is OPB740WZ from TT Electronics. This reflective sensor may also be used to measure the fill-level (i.e. number of sample holders) in the sample holder waste station by moving the reflective sensor over the sample holder waste station and determining the fill-level. This may be a back-up measure, in addition to providing the second barcode reader described above.

Prior to the analysis being carried out by the analysis instrument (which analysis takes place entirely within the incubator), the front gripper is operable to transfer a sample holder between:
- a) the sample holder receiver and the incubator slide-tray, for onwards transfer into a holding position in the carousel by the rear gripper
- b) the incubator slide-tray and the concentration determination stage, for rotational alignment of the sample holder;
- c) the concentration determination stage and the sample holder fill stage, for filling of the concentration determination chambers of the sample holder;
- d) the sample holder fill stage and the concentration determination stage, for determination of the concentration of the pathogens in the concentration determination chambers of the sample holder;
- e) the concentration determination stage and the sample holder fill stage, for filling the sample chambers of the sample wells;
- f) the sample holder fill stage and the incubator slide-tray.

Subsequently to the analysis being carried out by the analysis instrument (which analysis takes place entirely within the incubator), the front gripper is operable to transfer a sample holder between:
- g) the incubator slide-tray and the sample holder waste station.

Concentration Determination Stage

As described above, the concentration determination stage 400 comprises a rotatable turntable 410 and a rotation positioning sensor 450, allowing a sample holder to be aligned in a predetermined rotational orientation. The concentration determination stage is used to align the sample holder prior to filling of the concentration determination chambers of the sample holder, for determination of the concentration of the pathogens in the concentration determination chambers of the sample holder, and then prior to filling the sample chambers of the sample wells.

Sample Holder Fill Stage

The sample holder fill stage 325 comprises two sample holder fill positions. Each of these comprises an electromagnet positioned below the sample holder fill position, to retain the sample holder in a predetermined position whilst being filled. The sample holder fill stage is accessible by the pipetting robots 300, as described above.

Incubator Slide-Tray

The incubator slide-tray 740 has a similar construction to the sample holder receiver 210, i.e. it is similar to a CD tray interface, as is well known in the art.

The incubator slide-tray is configured to move from a loading position (outside of the incubator) to an unloading position (inside the incubator). In the loading position, the incubator slide-tray is accessible (for loading of a sample holder into the incubator slide-tray) by the front gripper. In the unloading position, the incubator slide-tray is accessible (for unloading of a sample holder from the incubator slide-tray) by the rear gripper (described below).

When not in use, the incubator slide-tray is in the unloading position, to block the entrance to the incubator, thereby reducing heat loss from the incubator.

Sample Holder Waste Stage

This stage accepts up to 12 spent sample holders, placed there by the front gripper. The sample holder waste station slides out to allow the user to remove spent sample holders.

Rear Gripper

Figure 37A:
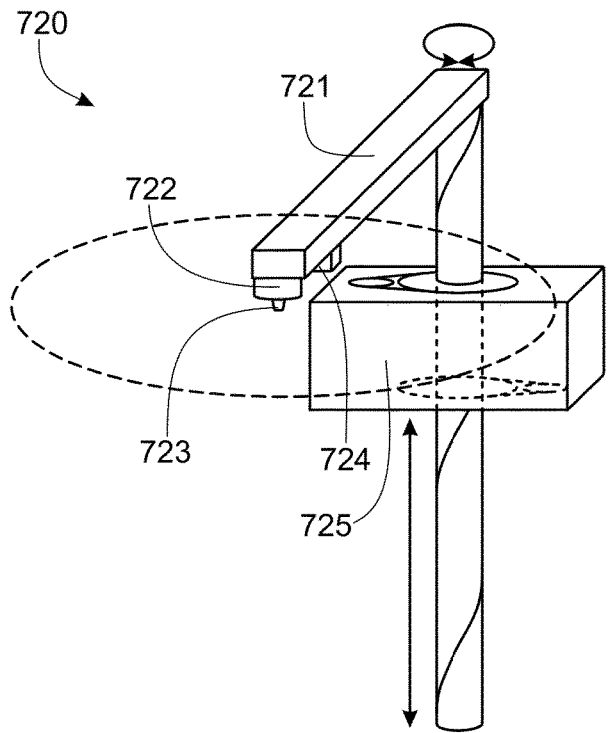
FIGS. 37A and B show the rear and front gripper, respectively.
Figure 37B:
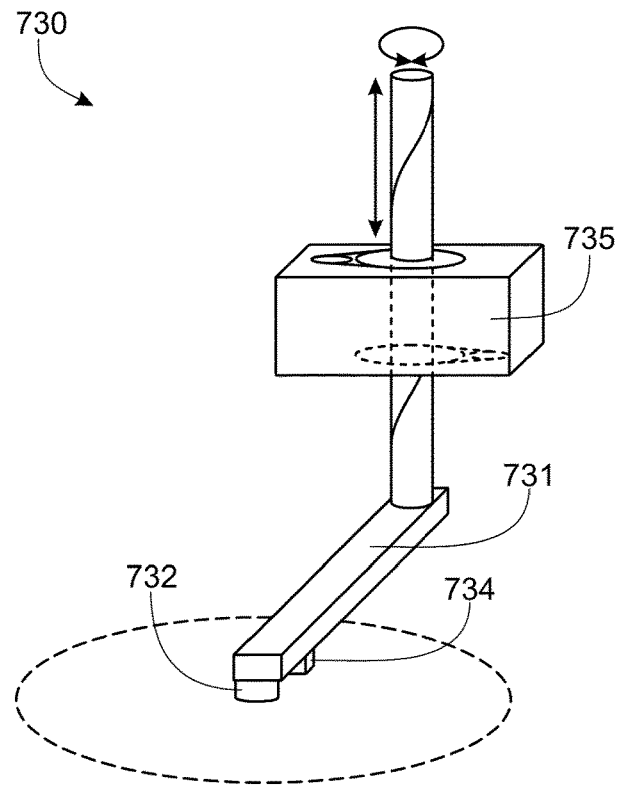

The rear gripper 720 has essentially the same function and construction as the front gripper 730 (see FIG. 37A: arm 721, electropermagnet 722, conical tip 723, sensor 724 and motors 725). However, additionally, the rear gripper comprises a proximity sensor mounted centrally and looking upwards (not shown). This sensor is used to determine the Z-position of the arm, by timing the duration of a light pulse to reach the inner top cover of the analysis instrument and back. This is used when homing the arm when its position is unknown. Depending on the actual Z position when initiating the procedure, different homing sequences are needed. In this case, the sensor is model 6180X from VL.

The rear gripper is operable to transfer a sample holder between:
- a) the incubator slide-tray (in its unloading position) and the incubator carousel;
- b) the incubator carousel and the support 150 (i.e. into the recessed region 651 of the platform 652) at the loading position, for imaging of the sample chambers;
- c) the support 150 (i.e. into the recessed region 651 of the platform 652) at the loading position and the incubator carousel, for (further) incubation of the sample in the sample holder;
- d) the incubator carousel and the incubator slide tray (in its unloading position) for removing the sample holder from the incubator, after analysis.

Steps b) and c) may be repeated multiple times during the analysis performed by the analysis instrument, allowing each sample well to be imaged at a plurality of time points, separated by periods of incubation.

Figure 39:
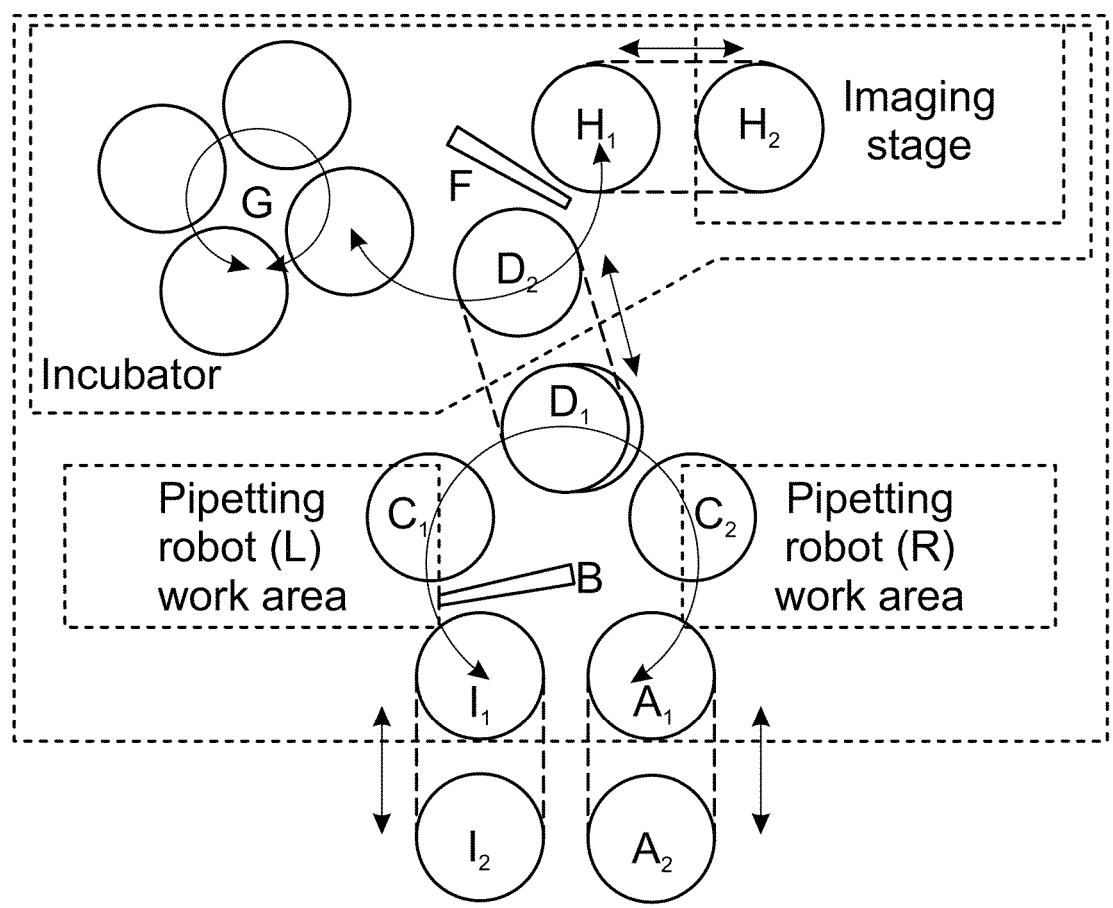

FIG. 39 shows the movement of a sample holder between the various locations. Arrows indicate travel for movable components. The various stages or parts of the transport sub-system are labeled as follows:
- A1: sample holder receiver, open position;
- A2: sample holder receiver, closed position;
- B: front gripper;
- C1, C2: sample holder fill stages;
- D1: incubator slide-tray in loading position;
- D2: incubator slide-tray in un-loading position;
- E: concentration determination stage;
- F: rear gripper;
- G: incubator carousel;
- H: sample chamber imaging stage;
- I: sample holder waste stage.

Stages A2, C1, C2, D1, E and I are accessed by the front gripper (B). Stages D2, G and H are accessed by the rear gripper (F).

A typical journey of a sample holder in the course of an analysis is shown as follows:

A1→A2→G→E (for alignment of the sample holder)→C1 or C2 (for filling the concentration determination chambers)→E (for concentration determination)→C1 or C2 (for filling of the sample chambers)→D1→D2→[G→H]*→D2→D1→I

[G→H]* means that this is repeated multiple times over the course of the analysis, to collect a time-lapse series of images of the sample chambers, separated by periods of incubation.

Analysis Instrument Cooling

Figure 40:
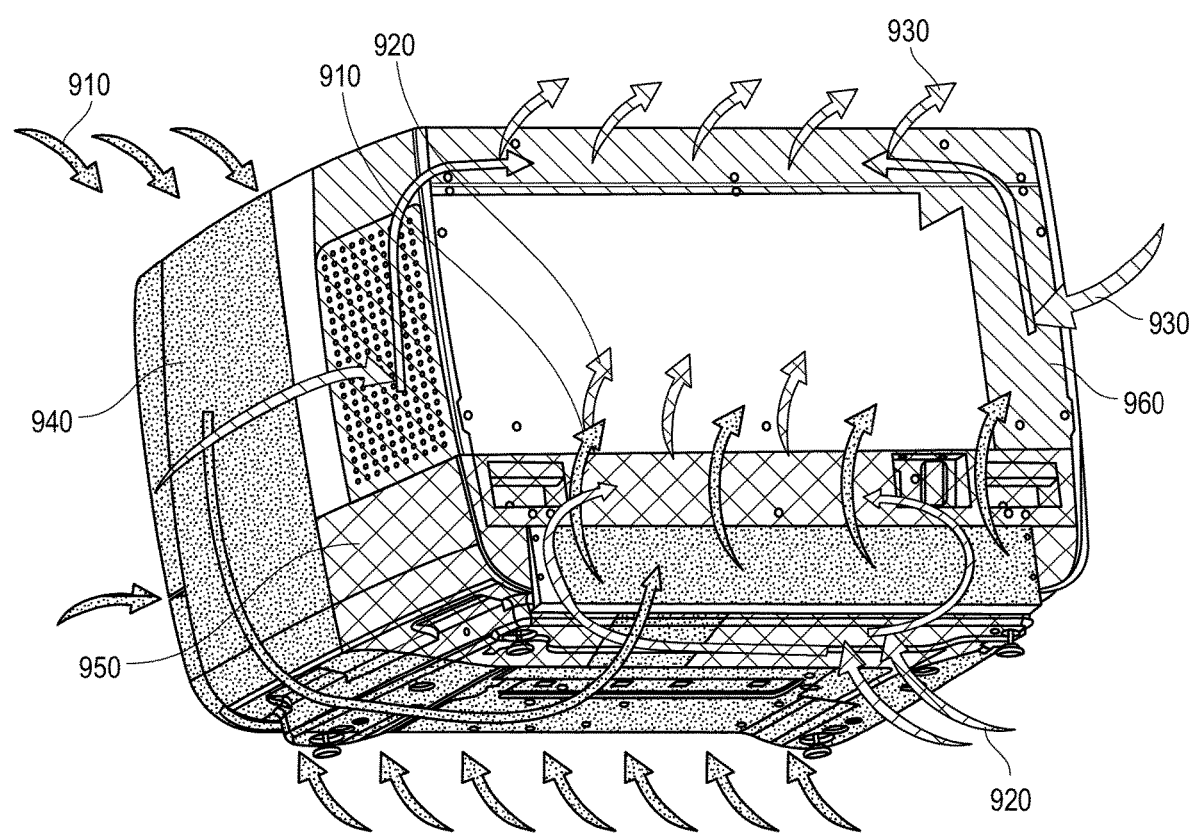
FIG. 40 shows a rear perspective view of the analysis instrument, showing inward and outward airflow for cooling within the analysis instrument.

As shown in FIG. 40, the analysis instrument uses three separate airflows 910, 920, 930 for cooling. These separately cool three compartments 940, 950, 960 within the instrument. A first compartment 940 is the main instrumentation compartment; this could potentially be contaminated with pathogens. The first compartment 940 is cooled by a first airflow 910. A second compartment 950 is a computer bay housing the computing sub-system 800. The second compartment 950 is cooled by a second airflow 920. A third compartment 960 is provided underneath the incubator 500. The third compartment 960 is cooled by a third airflow 930. The various fans which draw air into, or push air out of the analysis instrument are under the control of the computing sub-system 800.

Separating the cooling airflows in this way allows for the temperature within the analysis instrument to be controlled such that the analysis instrument is operable even in a relatively hot room, without overheating.

In respect of the first airflow 910 cooling the main instrumentation chamber (first compartment 940) containing potentially contaminated air, air is drawn into the main instrumentation chamber 940 from intakes at the front of the analysis instrument (top and bottom) and enters the top of the pipetting area above the pipetting robots 300. As well as this, air enters the main instrumentation chamber 940 through openings around the sample preparation cartridge bays 220 and the sample holder input and waste stations. The fan driving this airflow is located in the lower mid-part of the analysis instrument. The first airflow 910 serves to place the first compartment 940 under a slight under-pressure, directing air with any possible pathogen contamination through the fan. On the other side of the fan, an overpressure is generated to facilitate air flow through an exchangeable HEPA 14 filter, to exit the analysis instrument. The fan speed may be adjustable and increases when a sample preparation cartridge bay 220 or sample holder input/waste station is open, in order to maintain negative relative pressure inside this part of the analysis instrument.

In respect of the second airflow 920 cooling the computing sub-system 800 in the second compartment 950, air is drawn by fans into the analysis instrument at the rear upper sides of the analysis instrument, passing into the second compartment 950 (the computer bay) from both sides. On one side, close to the air intake, the airflow 920 passes across a heat exchanger in the side of the incubator 500, to remove excess heat from the interior of the incubator 500. The airflows 920 from both sides pass through the computer bay 950, and exit through vents at the top rear of the analysis instrument. In this way the computer bay 950 is kept at a slight overpressure in relation both to the exterior, but also to the first compartment 940 to avoid cross-contamination and to minimize the risk of pathogens leaving the analysis instrument in unfiltered air.

In respect of the third airflow 930 cooling the third compartment 960, air is drawn air from openings in the bottom of the analysis instrument, flows through the third compartment 960 (below the incubator 500), and out through openings in the rear of the analysis instrument. The third compartment 960 is also kept at a slight overpressure compared to the first compartment 940 to avoid cross-contamination and minimize the risk of pathogens leaving the analysis instrument in unfiltered air.

Computing Sub-System

The analysis instrument comprises two computers; the first (the analysis computer) handles user interactions, data analysis and result processing, and the second (the instrument computer) controls the instrument.

The computers are equipped with volatile memory (RAM) and non-volatile memory (SSD). A communication interface is used to connect the computers to each other and/or external components such as external storage, network, Laboratory Information System (LIS) etc.

The user generally interfaces with the analysis instrument via the touchscreen (described below). Technicians accessing the analysis instrument for service/repair may access the analysis instrument via the touchscreen, and/or via a mouse and keyboard, for example.

The output interface may be the touchscreen and/or a printer or some other output device.

The two computers are differently equipped depending on the functionality. For example, the instrument computer has a framegrabber card for image acquisition from the line camera. The analysis computer is equipped with a graphics processing unit (GPU) for image analysis. Image data from the line camera is formatted into images on the instrument computer after each image acquisition and sent to the analysis computer for processing. The image analysis is performed in parallel with sample processing to avoid excessive analysis time after sample processing in finished.

The instrument computer communicates with all hardware components of the analysis instrument and executes the scheduling for each processed sample. Further, the instrument computer communicates with micro controller units (MCUs) performing isolated task where, for example, real time performance is crucial (for example, PID loops for temperature control or finding home positions for a motor).

The analysis computer executes the application software handling user input through a graphical user interface, performing analysis of image data when it arrives from the instrument, and performing the final MIC calculation and result reporting. Further, the application software handles data storage to locations specified by the user (e.g. LIS, external drive etc.).

The application software may be extended by one or several plug-ins extending the functionality of the software without changing the core implementation. There are several types of plug-ins for e.g. image analysis, MIC analysis, SIR generation, result reporting and LIS connectivity.

It is possible to install several analysis plug-ins for performing certain aspects of the analysis pipeline, e.g. image analysis, MIC analysis etc. The analysis plug-ins are optimized for analysis of certain combinations of pathogens and antimicrobials.

A master panel plug-in defines which analysis plug-ins are valid for a certain test panel containing a defined set of antimicrobials targeting a defined set of pathogens (e.g. gram negatives). The panel plug-ins for a certain panel will be part of the kit and installed by the user.

This extensibility also enables easy distribution of SIR breakpoints updates when available, as well as upgrades of the LIS connectivity.

User Interface Sub-System

All user interaction points except the power switch are accessible from the front of the analysis instrument. A multicolor LED strip spans the front just above the outermost faces of the sample holder receiver and sample preparation cartridge bays, indicating active bays and/or the bay in turn to be loaded using color-codes, as well as the position of the bar code reader when a read is required.

The analysis instrument also comprises a user-accessible USB socket, for allowing software upgrades to be uploaded to the analysis instrument. The USB socket is visible in Figure XX, just below the touchscreen (discussed further below).

The system is powered up using a separate on/off switch. Thereafter, interactions between the user and the system are done through a touchscreen interface.

The functions/information exchanges performed through the touchscreen include:

Verification of instrument status after switch-on
Request of lanes for new samples (1-6)
Response giving free lanes and waiting times for samples exceeding the number of free lanes.
Info on solid waste status
Request for emptying solid waste. (Station opened by instrument)
Sample input: request to empty relevant sample preparation cartridge bay, if occupied (opened by instrument)
Sample input: request to scan bar codes on sample preparation cartridge
Sample input: Request to place sample preparation cartridge in specific bay (opened by instrument)
Sample input: request to scan bar codes on AST consumable
Sample input: Request to place on AST consumable in AST input station (Station opened by instrument)
Notification of invalid consumable/sample
Sample input: Request for sample ID
Processing status of all samples in progress together with estimated TTR
Notification of processed sample
Data presentation
Request to terminate sample processing, specific sample or all samples.
Request to run QC kit
Result presentation QC kit
System shutdown

The invention claimed is:

1. An apparatus for moving a sample holder on a platform from a loading position where the sample holder can be removed from the platform to a locked position where the sample holder is securely held, the apparatus comprising:
the platform;
a vertical clamp;
a horizontal clamp; and
wheels,
wherein:
the wheels are within a recessed portion on the platform and are configured to support the sample holder within the recessed portion on the platform;
the apparatus is configured such that: (i) movement of the platform from the loading position to the locked position causes the vertical clamp to lower down on top of the sample holder, and the horizontal clamp to be pressed to an outer periphery of the sample holder; and (ii) movement of the platform from the locked position to the loading position causes the vertical clamp to rise above the sample holder, and the horizontal clamp to be moved away from the outer periphery of the sample holder; and
the horizontal clamp comprises a drive wheel configured to apply a tangential force to the sample holder so as to rotate the sample holder when the sample holder is in the locked position.

2. The apparatus according to claim 1, wherein the vertical clamp comprises a platform lid.

3. The apparatus according to claim 2, wherein the platform lid comprises a first end which is hingedly connected to the platform, and a second end which can rise up and down by pivoting about the hinged connection at the first end.

4. The apparatus according to claim 3, wherein the platform lid comprises a guide wheel configured to follow a guide rail which extends from the locked position to the loading position.

5. The apparatus according to claim 4, wherein the guide wheel is closer to the second end of the platform lid than the first end of the platform lid.

6. The apparatus according to claim 4, wherein a height of the guide rail increases from the locked position to the loading position, such that the platform lid is configured to be lifted upward when moving from the locked position to the loading position.

7. The apparatus according to claim 2, wherein the platform lid comprises an inner frame which is attached via gimbal mounts to an outer frame for allowing the inner frame to pivot about an axis.

8. The apparatus according to claim 7, further comprising an angular limiter configured to limit an extent to which the inner frame can pivot about the axis.

9. The apparatus according to claim 8, wherein the angular limiter comprises a pin protruding from the inner frame, which is configured to be received within a hole in the outer frame.

10. The apparatus according to claim 8, wherein the angular limiter comprises a pin protruding from the outer frame, which is configured to be received within a hole in the inner frame.

11. The apparatus according to claim 2, wherein, in the locked position, the platform lid is parallel to the platform.

12. The apparatus according to claim 1, wherein the horizontal clamp is on a first side of a pivot point on a pivotable rod, and is able to pivot away from or toward the sample holder about the pivot point.

13. The apparatus according to claim 12, wherein a spring is attached to the pivotable rod at a second side of the pivot point.

14. The apparatus according to claim 13, wherein the apparatus is configured such that movement from the locked position to the loading position brings the pivotable rod into contact with a stop, which pivots the pivotable rod away from the sample holder, against an action of the spring.

* * * * *